(12) United States Patent
Ueno et al.

(10) Patent No.: US 9,528,189 B2
(45) Date of Patent: Dec. 27, 2016

(54) GAS GENERATING DEVICE AND METHOD FOR GENERATING GAS

(75) Inventors: Keiji Ueno, Sodegaura (JP); Mitsuru Sadamoto, Ichihara (JP); Hiroko Wachi, Chiba (JP); Hiroshi Maekawa, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 420 days.

(21) Appl. No.: 13/394,994

(22) PCT Filed: Sep. 8, 2010

(86) PCT No.: PCT/JP2010/005506
§ 371 (c)(1),
(2), (4) Date: Mar. 8, 2012

(87) PCT Pub. No.: WO2011/030546
PCT Pub. Date: Mar. 17, 2011

(65) Prior Publication Data
US 2012/0168318 A1 Jul. 5, 2012

(30) Foreign Application Priority Data

Sep. 9, 2009 (JP) .................. 2009-207777
Sep. 16, 2009 (JP) .................. 2009-214484

(51) Int. Cl.
*C25B 1/00* (2006.01)
(52) U.S. Cl.
CPC .............. *C25B 1/003* (2013.01); *Y02E 60/364* (2013.01); *Y02E 60/368* (2013.01)
(58) Field of Classification Search
CPC ....... C25B 1/003; Y02E 60/364; Y02E 60/368
(Continued)

(56) References Cited

U.S. PATENT DOCUMENTS 4,240,882 A * 12/1980 Ang et al. ............. 205/340
4,389,290 A *  6/1983 Gratzel et al. ........ 205/340
(Continued)

FOREIGN PATENT DOCUMENTS

GB      2414243 A    11/2005
JP   2004-292284 A    10/2004
(Continued)

OTHER PUBLICATIONS

Written Opinion of the Int'l Searching Authority for PCT/JP2010/005506, dated Apr. 11, 2012.*
(Continued)

*Primary Examiner* — Keith Hendricks
*Assistant Examiner* — Colleen M Raphael
(74) *Attorney, Agent, or Firm* — Buchanan, Ingersoll & Rooney PC

(57) ABSTRACT

A gas generating device for generating an oxygen gas and/or a hydrogen gas from an electrolytic solution containing water, including an anode electrode, a cathode electrode, a plurality of through holes and a gas containing unit. The anode electrode (photocatalyst supporting electrode) has a photocatalyst-containing layer containing a photocatalyst producing an oxygen gas from the electrolytic solution by a photocatalytic reaction. The cathode electrode produces a hydrogen gas from electrons and hydrogen ions that are generated in the electrolytic solution by the photocatalytic reaction at the photocatalyst-containing layer. The through holes are formed on at least one of the anode electrode and the cathode electrode, and the through holes allow the produced oxygen gas or hydrogen gas to pass therethrough, but do not allow the electrolytic solution to pass therethrough. The gas containing unit holds the oxygen gas or hydrogen gas that has passed through the through holes.

41 Claims, 48 Drawing Sheets

(58) Field of Classification Search
USPC .......................................... 422/186; 205/340
See application file for complete search history.

(56) References Cited

U.S. PATENT DOCUMENTS

| | | | | |
|---|---|---|---|---|
| 4,439,301 | A * | 3/1984 | Reichman et al. | 205/340 |
| 5,137,607 | A * | 8/1992 | Anderson et al. | 422/186 |
| 5,308,454 | A * | 5/1994 | Anderson | 205/340 |
| 5,863,491 | A * | 1/1999 | Wang | 266/101 |
| 5,897,757 | A * | 4/1999 | Sano | 204/284 |
| 7,967,958 | B2 * | 6/2011 | Sano | 204/193 |
| 8,083,904 | B2 * | 12/2011 | Mofakhami | 205/340 |
| 8,388,818 | B1 * | 3/2013 | Menezes | 205/340 |
| 8,398,828 | B1 * | 3/2013 | Winkie et al. | 205/340 |
| 8,574,421 | B2 * | 11/2013 | Nakanishi et al. | 205/340 |
| 2009/0127124 | A1 * | 5/2009 | Guerra | 205/340 |
| 2009/0263288 | A1 | 10/2009 | Suzuki et al. | |
| 2010/0126875 | A1 * | 5/2010 | Maekawa et al. | 204/258 |
| 2012/0279872 | A1 * | 11/2012 | Chen et al. | 205/758 |

FOREIGN PATENT DOCUMENTS

| | | |
|---|---|---|
| JP | 2006-176835 A | 7/2006 |
| JP | 2006-256901 A | 9/2006 |
| JP | 2007-051318 A | 3/2007 |
| JP | 2007-107043 A | 4/2007 |
| WO | WO 2007/049559 A1 | 5/2007 |
| WO | WO 2008/132818 A1 | 11/2008 |

OTHER PUBLICATIONS

International Search Report (PCT/ISA/210) issued on Oct. 26, 2010, by Japanese Patent Office as the International Searching Authority for International Application No. PCT/JP2010/005506.

Fujishima et al., "Electrochemical Photolysis of Water at a Semiconductor Electrode", Jul. 1972, Nature, pp. 37-38, vol. 238.

Sato, "Photocatalytic Technology for Direct Water Splitting", Achievement of One-step Water Splitting by Ultraviolet Light-Responsive Photocatalyst, 2008, pp. 8-21, Chapter 2 (Partial Translation attached).

Extended Search Report issued by the European Patent Office in corresponding European Patent Application No. 10815146.5 on May 3, 2016 (16 pages).

* cited by examiner

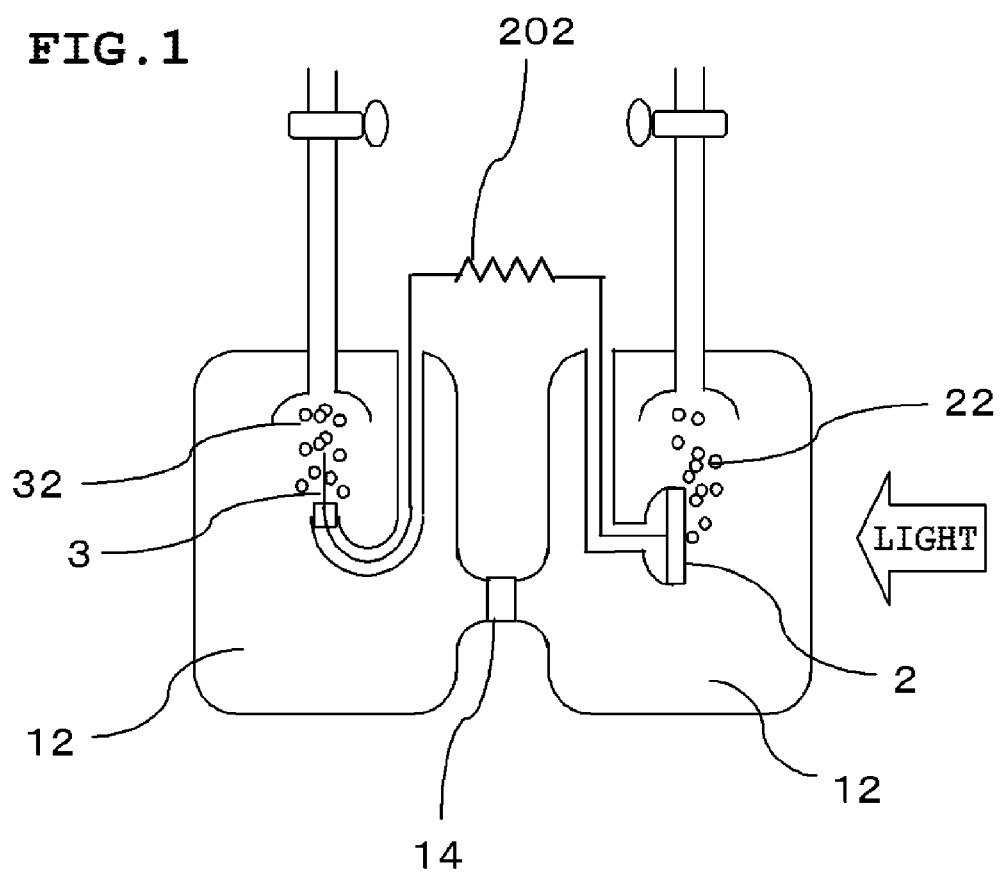

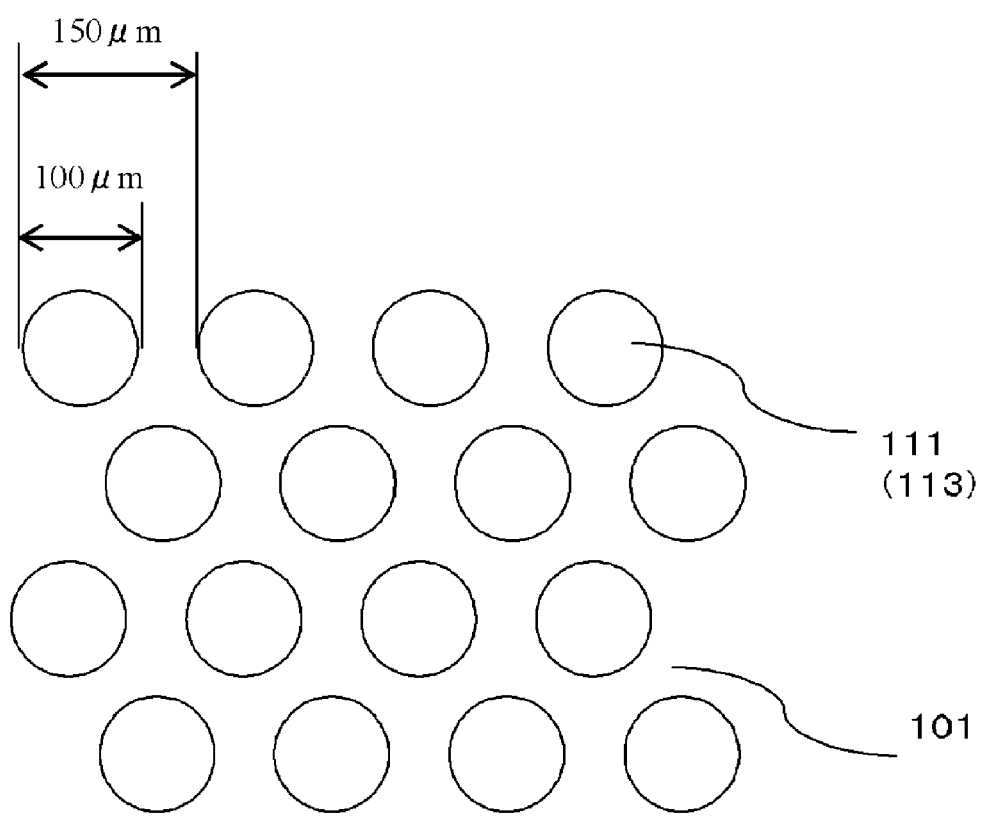

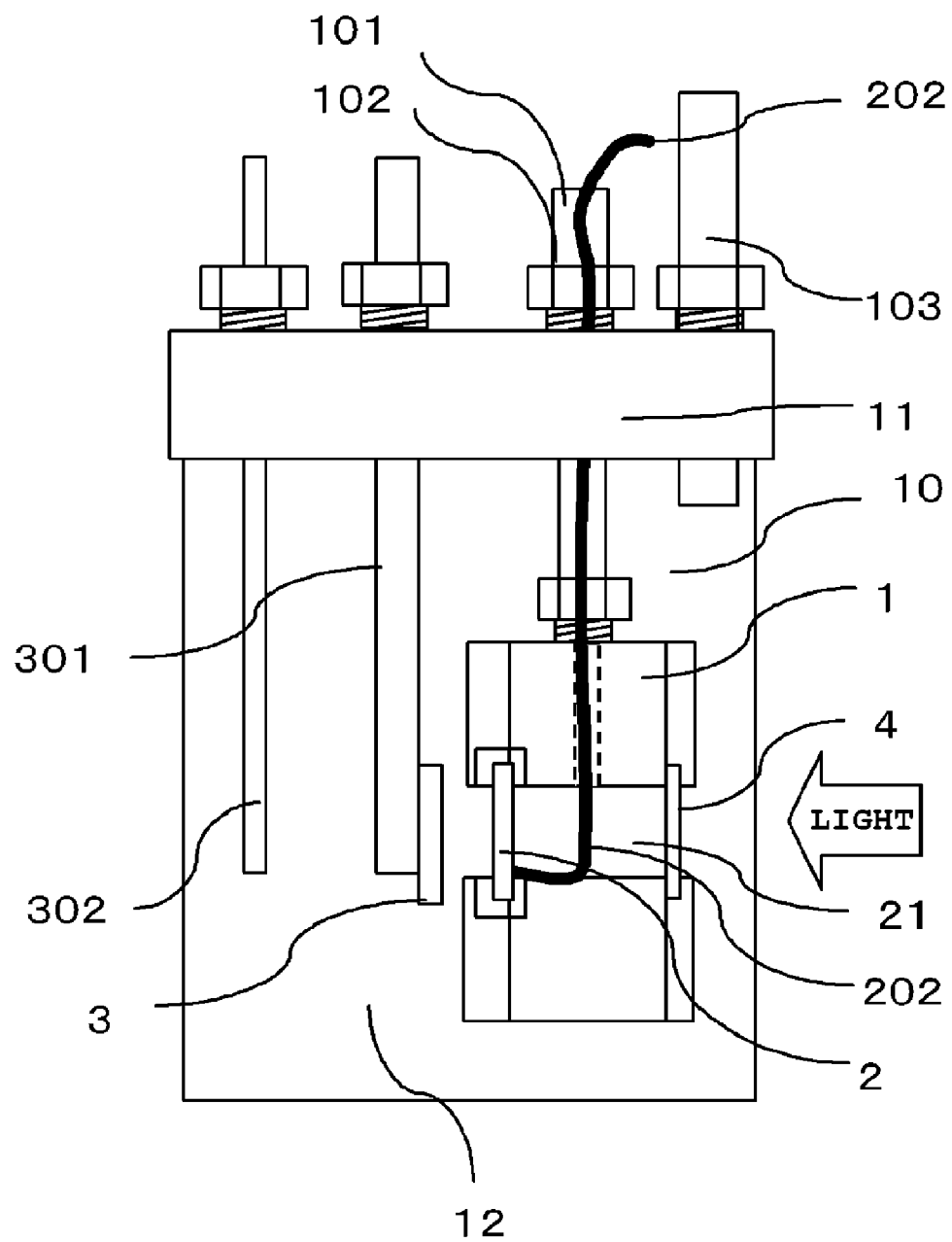

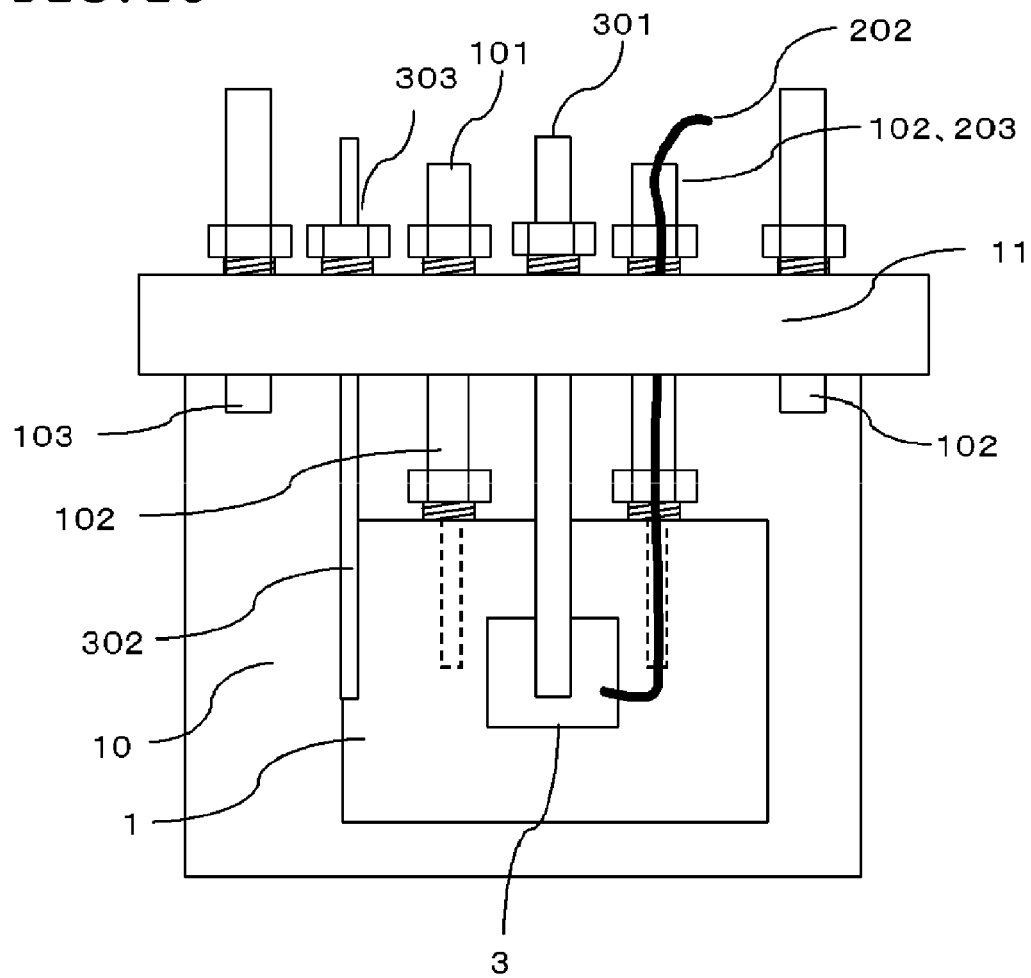

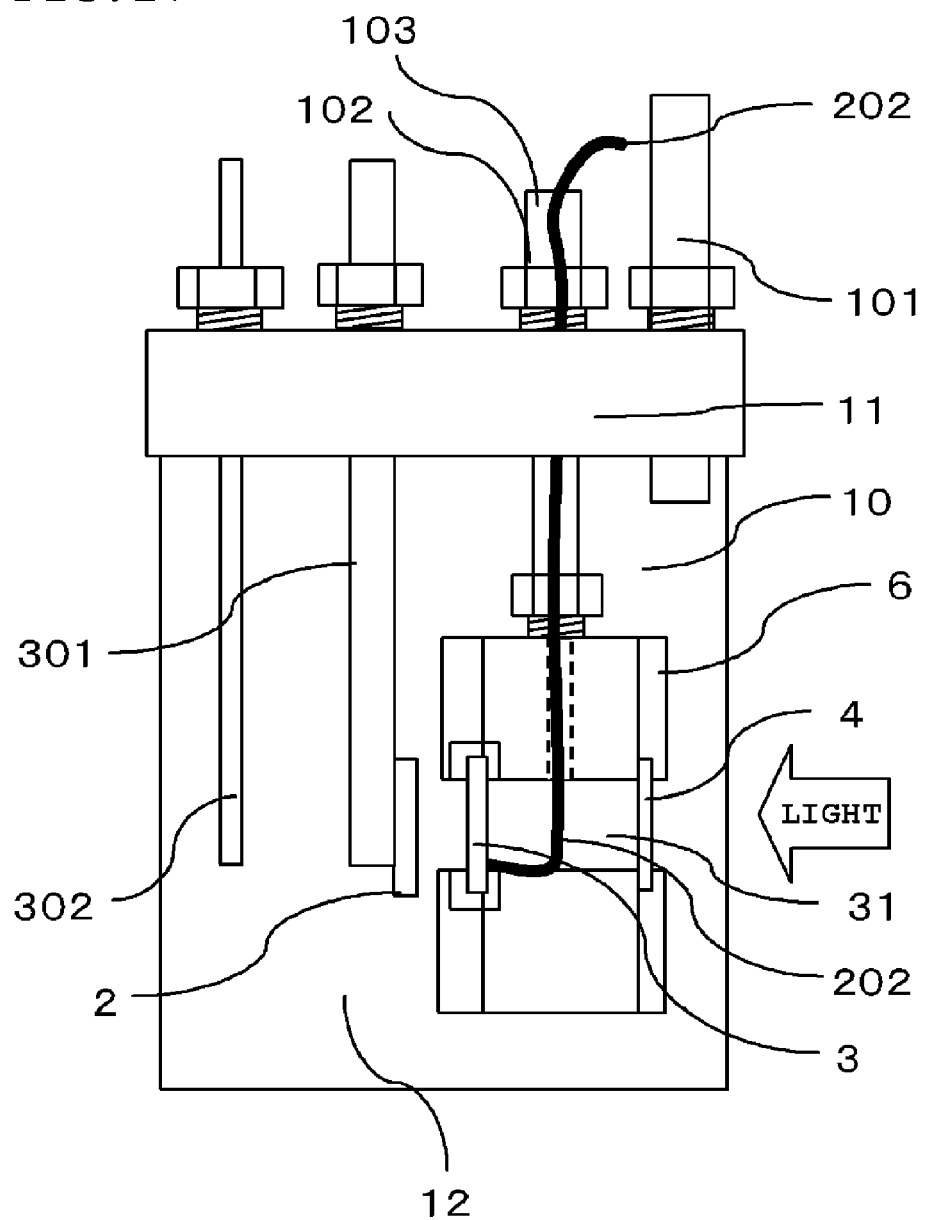

GAS GENERATING DEVICE AND METHOD FOR GENERATING GAS

TECHNICAL FIELD

The present invention relates to a gas generating device using a photocatalyst and a method for generating a gas.

BACKGROUND ART

Hydrogen shows great promise for a main energy amid concerns over depletion of fossil fuels and a growing awareness of the importance of environmental preservation. Generation of hydrogen directly by sunlight using a photocatalyst shows promise for a technology with an extremely small effect on the environment.

For example, Patent Document 1 discloses a device and a method for generating hydrogen using a photocatalyst. The document is characterized in supporting a photocatalyst layer on the surface of an electrically conductive layer of a laminate and providing platinum and/or transition metal oxide on the rear surface.

Furthermore, an electrolysis equipment described in Patent Document 2 has a structure in which an anode electrode is arranged above and a cathode electrode is arranged below. The electrolysis equipment does not have a function to separate hydrogen and chlorine, and is configured to have depressions in the lower side of the cathode electrode and to collect hydrogen generated at the depressions.

FIG. 1 is a general view of a conventional device having a structure provided with a photocatalyst electrode and carrying out water electrolysis by irradiation with light. A device of this kind is disclosed in Non-patent Document 1. In the device, an n-type titanium oxide ($TiO_2$) electrode and a platinum (Pt) electrode are immersed in an electrolytic solution in a reservoir, separated by salt bridge of an ion exchange membrane and connected by means of a conducting wire. When the light having a wavelength shorter than 410 nm is irradiated on the $TiO_2$ surface, a photocurrent flows through the wire, so that oxygen is generated on the $TiO_2$ surface and hydrogen is generated on the Pt surface. Oxygen is formed into oxygen gas bubbles and collected at an oxygen gas containing unit. Hydrogen is formed into hydrogen gas bubbles and collected at a hydrogen gas containing unit. The reaction formula by this photocatalyst is represented by the following formulae 101 to 103 with $e^-$ and $h^+$ respectively as an electron and a hole produced by photoexcitation. Formula 103 is the sum of Formulae 101 and 102.

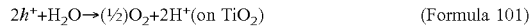
$$2h^+ + H_2O \rightarrow (½)O_2 + 2H^+ \text{(on } TiO_2\text{)} \quad \text{(Formula 101)}$$

$$2e^- + 2H^+ \rightarrow H_2 \text{ (on Pt)} \quad \text{(Formula 102)}$$

$$H_2O \xrightarrow{2h\nu} H_2 + (½)O_2 \quad \text{(Formula 103)}$$

Patent Document 3 and Non-patent Document 2 will be described below.

RELATED DOCUMENT

Patent Document

Patent Document 1: Japanese Laid-open Patent Publication No. 2006-256901
Patent Document 2: Japanese Laid-open Patent Publication No. 2007-51318
Patent Document 3: International Publication Pamphlet No. 2007/049559

Non-Patent Document

Non-patent Document 1: A. Fujishima, K. Honda Nature, Vol. 238, pp. 37-38 (1972)
Non-patent Document 2: Photocatalytic Technology for Direct Water Splitting, written by Mari Sato, supervised by Hironori Arakawa, published by Siemushi Shuppan, Chapter 2, Achievement of One-step Water Splitting by Ultraviolet Light-Responsive Photocatalyst, p. 11

DISCLOSURE OF THE INVENTION

The device as described in Patent Document 1 transports protons generated at the photocatalyst layer to the back of the laminate using an expensive proton-conducting Nafion film. Accordingly, the device has a problem that the cost involved in production of hydrogen increases.

The electrolysis equipment as described in Patent Document 2 has problems that the movement distance of hydrogen ions generated at the photocatalyst layer is so long that the electrolysis equipment is inefficient, and current loss becomes great as much as the movement distance.

In addition, in the devices described in these known documents, the following problems inherent in generation of gases in the photocatalyst have not been solved. That is, when excitation light of the photocatalyst is irradiated on the photocatalyst surface, electrons and holes are generated, and oxygen molecules and hydrogen ions (protons) are generated by oxidation of water molecules in contact with the photocatalyst due to holes. The oxygen molecules are bound on the photocatalyst surface and grow to bubbles and finally separated from the photocatalyst surface. At the same time, hydrogen ions (protons) generated at the photocatalyst surface are dissolved in water and move to the cathode electrode, but when they are bound with remained oxygen molecules, a reverse reaction to turn back into water takes place.

For example, in an experiment in which platinum-supporting titanium oxide powder is dispersed in electrolyzed water containing water in a glass cell and the amount of generated hydrogen is measured by irradiation with ultraviolet light, it is confirmed that the amount of generated hydrogen gas is greatly different depending on the irradiation direction of the ultraviolet light. It is known that, as shown in FIG. 2A, when the light 7 (ultraviolet light) radiates from below to an the electrolytic solution 12 in which platinum-supporting titanium oxide powder 42 of a photocatalyst is dispersed, the amount of generated hydrogen gas 33 is small; on the contrary, as shown in FIG. 2B, when the light 7 radiates from the surface side of the electrolytic solution 12, the amount of generated hydrogen gas 33 increases. Examples of the photocatalyst 42 include a fine platinum particle 41 supported on titanium oxide powder 40. This is because, as shown in FIG. 3, binding of bubbles of the hydrogen gas 33 formed on supported platinum by irradiation with the light 7 and bubbles of the oxygen gas 23 formed on the platinum-supporting photocatalyst 42 on the platinum causes a reverse reaction to turn back into water takes place.

Accordingly, it is required to quickly separate oxygen molecules and hydrogen ions produced from water molecules decomposed by the photocatalyst. For example, Non-patent Document 2 proposes that, as shown in FIG. 4, a thickness of a liquid film layer covering the surface of the photocatalyst 42 be smaller than the size of bubbles (oxygen gas 23 and hydrogen gas 33) formed by irradiation with the light 7. Thus, a reverse reaction to turn back into water due to binding of hydrogen and oxygen is inhibited and the photocatalytic reaction is quickly carried out.

However, when water decomposition is carried out for industrial use according to such a method, it is very hard to make a liquid film covering the electrode thinner than the size of bubbles on the electrode immersed in water. Accordingly, quick photocatalytic reaction requires quick removing of the generated oxygen gas from the photocatalyst surface according to any method. Nevertheless, such a method has not been disclosed until now.

The anode electrode does not operate without irradiation with the light. Yet, the provision of the cathode electrode for carrying out electrolysis at a position opposite to the photocatalyst layer causes the cathode electrode to have a structure preventing irradiation with the light. Accordingly, as described in Patent Document 2, it is required to arrange the cathode electrode on the back side of the side in the anode electrode on which the photocatalyst layer arranged. As a result, the current density accompanied by transmission loss of protons decreases.

When bubbles of oxygen, hydrogen or the like are attached to the electrode, a surface of the electrode to which the bubbles are attached is prevented from being in contact with the electrolytic solution and an electrolytic reaction of water does not take place at least on the surface to which the bubbles are attached. As a result of this, the substantial electrode area reduces and the amount of generated gas decreases.

In Patent Document 3, generation of bubbles has been confirmed by electrolysis of an aqueous 1 weight % sulfuric acid solution using a micro-reactor. Furthermore, the document describes that bubbles generated in water by electrolysis of water quickly move to a gas flow channel through a gas-liquid interface and gas-liquid separation is confirmed.

Still, an attempt thus to fully inhibit a reverse reaction of hydrogen and oxygen generated by the photocatalyst using the gas-liquid interface has not been made in the past.

The present invention has been accomplished in view of the above, and is to provide a technology to generate desired gases with good efficiency by the action of a photocatalyst irradiated with light.

(1) According to the present invention, there is provided a gas generating device for generating an oxygen gas and/or a hydrogen gas from an electrolytic solution containing water including: an anode electrode having a photocatalyst-containing layer containing a photocatalyst producing an oxygen gas from the electrolytic solution by a photocatalytic reaction; a cathode electrode producing a hydrogen gas from electrons and hydrogen ions generated in the electrolytic solution by the photocatalytic reaction at the photocatalyst-containing layer; a plurality of through holes formed on at least one of the anode electrode and cathode electrode, and allowing passage of the produced oxygen gas or hydrogen gas but preventing passage of the electrolytic solution; and a gas containing unit containing the oxygen gas or the hydrogen gas that has passed through the through holes.

According to the above invention, the oxygen gas generated at the anode electrode or the hydrogen gas generated at the cathode electrode passes through the through holes, and is recovered from the opposite side of the electrode. Accordingly, a reverse reaction to turn back into water molecules due to binding of oxygen and hydrogen does not take place, and the electrolytic solution is efficiently decomposed.

(2) In the present invention, the photocatalyst-containing layer may be a porous material having a plurality of holes, and the photocatalyst may be exposed to the holes.

(3) In the present invention, the holes may be exposed to the inner wall surface of the through holes mutually communicates with others of the holes.

(4) In the present invention, the holes exposed to the inner wall surface of the through holes may be mutually communicated with other holes.

(5) In the present invention, the plurality of through holes may be in regular arrangement on the anode electrode or the cathode electrode.

(6) In the present invention, the distance between the adjacent centroids of the through holes may be equal to or more than 0.1 µm and equal to or less than 800 µm.

(7) In the present invention, the distance between the adjacent centroids of the through holes and other adjacent through holes may be, in each of the through holes, equal to or more than 0.1 µm and equal to or less than 800 µm.

(8) In the present invention, the distance between the centroids may be equal to or more than 1.5 times and equal to or less than 5 times as compared to the aperture diameter of the through holes.

(9) In the present invention, the distance between the adjacent edges of the adjacent through holes may be equal to or more than 0.1 µm and equal to or less than 400 µm.

(10) In the present invention, the layer thickness of the photocatalyst-containing layer may be equal to or more than 0.25 µm and equal to or less than 100 µm.

(11) In the present invention, the device may be provided with a light receiving window allowing passage of excitation light of the photocatalyst to pass therethrough and irradiating the excitation light on the photocatalyst-containing layer.

(12) In the present invention, the anode electrode may have a base material supporting the photocatalyst-containing layer, and the base material may be composed of a material allowing passage of the excitation light.

(13) In the present invention, the light receiving window may be arranged on a side opposite to the photocatalyst-containing layer through the base material, and the excitation light may pass through the light receiving window, further pass through the base material and radiate on the photocatalyst-containing layer.

(14) In the present invention, the cathode electrode may be composed of a material allowing passage of the excitation light, the light receiving window may be arranged to face the cathode electrode, and the excitation light may pass through the light receiving window, may further pass through the cathode electrode and may radiate on the photocatalyst-containing layer.

(15) In the present invention, the cathode electrode and photocatalyst-containing layer of the anode electrode may be arranged to face each other.

(16) In the present invention, the photocatalyst-containing layer of the anode electrode may be formed at a position opposite to the through holes arranged on the cathode electrode.

(17) In the present invention, the cathode electrode may further have a promoter-containing layer producing a hydrogen gas by receiving the excitation light of the photocatalyst and producing the hydrogen gas, and the promoter-containing layer of the cathode electrode may be formed at a position opposite to the through holes arranged on the anode electrode.

(18) In the present invention, the through holes arranged on the cathode electrode or the anode electrode may be in a slit shape.

(19) In the present invention, both the cathode electrode and the anode electrode may have slit-shaped through holes, and the cathode electrode and the anode electrode are arranged to face each other so that the slit-shaped through holes of theirs are out of alignment with each other.

(20) In the present invention, a pair of electrodes consisting of the cathode electrode and the anode electrode are in parallel arrangement to each other at predetermined intervals and may have a curvable or bendable flexibility in a direction perpendicular to the plane.

(21) In the present invention, the cathode electrode may have a promoter-containing layer receiving the excitation light of the photocatalyst and producing the hydrogen gas, and an electron transport layer is provided between the photocatalyst-containing layer of the anode electrode and the promoter-containing layer of the cathode electrode, the electron transport layer being composed of a conductive material and allowing penetration of the electrolytic solution.

(22) In the present invention, the cathode electrode and the anode electrode may be supported by a common base material, and arranged side by side.

(23) In the present invention, the plurality of cathode electrodes and the plurality of anode electrodes may be arranged adjacent to each other.

(24) In the present invention, the device may have a first through hole formed on the anode electrode and allowing passage of the oxygen gas but preventing passage of the electrolytic solution, and a second through hole formed on the cathode electrode and allowing passage of the hydrogen gas but preventing passage of the electrolytic solution.

(25) In the present invention, the device may have a first gas containing unit of the gas containing unit formed on an aperture of the first through hole and holding the oxygen gas, and a second gas containing unit of the gas containing unit formed on an aperture of the second through hole and holding the hydrogen gas.

(26) In the present invention, the cathode electrode may have a promoter-containing layer receiving the excitation light of the photocatalyst and producing the hydrogen, the photocatalyst-containing layer may be arranged in the vicinity of the first through hole, and the promoter-containing layer may be arranged in the vicinity of the second through hole.

(27) In the present invention, the photocatalyst-containing layer may be arranged in a ring shape in the peripheral portion of the aperture of the first through hole, and the promoter-containing layer may be arranged in a ring shape in the peripheral portion of the aperture of the second through hole.

(28) In the present invention, the cathode electrode and the anode electrode may be arranged adjacent to each other side by side through an electrically insulating material, and the adjacent interval between the cathode electrode and the anode electrode may be equal to or more than 0.01 μm.

(29) In the present invention, the device may have a light receiving window allowing passage of the excitation light of the photocatalyst and irradiating the excitation light on the photocatalyst-containing layer, wherein the light receiving window may be arranged at a position opposite to both the photocatalyst-containing layer and the promoter-containing layer, and the excitation light may pass through the light receiving window and may radiate on the photocatalyst-containing layer and the promoter-containing layer.

(30) In the present invention, the anode electrode and cathode electrode are each composed of a material allowing passage of the excitation light of the photocatalyst, the light receiving window may allow passage of the excitation light and irradiating the light on the photocatalyst-containing layer and may be arranged to face the anode electrode and cathode electrode on a side opposite to the photocatalyst-containing layer and the promoter-containing layer, and the excitation light may pass through the light receiving window, may further pass through the anode electrode and the cathode electrode and may radiate on the photocatalyst-containing layer and the promoter-containing layer.

(31) In the present invention, at least one of the photocatalyst-containing layer and the promoter-containing layer may be arranged at a tilt with respect to the base material.

(32) In the present invention, the photocatalyst-containing layer or the promoter-containing layer may have a convex portion protruding from the base material.

(33) In the present invention, the convex portion may form a box shape having a pair of vertical faces opposing to each other.

(34) In the present invention, the gas containing unit may be formed inside the convex portion.

(35) In the present invention, the inner wall surface of the through holes may be subjected to a hydrophobic treatment.

(36) In the present invention, the photocatalyst-containing layer and the cathode electrode may be lyophilic with respect to the electrolytic solution.

(37) In the present invention, the back side of the anode electrode or the cathode electrode has the gas containing unit and is lyophobic with respect to the electrolytic solution.

(38) In the present invention, the device may further have an electrolytic solution store unit storing the electrolytic solution to bring the anode electrode and the cathode electrode into contact with the electrolytic solution, an electrolytic solution supply tube supplying the electrolytic solution to the electrolytic solution store unit, and an electrolytic solution discharge tube for discharging the electrolytic solution fed for a catalytic reaction from the electrolytic solution store unit.

(39) In the present invention, the photocatalyst contained in the photocatalyst-containing layer may be at least one kind selected from the group consisting of oxides such as titanium oxide, vanadium oxide, nickel oxide, zinc oxide, gallium oxide, zirconium oxide, niobium oxide, molybdenum oxide, tantalum oxide, tungsten oxide, gallium oxide, germanium oxide, indium oxide, tin oxide, antinomy oxide, lead oxide, bismuth oxide and the like, and nitrides and sulfides of them.

(40) In the present invention, the promoter contained in the promoter-containing layer may be at least one kind selected from the group consisting of platinum, nickel, ruthenium, nickel oxide and ruthenium oxide.

(41) In the present invention, the device may further have a light source irradiating the excitation light.

(42) According to the present invention, there is provided a method for generating an oxygen gas and/or a hydrogen gas from an electrolytic solution containing water, including: bringing the electrolytic solution into contact with an anode electrode and a cathode electrode, the anode electrode having a photocatalyst-containing layer containing a photocatalyst producing an oxygen gas from the electrolytic solution by a photocatalytic reaction, the cathode electrode producing a hydrogen gas from electrons and hydrogen ions generated in the electrolytic solution by the photocatalytic reaction at the photocatalyst-containing layer; irradiating excitation light of the photocatalyst on the photocatalyst-containing layer; and collecting at least one of the oxygen gas generated at the anode electrode or the hydrogen gas generated at the cathode electrode via a plurality of through holes arranged on the anode electrode or cathode electrode.

(43) In the present invention, the photocatalyst-containing layer may be a porous material having a plurality of holes to which the photocatalyst is exposed, and the oxygen gas or the hydrogen gas is generated inside the holes and may be collected via the through holes.

(44) In the present invention, the oxygen gas or the hydrogen gas generated inside the holes may be collected by the through holes via others of the holes exposed to the inner wall surface of the through holes.

(45) In the present invention, the anode electrode may have a base material supporting the photocatalyst-containing layer; the base material may be composed of a material allowing passage of the excitation light; and the excitation light may pass through the base material and may radiate on the photocatalyst-containing layer.

(46) In the present invention, the cathode electrode may be composed of a material allowing passage of the excitation light; and the excitation light may pass through the cathode electrode and may radiate on the photocatalyst-containing layer.

(47) In the present invention, the cathode electrode may have a promoter-containing layer receiving the excitation light and producing the hydrogen gas; and the excitation light may be reflected by the anode electrode or the cathode electrode and may radiate on the other photocatalyst-containing layer of the anode electrode or the other promoter-containing layer of the cathode electrode.

(48) In the present invention, the cathode electrode may have a promoter-containing layer receiving the excitation light and producing the hydrogen gas; and the excitation light may pass through the through holes arranged on the anode electrode or the cathode electrode and may radiate on the other promoter-containing layer of the cathode electrode or the other photocatalyst-containing layer of the anode electrode.

According to the present invention, it is possible to provide a gas generating device and a method for generating a gas capable of producing a hydrogen gas, an oxygen gas, a mixed gas of them or the like with good efficiency by photocatalytic decomposition using sunlight or the like. Furthermore, an expensive material is not required for an electrode to be used for the present invention, and it is possible to reduce the cost involved in production of a gas generating device and the gas.

BRIEF DESCRIPTION OF THE DRAWINGS

FIG. 1 is a general schematic view of a conventional device for carrying out water electrolysis by irradiation with the light on the anode electrode.

FIG. 8A is a schematic view illustrating characteristics resulting from the structures of a photocatalyst-containing layer and a promoter layer, and each of through holes, while

FIG. 10A illustrates the movement of the electron from an anode electrode to a cathode electrode through a lead wire. FIG. 10B illustrates the movement of the electron from the anode electrode to the cathode electrode through a mesh-shaped conductive material arranged between the anode electrode and cathode electrode.

FIG. 11A is a sectional side view of a photocatalyst cell (anode cell), while

FIG. 13 is a plan view illustrating an example of a hole processing unit formed on an anode electrode.

FIG. 14A is a sectional side view of a promoter cell (cathode cell), while

FIG. 15 is a sectional side view of a gas generating device according to a first embodiment.

FIG. 16 is a front view of the gas generating device according to the first embodiment illustrated in FIG. 15.

FIG. 17 is a sectional side view of a gas generating device according to a second embodiment.

FIG. 30A is a sectional side view of a gas generating device equipped with an anode-cathode integrated electrode according to a ninth embodiment, while

FIG. 33A is a top view of a gas generating device cut in the horizontal direction in a gas generating device equipped with an anode-cathode integrated electrode used according to an eleventh embodiment, while

FIG. 35A is a side view of a ridge type gas generating device according to a twelfth embodiment, while

FIG. 36A is a plan view of the ridge type gas generating device according to the twelfth embodiment, while

DESCRIPTION OF EMBODIMENTS

Figure 2A:
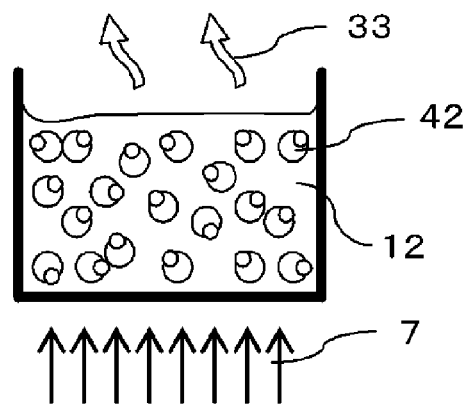
FIGS. 2A and 2B are each a view illustrating a state in which ultraviolet light radiates on the electrolytic solution.
Figure 2B:
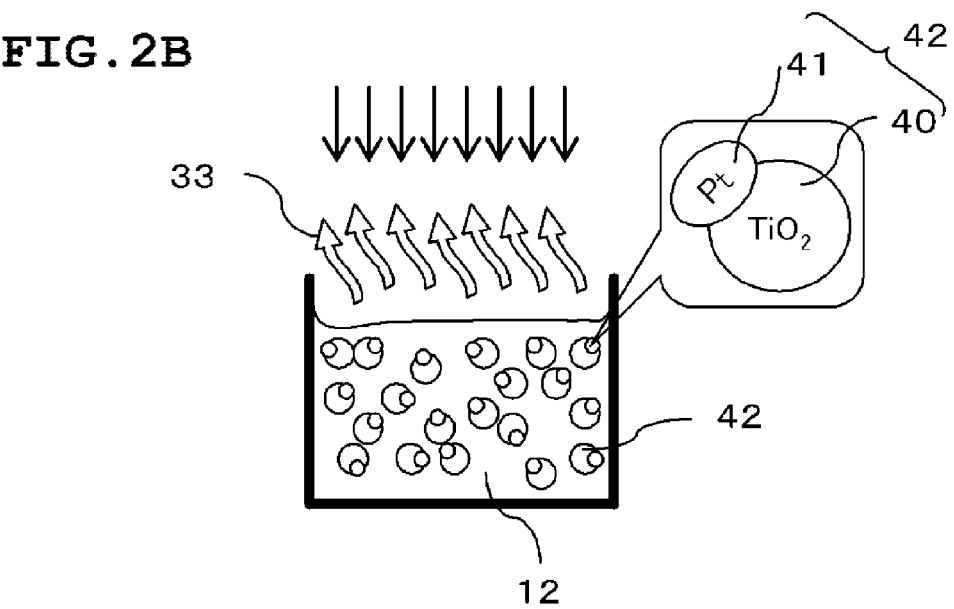
Figure 3:
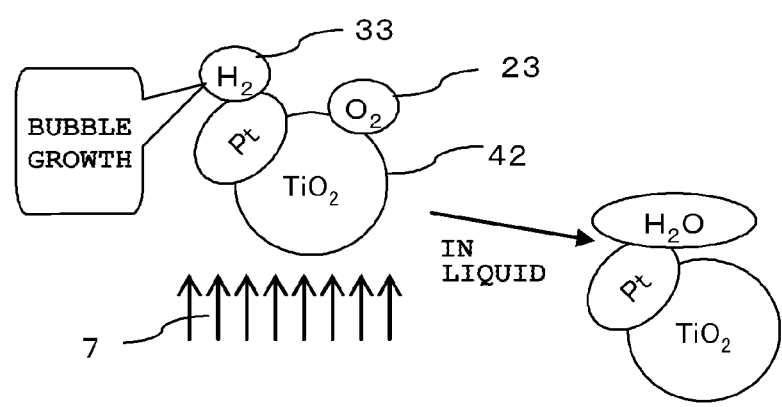
FIG. 3 is a view illustrating a state in which hydrogen gas bubbles and oxygen gas bubbles are bound to each other.
Figure 4:
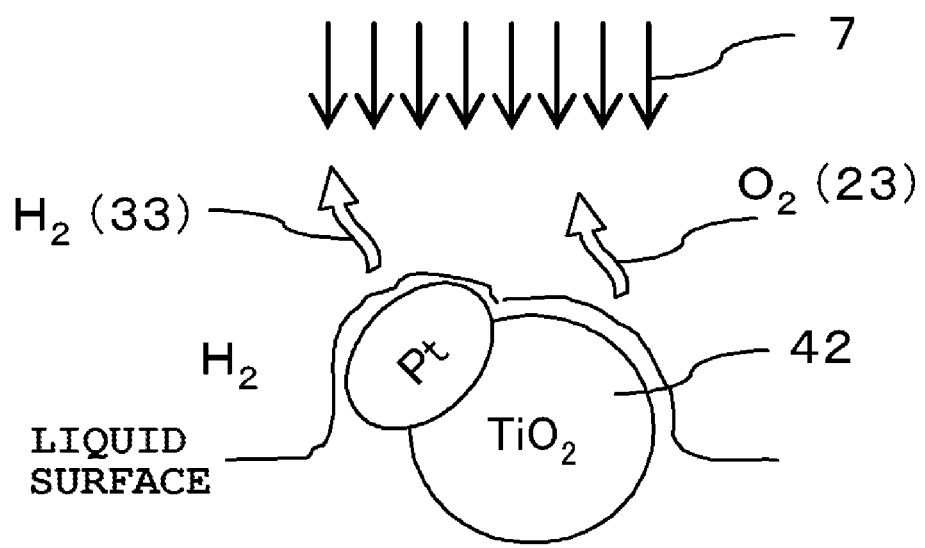
FIG. 4 is a view illustrating a state in which a photocatalyst surface is covered with a liquid film layer.

Hereinafter, embodiments of the present invention will be illustrated with reference to the drawings. Incidentally, in all drawings, the same components are assigned the same reference numerals and appropriate explanations thereof will not be repeated.

A gas generating device of this embodiment is a device for generating an oxygen gas and/or a hydrogen gas from an electrolytic solution containing water. The gas generating device of this embodiment is provided with an anode electrode, a cathode electrode, a plurality of through holes and a gas containing unit.

The anode electrode (photocatalyst-supporting electrode) has a photocatalyst-containing layer containing a photocatalyst producing an oxygen gas from the electrolytic solution by a photocatalytic reaction. The cathode electrode produces a hydrogen gas from electrons and hydrogen ions generated in the electrolytic solution by the photocatalytic reaction at the photocatalyst-containing layer. The through holes (first and/or second through holes) are formed on at least one of the anode electrode and cathode electrode, and allow passage of the produced oxygen gas or hydrogen gas but prevent passage of the electrolytic solution. The gas containing unit (first and/or second gas containing units) contains the oxygen gas or the hydrogen gas that has passed through the through holes.

FIGS. 5A to 5D are each a schematic view illustrating a fundamental concept of a gas generating device 100 of this embodiment. The gas generating device 100 is provided with an anode electrode 2 and a cathode electrode 3. The anode electrode 2 is composed of a base material 25 and a photocatalyst-containing layer 27 arranged in lamination on one of main surfaces of the base material 25. The photocatalyst-containing layer 27 contains a photocatalyst producing an oxygen gas from an electrolytic solution 12 in an electrolytic bath 10 by a photocatalytic reaction.

The cathode electrode 3 produces a hydrogen gas in the electrolytic solution 12 from electrons and hydrogen ions that are generated by the photocatalytic reaction induced by light 7 at the photocatalyst-containing layer 27.

At least one of the anode electrode 2 and the cathode electrode 3 is provided with a plurality of through holes (first through holes 111 and/or second through holes 113). The through holes selectively allow passage of the gas (oxygen gas or hydrogen gas) produced on the surface side of the electrode by irradiation with excitation light on the photocatalyst and allow the gas to pass to the back side, but prevent passage of the electrolytic solution 12.

The cathode electrode 3 of this embodiment is provided with a promoter-containing layer 43 receiving excitation light of the photocatalyst and producing a hydrogen gas. The photocatalyst-containing layer 27 is arranged in the vicinity of the first through holes 111, while the promoter-containing layer 43 is arranged in the vicinity of the second through holes 113.

The gas generating device 100 is provided with the gas containing unit (first gas containing unit 21 and/or second gas containing unit 31) surrounding the rear surface in which the through holes are opened.

Namely, the gas generating device 100 is provided with the first through holes (first through holes 111) arranged in the anode electrode 2 and allowing passage of the oxygen gas but preventing passage of the electrolytic solution 12, and the second through holes (second through holes 113) arranged in the cathode electrode 3 and allowing passage of the hydrogen gas but preventing passage of the electrolytic solution 12.

The gas generating device 100 is provided with the first gas containing unit 21 arranged at the aperture of the first through hole 111 and holding the oxygen gas, and the second gas containing unit 31 arranged at the aperture of the second through hole 113 and holding the hydrogen gas.

The gas generating device 100 is further provided with a light receiving window allowing passage of excitation light of the photocatalyst and irradiating the excitation light on the photocatalyst-containing layer.

The present invention will be described in detail using FIG. 5A. The figure is a side view of the gas generating device 100.

The light 7 (ultraviolet light or visible light) passes through the light receiving window 4 and the electrolytic bath 10, radiates on the photocatalyst-containing layer 27, and thus the photocatalytic reaction takes place to form oxygen and proton in the electrolytic solution. The thus-formed proton is finally converted into hydrogen on the surface of the promoter-containing layer 43.

When the proton is converted into hydrogen, an electron is needed as well. There are several ways of supplying the electron and typical examples will be described in FIGS. 10A and 10B later. The protons flow in the electrolytic solution from the photocatalyst-containing layer 27 and reach the promoter-containing layer 43. Accordingly, it is preferable that the flowing distance of the proton is short. What is important in FIG. 5A is that oxygen and hydrogen produced at the photocatalyst-containing layer 27 and the promoter-containing layer 43 are prevented from binding to each other, and in other words, oxygen and hydrogen are separated by means of through holes 111 and 113 for gas-liquid separation and lose an opportunity to bind them before the oxygen and hydrogen are bound and reacted to turn back into water, and thus the hydrogen is collected with good efficiency. The light 7 optionally radiates on the cathode electrode 3 containing the promoter-containing layer 43.

Figure 5A:
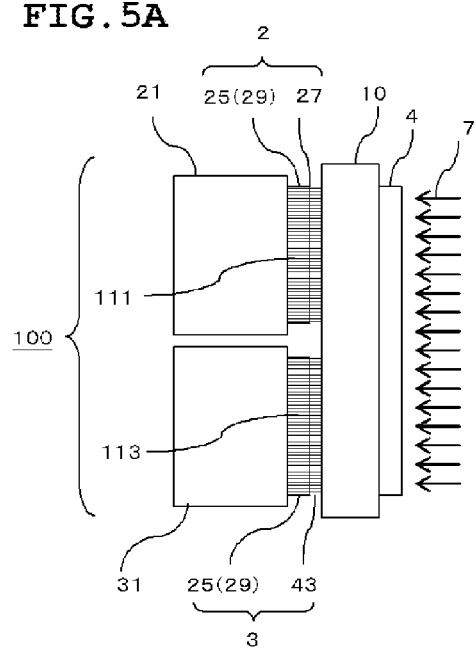
FIGS. 5A to 5D are each a schematic view illustrating a fundamental concept of a gas generating device according to an embodiment.

The light receiving window 4 illustrated in FIG. 5A is arranged on the same side as the photocatalyst-containing layer 27 with respect to the base material 25. In other words, the light 7 radiates on the photocatalyst-containing layer 27 without passing through the base material 25. Thus, either a light-transmitting material or a non-light-transmitting material may be used for the base material 25. In the figure, a non-light-transmitting base material 29 is exemplified.

Figure 5B:
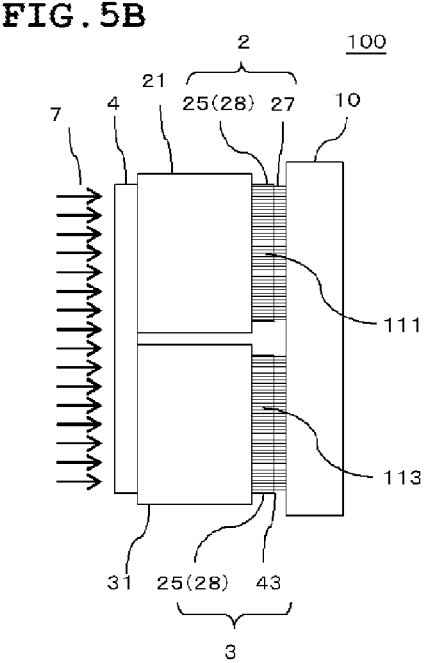

FIG. 5B is almost the same as FIG. 5A, but the irradiation direction of the light 7 is reversed. The anode electrode 2 is provided with the base material 25 supporting the photocatalyst-containing layer 27. The base material 25 is composed of a light-transmitting material (light-transmitting base material 28) allowing passage of the excitation light 7. Furthermore, the material constituting the first gas containing unit 21 is also light-transmitting.

The second gas containing unit 31 arranged between the promoter-containing layer 43 and the light receiving window 4 is also composed of a light-transmitting material.

Thus, the excitation light 7 that has passed through the light receiving window 4 is incident upon the base material 25 (light-transmitting base material 28) through the first gas containing unit 21 or the second gas containing unit 31, and further passes through the base material 25 to reach the photocatalyst-containing layer 27 or the promoter-containing layer 43, thus exerting an electrolytic action with respect to the electrolytic solution 12 stored in the electrolytic bath 10.

Figure 5C:
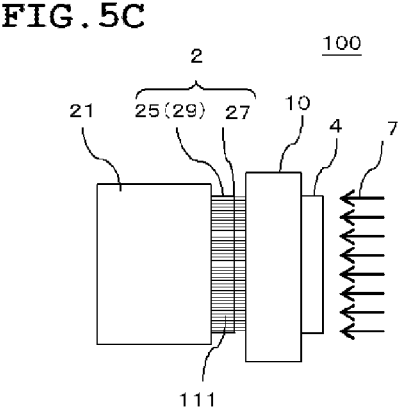

FIG. 5C is a photocatalyst cell (anode cell) of the anode electrode 2 alone having the photocatalyst-containing layer 27 illustrated in FIG. 5A. For example, the anode electrode 2 is placed in this photocatalyst cell and a platinum plate may be used as the cathode electrode instead in this structure, which is the same as the structure illustrated in FIG. 15 to be described below.

Figure 5D:
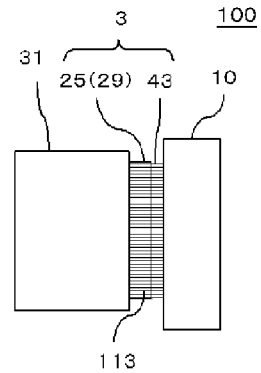

FIG. 5D is a promoter cell (cathode cell) of the cathode electrode 3 alone having the promoter-containing layer 43 illustrated in FIG. 5A. For example, the cathode electrode 3 may be placed in this promoter cell in this structure, which is the same as the structure illustrated in FIG. 17 to be described below.

The Young-Laplace pressure acting on the through holes in contact with the electrolytic solution 12 will be described.

Figure 6A:
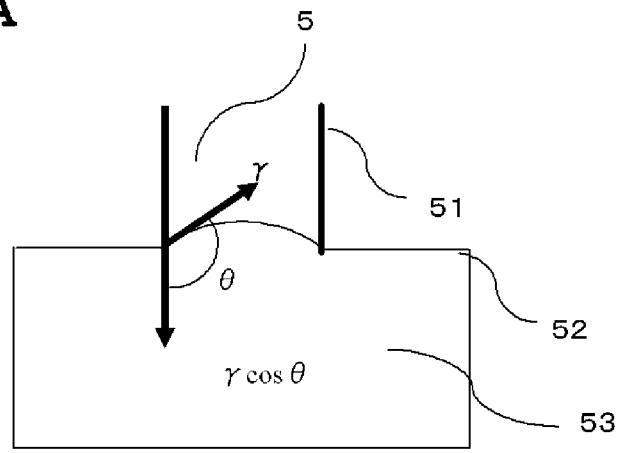
FIGS. 6A to 6C are each a view illustrating the Young-Laplace equation.
Figure 6B:
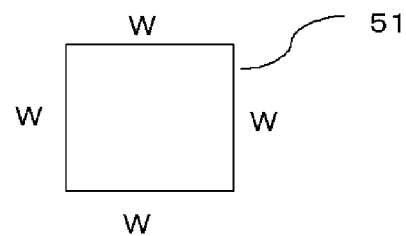
Figure 6C:
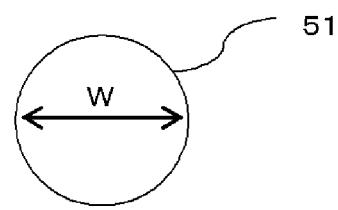

FIG. 6A is a view illustrating the Young-Laplace equation and describes a formation mechanism of a gas-liquid interface 52 of the gas phase and the electrolytic solution 12 in the through hole 111. FIG. 6B illustrates an aperture 51 of the through hole 111 of a rectangular shape, while FIG. 6C illustrates an aperture 51 of the through hole 111 of a substantially circular shape.

The Young-Laplace equation is defined as the following equation (1):

$$\Delta P(=P1-P2) \leq -4\gamma \cos \theta / W = \Delta p \quad (1)$$

In the above equation (1), $\Delta p$ represents the Young-Laplace pressure, $\gamma$ represents the surface tension of the electrolytic solution 12, $\theta$ represents the contact angle of the electrolytic solution 12 and the wall surface of the through hole 111 (or through hole 113), and W represents the diameter of the aperture 51 of the through hole 111. P1 and P2 are respectively the pressure of the liquid phase and the pressure of the gas phase.

As shown in FIG. 6A, the force necessary to broaden the electrolytic solution 12 in contact with the contact angle $\theta$ in the depth direction of the through hole 111 becomes $-\gamma \cos \theta$. As shown in FIG. 6B, when the aperture 51 of the through hole 111 is a rectangle of W×W, the surface tension is applied to a surface in contact with the electrolytic solution 12. That is, the force necessary to push the electrolytic solution 12 to the through hole 111 at this time becomes $-4W\gamma \cos \theta$. Division of this by the area of the through hole 111 ($W^2$) leads to conversion of it into the pressure, leading to the Young-Laplace equation of the above equation (1).

As shown in FIG. 6D in the same manner, when the aperture 51 of the through hole 111 has a circular shape of a diameter W, the force necessary to push the electrolytic solution 12 to the depth direction of the through hole 111 becomes $-\pi W \gamma \cos \theta$. Division of this by the area of the through hole 111 ($\pi^* W^2/4$) leads to conversion of it into the pressure, also leading to the Young-Laplace equation of the above equation (1).

Incidentally, like the slit type through holes, the Young-Laplace pressure $\Delta p$ when one side L is longer by far than the other side W (L>>W) may be represented by the following equation (2) similar to the equation (1).

$$\Delta p = -2\gamma \cos \theta / W \quad (2)$$

When the through hole is in a slit shape, the width of its aperture (corresponding to W) is equal to or less than 1,000 μm, preferably equal to or less than 500 μm, further preferably equal to or less than 100 μm, and most preferably equal to or less than 50 μm. The aperture width of the through hole is more preferably small as long as the generated gas can pass through the hole. As in the equation (1), a smaller width W tends to make the Young-Laplace pressure higher. The higher Young-Laplace pressure makes the force to suppress penetration of the electrolytic solution 12 stronger.

When the surface tension of the electrolytic solution mainly composed of water is 70 [mN/m], and the contact angle of the electrolytic solution 12 and the inner wall surface of the through hole 111 is 110 degrees, the size of the Young-Laplace pressure $\Delta p$ with respect to the assumed aperture width W is as follows.

$\Delta p$=96 Pa=0.9 cm-water column in W=1,000 μm
$\Delta p$=193 Pa=1.9 cm-water column in W=500 μm
$\Delta p$=957 Pa=9.6 cm-water column in W=100 μm
$\Delta p$=1914 Pa=19.2 cm-water column in W=50 μm This result shows the limitation of the aperture width W of the extensible anode electrode 2, in case of a vertical gas generating device 100 with the anode electrode 2 arranged in the vertical direction. On the other hand, this result shows the height limit from the upper surface of the anode electrode 2 arranged above the cathode electrode 3 to the electrolytic solution surface, in case of a horizontal gas generating device 100 with the anode electrode 2 arranged in the horizontal direction. Decrease in the aperture width W of the through hole 111 leads to improvement of freedom of design and improvement of the operational stability of the anode electrode 2.

Figure 7:
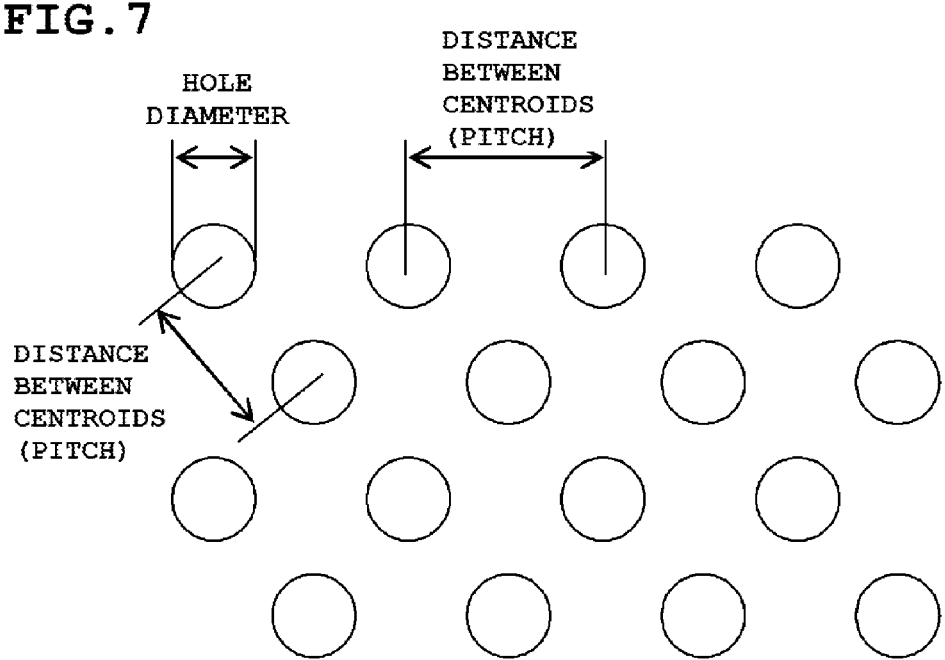
FIG. 7 is a plan view illustrating an example of a hole processing unit formed on an anode electrode.

FIG. 7 is a plan view illustrating a state in which the through holes 111 and 113 are formed, and illustrates the relationship between the diameter and pitch of the through holes. The pitch of the through hole is the distance between centers (centroids) of adjacent holes.

In this embodiment, a plurality of through holes 111 and 113 are in regular arrangement on the anode electrode 2 or the cathode electrode 3. FIG. 7 illustrates through holes arranged in a staggered grid shape, and the pitches between a through hole with a hole diameter described in the figure, a lateral through hole adjacent to the above through hole, and a through hole at a 60 degree-inclined position are the same. The through holes 111 and 113 may be arranged in a tetragonal lattice shape or a rhombic lattice shape in place of the staggered grid shape.

The distance between centroids of adjacent through holes 111 and 113 is preferably equal to or more than 0.1 μm and equal to or less than 800 μm. The formation of the through holes 111 and 113 having the distance with other adjacent through holes in this range enables the gas (oxygen gas or hydrogen gas) generated by the photocatalytic reaction to be collected with a high yield.

In the gas generating device 100 of this embodiment, the distance between centroids of all through holes 111 and 113 and other adjacent through holes is preferably equal to or more than 0.1 μm and equal to or less than 800 μm. Accordingly, the yield of the gas is excellent regardless of location of the anode electrode 2 or the cathode electrode 3.

The distance between centroids of adjacent through holes 111 and 113 is preferably equal to or more than 1.5 times and equal to or less than 5 times as compared to the aperture diameter of the through holes 111 and 113. As described below, the movement distance of generated holes and electrons is preferably as short as possible, and a gas is efficiently generated when the hole pitch interval is within the above range.

Meanwhile, the aperture diameter of the through holes 111 and 113 is preferably equal to or less than 300 μm and more preferably equal to or less than 100 μm. As described above, since a smaller hole diameter facilitates prevention of the leakage of the electrolytic solution based on the Young-Laplace pressure, holes can selectively allow passage of only the gas but prevent passage of the electrolytic solution when the hole diameter is within the above range.

Accordingly, when all these conditions (hole diameter, hole pitch interval) are satisfied, a gas can be efficiently generated on the surface of the catalyst layer (photocatalyst-containing layer 27 and promoter-containing layer 43), and the generated gas further efficiently moves to the back side via the through holes 111 and 113. Namely, the generated gas is not attached to the surface of the catalyst layer and does not suppress subsequent generation of the gas, so that the desired gas may be efficiently generated from the electrolytic solution and the generated gas is further excellent in separation and recovery as well.

Figure 8A:
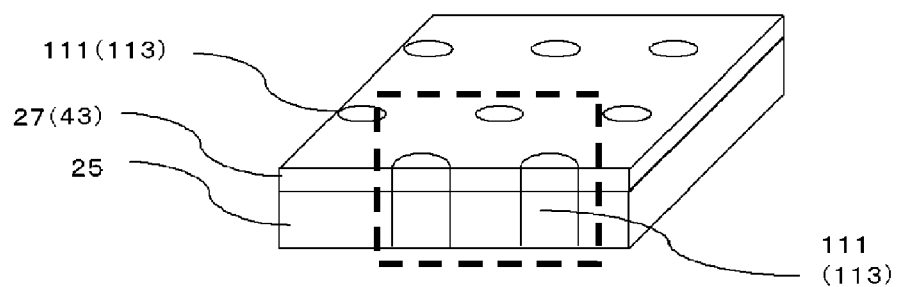
Figure 8B:
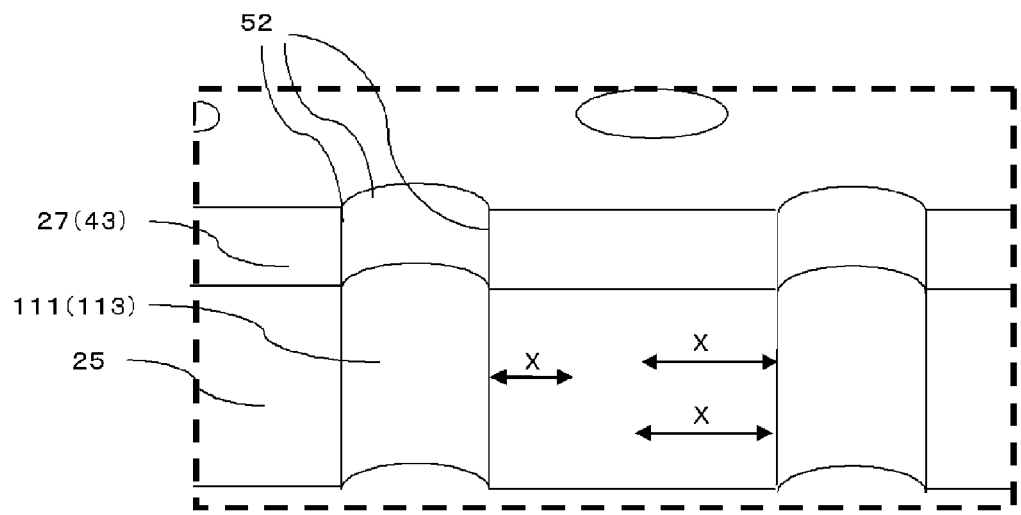
FIG. 8B is an enlarged view. The symbol X indicates a point of generating an oxygen molecule, while the arrow indicates the shortest distance from the generation point X to a through hole, that is, the interface-reaction point distance.

FIG. 8A is a schematic view illustrating characteristics resulting from the structures of the photocatalyst-containing layer 27 and the promoter-containing layer 43, and each of the through holes (first through hole 111 and second through hole 113). FIG. 8B is an enlarged view.

The photocatalyst-containing layer 27 (promoter-containing layer 43) is a porous material having a plurality of holes, and the photocatalyst (promoter) is exposed to the holes. The photocatalyst-containing layer 27 and the promoter-containing layer 43 are substantially only composed of a photocatalyst and a promoter.

The holes in the photocatalyst-containing layer 27 (promoter-containing layer 43) are exposed to the inner wall surface of the through holes 111 and 113. That is, the plurality of holes composed of a photocatalyst or a promoter are open on the inner wall surface of the through holes 111 and 113 of the anode electrode 2 and the cathode electrode 3.

Furthermore, the holes in the photocatalyst-containing layer 27 (promoter-containing layer 43) exposed to the inner wall surface of the through holes 111 and 113 mutually communicates with others of the holes. In other words, the photocatalyst-containing layer 27 and the promoter-containing layer 43 are each composed of a continuous bubble type porous material. Accordingly, the gas generated in the electrolytic solution 12 impregnated in the thickness direction with respect to the photocatalyst-containing layer 27 (promoter-containing layer 43) reaches adjacent through holes 111 and 113 via the holes. The electrolytic solution 12 of equal to or less than the Young-Laplace pressure does not penetrate into the through holes 111 and 113, and the vicinity of the aperture of the through holes 111 and 113 becomes a gas-liquid interface between the electrolytic solution 12 and the gas. Accordingly, the gas generated inside the photocatalyst-containing layer 27 (promoter-containing layer 43) reaches the through holes 111 and 113, and is separated from the electrolytic solution 12 to become bubbles and collected at a side opposite to the anode electrode 2 (cathode electrode 3).

Namely, at a position indicated by the point X in FIG. 8B, in the photocatalyst-containing layer 27 into which the electrolytic solution 12 is permeated or in the photocatalyst-containing layer 27 in contact with the electrolytic solution 12, a light-stimulated reaction takes place by irradiation with light, electrons and holes are generated, and then oxygen molecules and protons are generated as illustrated in the above-mentioned Formula 101. The oxygen molecules are finally bound to form bubbles, but in the early stage of production, are dissolved in the electrolytic solution as molecules. The oxygen molecules generated at the point X float by diffusion in the photocatalyst-containing layer 27 and the electrolytic solution 12, but then reach the gas-liquid interface 52 formed by the through hole 111 and the electrolytic solution 12, and become molecules constituting an oxygen gas so as to be incorporated into the gas. In this manner, the oxygen molecules are collected as an oxygen gas.

On the other hand, a proton can be converted into a hydrogen molecule only after it meets an electron. In addition to the presence of electron, the presence of the promoter as shown in the above-mentioned Formula 102 is essential to conversion of a proton into a hydrogen molecule. Accordingly, the conversion of protons into hydrogen molecules requires the protons, which are diffused in the photocatalyst-containing layer 27 and melted in the electrolytic solution 12, to reach the promoter-containing layer 43.

Conversely, when the through holes 111 are not formed on the photocatalyst-containing layer 27, the oxygen molecules formed in the photocatalyst-containing layer 27 reach the promoter-containing layer 43 by the movement due to diffusion in the same manner as in protons, and the oxygen molecules unable to form bubbles disappear along with protons by the reverse reaction to turn back into water.

Accordingly, the presence of the gas-liquid interface 52 formed by the through holes 111 and being just close to the photocatalyst-containing layer 27 in the present embodiment enables the produced oxygen molecules to be gasified after the molecules penetrate into the electrolytic solution 12 and reach by diffusion the gas-liquid interface formed by the through holes, or the produced oxygen molecules to become oxygen bubbles followed by separation and collection. Thus, a reverse reaction to turn back into water is inhibited and as a result, the efficiency of collection of hydrogen improves.

The through holes 113 formed on the promoter-containing layer promote separation and collection of hydrogen from the gas-liquid interface. Accordingly, the efficiency of collection of hydrogen improves in the same manner as in the process of separation and collection of oxygen.

It is preferable that the distance between the gas-liquid interface 52 formed by the through holes 111 and 113 formed on the photocatalyst-containing layer 27 and the promoter-containing layer 43, and the point of generating an oxygen molecule and a proton, or the point of generating a hydrogen molecule, is short. The distance is referred to as the interface-reaction point distance hereinafter. The interface-reaction point distance is a distance necessary to make the gas-liquid separation process effective. Experiments have been repeatedly carried out in a system which is different in the diameter of the through holes and the pitch distance and as a result, it becomes clear that the interface-reaction point distance is preferably within 400 µm.

Accordingly, the distance between adjacent edges of adjacent through holes 111 and 113 is preferably equal to or more than 0.1 µm and equal to or less than 400 µm. Thus, even when a position farthest from the through holes 111 and 113, that is, a middle position between the through holes 111 and 113, is a point of generating a proton, the interface-reaction point distance may be equal to or less than 400 µm.

The distance between centroids of adjacent through holes 111 and 113 is further preferably equal to or less than 100 µm. When the distance between adjacent through holes is in this range, the interface-reaction point distance may well be decreased.

It is preferable that the inner wall surface of the through holes 111 and 113 is subjected to a hydrophobic treatment.

In the same manner, it is preferable that the back side of the anode electrode 2 or the cathode electrode 3 having gas containing units 21 and 31 is lyophobic with respect to the electrolytic solution 12.

Accordingly, penetration of the electrolytic solution 12 into the through holes 111 and 113 is suppressed and almost the entire inside of the through holes 111 and 113 becomes a gas phase, and the gas-liquid interface 52 is formed in the vicinity of the aperture of the through holes 111 and 113. The gas generated in the vicinity of the surface of the anode electrode 2 or the cathode electrode 3 in addition to the inside of them also reaches the through holes 111 and 113, and is thus immediately gasified (gas phase) and collected.

It is preferable that the photocatalyst-containing layer 27 and the cathode electrode 3 are lyophilic with respect to the electrolytic solution 12. Thus, the electrolytic solution 12 is well come into contact with the photocatalyst-containing layer 27 and the cathode electrode 3 (promoter-containing layer 43) and the photocatalytic reaction takes place.

A method for generating a gas (hereinafter, referred to as the present method in some cases) according to the present embodiment will be described.

The present method is to generate an oxygen gas and/or a hydrogen gas from an electrolytic solution containing water.

The present method includes a liquid contact step, an irradiation step and a collection step.

In the liquid contact step, the electrolytic solution is brought into contact with the anode electrode 2 having the photocatalyst-containing layer 27 containing a photocatalyst producing an oxygen gas from the electrolytic solution by the photocatalytic reaction and the cathode electrode 3 producing a hydrogen gas from electrons and hydrogen ions generated in the electrolytic solution by the photocatalytic reaction at the photocatalyst-containing layer 27.

In the irradiation step, the excitation light of the photocatalyst is irradiated on the photocatalyst-containing layer 27.

In the collection step, at least one of the oxygen gas generated at the anode electrode 2 and the hydrogen gas generated at the cathode electrode 3 is collected via the plurality of through holes 111 and 113 arranged on the anode electrode 2 or the cathode electrode 3.

As described above, the photocatalyst-containing layer 27 is a porous material containing the plurality of holes to which the photocatalyst is exposed, and the oxygen gas or the hydrogen gas generated inside the holes is collected via the through holes 111 and 113.

The oxygen gas or the hydrogen gas generated inside the holes is collected by the through holes via others of the holes exposed to the inner wall surface of the through holes 111 and 113.

FIGS. 9A to 9D are schematic views illustrating a fundamental construction of a face-to-face type gas generating device in which an anode electrode 2 and a cathode electrode 3 are arranged to face each other. The cathode electrode 3 and a photocatalyst-containing layer 27 of the anode electrode 2 are arranged to face each other.

Figure 9A:
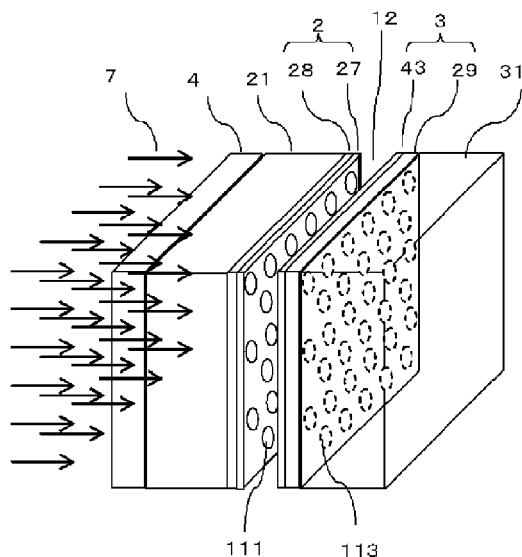
FIGS. 9A to 9D are each a schematic view illustrating a fundamental construction of a face-to-face type gas generating device.
Figure 9B:
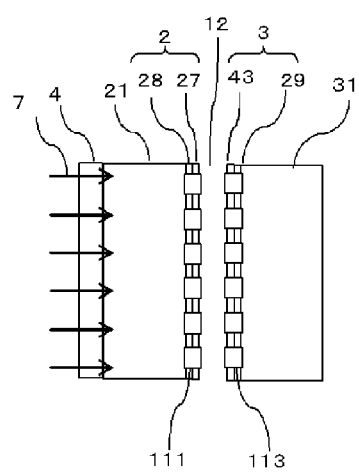

FIG. 9A is a perspective view and FIG. 9B is a sectional side view. In the figures, light 7 radiates from the back of the photocatalyst-containing layer 27. The light 7 passes through a light receiving window 4, a first gas containing unit 21 and a light-transmitting base material 28, and radiates on the photocatalyst-containing layer 27.

Figure 9C:
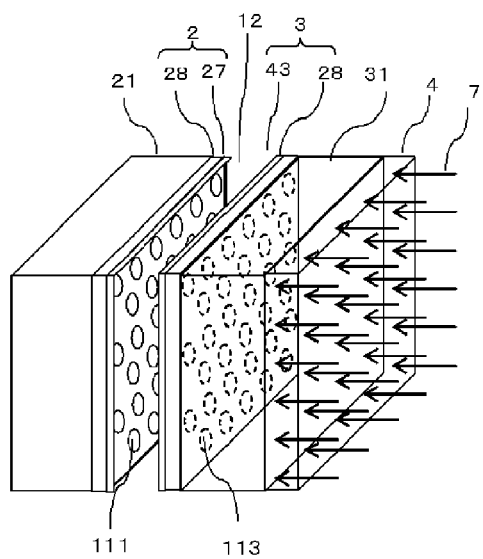
Figure 9D:
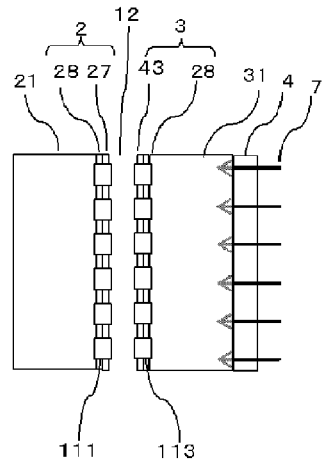

On the other hand, FIGS. 9C and 9D are each a view illustrating a fundamental construction of a face-to-face type gas generating device in the same manner. These figures are each a perspective view and a sectional side view. An irradiation direction of the light 7 is contrary to that of FIGS. 9A and 9B. That is, the light 7 radiates from the back of the promoter-containing layer 43.

The cathode electrode 3 is composed of a material allowing passage of the excitation light 7. The light receiving window 4 is arranged to face the cathode electrode 3, and the excitation light 7 that has passed through the light receiving window 4 further passes through the cathode electrode 3 and radiates on the photocatalyst-containing layer 27. In this case, it is necessary that the promoter-containing layer 43 is light-transmitting, and has a layer thickness of preferably equal to or more than 10 nm and equal to or less than 200 nm, and further preferably equal to or more than 30 nm and equal to or less than 150 nm. It is preferable that the base material constituting the cathode electrode 3 is also light-transmitting, and the light-transmitting base material 28 may be used.

The light receiving window 4 illustrated in FIGS. 9A and 9B is arranged at a side opposite to the photocatalyst-containing layer 27 through the light-transmitting base material 28. The excitation light that has passed through the light receiving window 4 further passes through the light-transmitting base material 28 and radiates on the photocatalyst-containing layer 27.

The face-to-face type gas generating device illustrated in FIGS. 9A to 9D has advantages such that the structure is simple, and the distance between the anode electrode 2 and the cathode electrode 3 may be made as narrow as possible. This results in the decrease in the movement distance of protons and the improvement in efficiency of collection of hydrogen.

The anode electrode 2 is provided with a base material (light-transmitting base material 28) supporting the photocatalyst-containing layer 27. The light-transmitting base material 28 is composed of a material allowing passage of the excitation light 7. In the irradiation step illustrated in FIGS. 9A and 9B, the excitation light 7 that has passed through the light-transmitting base material 28 radiates on the photocatalyst-containing layer 27.

The cathode electrode 3 is composed of a material allowing passage of the excitation light 7. In the irradiation step illustrated in FIGS. 9C and 9D, the excitation light 7 that has passed through the cathode electrode 3 radiates on the photocatalyst-containing layer 27.

Figure 10A:
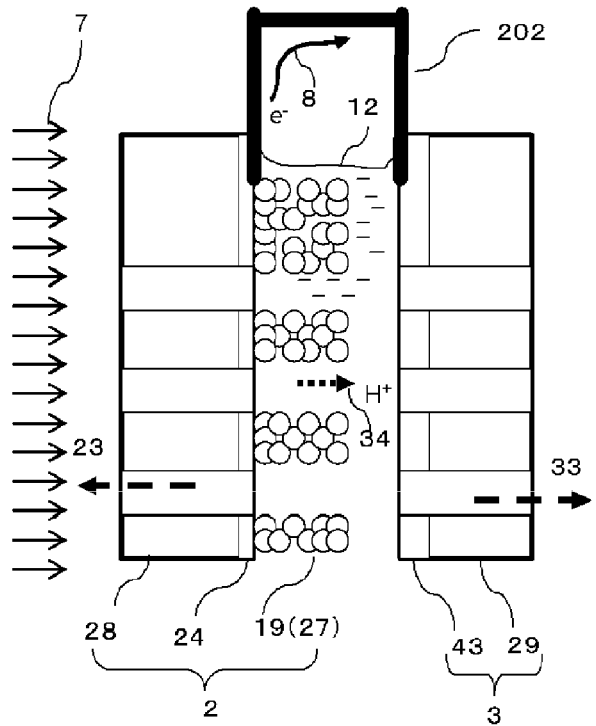
FIGS. 10A and 10B are each a view illustrating the movement of a proton and an electron in a face-to-face type gas generating device.
Figure 10B:
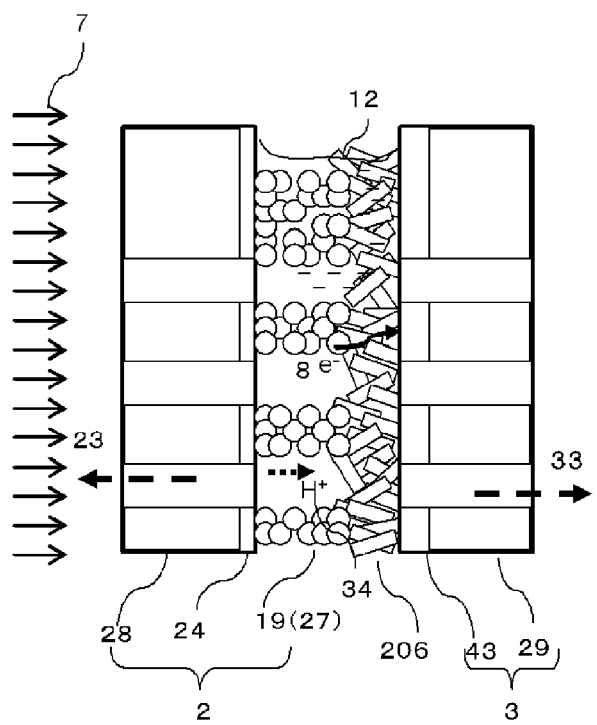

FIGS. 10A and 10B are views illustrating the movement of a proton and an electron produced at the photocatalyst-containing layer 27. Specifically, FIG. 10A illustrates a state in which the cathode electrode 3 and the anode electrode 2 are bound by means of a lead wire 202 leading to the outside. An electron 8 ($e^-$) generated at the photocatalyst-containing layer 27 (titanium oxide layer 19) can be conveyed to the cathode electrode 3 through the lead wire 202 with good efficiency. A proton 34 ($H^+$) moves through the electrolytic solution 12 and reaches the promoter-containing layer 43 of the cathode electrode 3. An oxygen gas 23 produced in the same manner passes through the anode electrode 2 and is collected, while a hydrogen gas 33 passes through the cathode electrode 3 and is collected.

The mechanism of the photocatalytic reaction does not always require employment of the lead wire 202 leading to the outside. For example, a material having a structure excellent in electrical conductivity and substance transporting properties (diffusion properties), such as porous titanium 206 shown in FIG. 10B, may be sandwiched between the anode electrode 2 and the cathode electrode 3. This enables the electron generated at the anode electrode 2 by irradiation with the light 7 to be conveyed to the cathode electrode 3 without damaging production of the hydrogen gas and oxygen gas.

Namely, the cathode electrode 3 has the promoter-containing layer 43 receiving the excitation light 7 of the photocatalyst and producing a hydrogen gas, and at the same time may have an electron transport layer (porous titanium 206) between the photocatalyst-containing layer 27 of the anode electrode 2 and the promoter-containing layer 43 of the cathode electrode 3. The electron transport layer (porous titanium 206) is composed of a conductive material and through which the electrolytic solution can penetrate.

Photocatalyst Cell

Figure 11A:
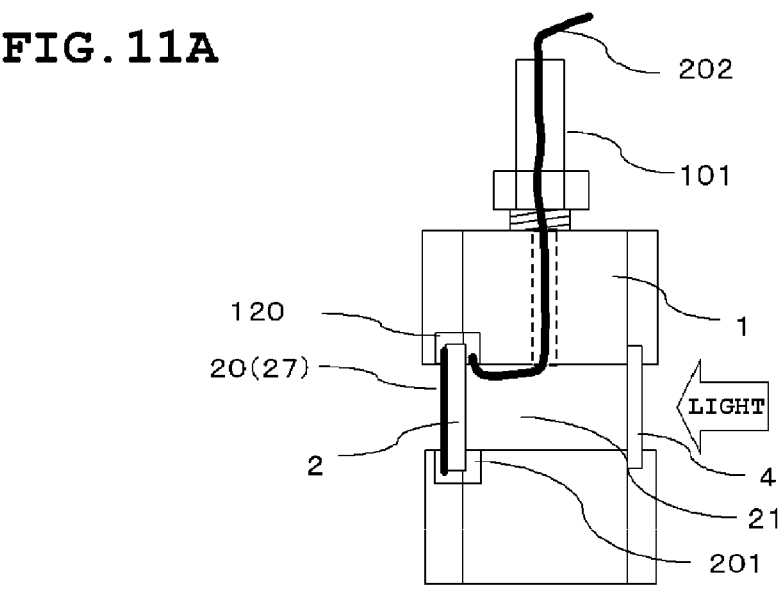
Figure 11B:
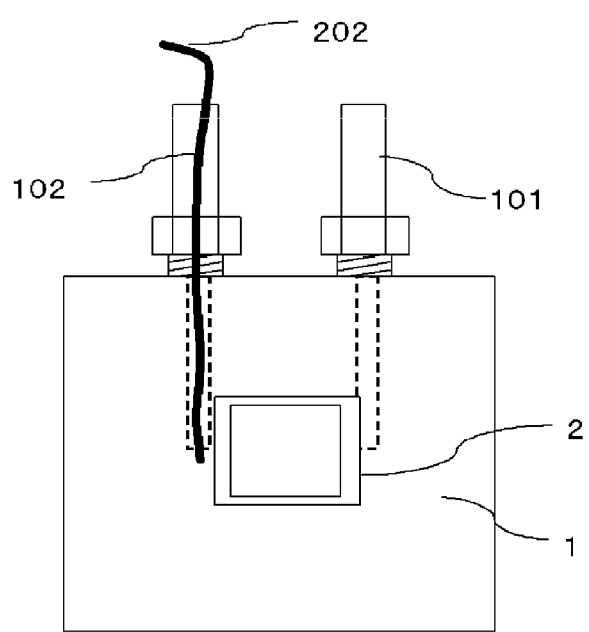
FIG. 11B is a front view.

FIGS. 11A and 11B are schematic views illustrating a structure of a photocatalyst cell (anode cell) 1 according to the present embodiment. FIG. 11A is a sectional side view of the photocatalyst cell 1, while FIG. 11B is a front view of the photocatalyst cell 1. The photocatalyst cell 1 is provided with an anode electrode 2, and is a member constituting the gas generating device 100 by the use of a promoter cell (cathode cell) together.

As shown in FIGS. 11A and 11B, the photocatalyst cell 1 is provided with the anode electrode 2 fixed to the photocatalyst cell 1 by means of a conducting metal frame 201, a light receiving window 4, a first gas containing unit 21 containing an oxygen gas, an oxygen gas discharge tube 101, an inert gas supply tube 102 and a conducting wire 202. The anode electrode 2 is placed in an electrode holder 120.

The anode electrode 2 is composed of a base material 25 and a photocatalyst-containing layer 27 formed on one surface of the base material 25. As described below, a transparent conductive film 24 may also be formed on the base material 25. A photocatalyst supporting surface 20 having the photocatalyst-containing layer 27 is located at the back side of a surface of the anode electrode 2 receiving the light from the light receiving window 4. The photocatalyst-containing layer 27 formed on a surface to be in contact with the electrolytic solution is lyophilic with respect to the electrolytic solution. It is preferable that the electrolytic solution contains water and the photocatalyst-containing layer 27 is hydrophilic.

In this embodiment, the shape of the base material 25 constituting the anode electrode 2 may be, for example, a sheet, a substrate, a film or the like.

A light-transmitting base material 28 which is transparent with respect to the excitation light exciting a catalyst contained in the photocatalyst-containing layer 27 may also be used for the base material 25. Accordingly, the photocatalyst can exhibit a function of generating a gas. The excitation light that is incident from the light receiving window 4 passes through the anode electrode 2 and radiates on the photocatalyst-containing layer 27 of the photocatalyst supporting surface 20 from the back side, and the photocatalytic function is exhibited.

As the light-transmitting base material 25, alkali glass such as glass or the like may also be used. When it is necessary that the material is transparent with respect to the ultraviolet light, a quartz plate is preferable. In addition to quartz, a ceramic material such as magnesium fluoride, calcium fluoride or the like may also be used. A plastic film can also be used, but it is preferable to use a material having transparency with respect to the ultraviolet light as well. In case of the plastic film, it is easy to form a plurality of fine holes, and it is possible to reduce the cost involved in production of a gas generating device and the gas. Examples of the transparent plastic film include polyester resin films such as polyethylene terephthalate, polybutylene terephthalate, polyethylene naphthalate and the like; polyolefin resin films such as polyethylene, polypropylene, polymethylpentene, cyclic polyolefin copolymer and the like; methacrylic resin films; polycarbonate resin films; polystyrene resin films; cellulose acetate resin films; transparent polyimide resin films; transparent fluorine resin films; silicone resin films; some of biodegradable polymers and the like.

In this embodiment, the anode electrode 2 having the base material 25 and the photocatalyst-containing layer 27 laminated to each other is exemplified, but the present invention is not limited thereto. The anode electrode 2 may only be composed of the photocatalyst-containing layer 27, and the base material 25 may optionally be used. For a base for mounting the gas generating device 100 of the present embodiment on a ground surface or a setting table (not illustrated), a base material (base) for placing the anode electrode 2 (photocatalyst-containing layer 27) or other members may be used.

It is preferable that the base material 25 has an electrical conductivity, but it is generally insulating. In this case, as shown in FIG. 12C to be described below, the presence of the transparent conductive film 24 between the base material 25 and the photocatalyst-containing layer 27 enables its surface to be electrically conductive.

In the present embodiment, irradiation with the excitation light from the light receiving window 4 arranged at a position opposite to the back of the photocatalyst supporting surface 20 is exemplified. When the excitation light directly radiates from the photocatalyst supporting surface 20 side, the base material 25 is not necessarily be transparent with respect to the excitation light. In this case, the base material 25 used for the anode electrode 2 may be composed of a metal substrate, a graphite plate or the like. Further, when a mesh-shaped material or an interdigital material is used for the anode electrode 2, a metal fiber, a graphite fiber or the like may be used. Since the base material 25 composed of these materials is electrically conductive, it is not necessary to provide the transparent conductive film 24.

When the base material 25 of the anode electrode 2 is not transparent with respect to the excitation light, it is preferable that the cathode electrode 3 facing the anode electrode 2 is formed from a material which is transparent with respect to the excitation light so that the excitation light can radiate on the photocatalyst-containing layer 27.

The transparent conductive film 24 may be formed form indium tin oxide iron (ITO), tin oxide ($SnO_2$), zinc oxide (ZnO) or the like. The transparent conductive film 24 may be formed according to a method such as vacuum deposition, chemical vapor deposition, ion plating, sputtering, sol-gel coating or the like.

The photocatalyst contained in the photocatalyst-containing layer 27 is at least one kind selected from the group consisting of oxides such as titanium oxide, vanadium oxide, nickel oxide, zinc oxide, gallium oxide, zirconium oxide, niobium oxide, molybdenum oxide, tantalum oxide, tungsten oxide, germanium oxide, indium oxide, tin oxide, antinomy oxide, lead oxide, bismuth oxide and the like, and nitrides and sulfides of them. The nitrides and sulfides may further be used. Among these, preferably used are titanium oxide and its derivative exhibiting high photocatalyst activity and excellent stability.

Also, a two-component compound or the like may also be used. For example, also preferably used are silver-based compounds such as $ArTiO_3$, $AgNdO_3$, $AgNbO_3$, $Ga_2O_3$—$In_2O_3$ mixed compound, $AgTaO_3$, $AgNbO_3$, AgInZnS and the like; $In_2O_3$—ZnO-based compounds; and compounds such as $BiVO_4$.

A compound composed of these oxides, nitrides or sulfides may also be doped with other elements. Examples of a doping material include chrome, manganese, iron, cobalt, nickel, zinc, gallium, germanium, arsenic, selenium, molybdenum, palladium, silver, cadmium, indium, tin, antimony, tellurium, tungsten and the like.

Anatase titanium oxide is generally used for titanium oxide used as the photocatalyst. Nevertheless, there is no photocatalytic effect in titanium oxide with respect to visible light although titanium oxide is effective with respect to ultraviolet light. In recent years, development of a catalyst exhibiting a photocatalytic function with respect to visible light as well has been in progress. Study of cerium oxide-supported titanium oxide, sodium tantalate composite oxide, bismuth oxide, rhodium-doped strontium titanium oxide and the like has been in progress as a typical visible light type photocatalyst, and these photocatalyst may also be used.

Examples of a method of forming the photocatalyst-containing layer 27 containing a photocatalyst include an ion plating method, a chemical vapor deposition method, a vacuum deposition method, a sputtering method and the like.

When the photocatalyst is dissolved in a solvent which does not erode a sheet substrate, a forming method such as a spin-coating method, a screen printing method, a spraying method or the like is suitably adopted. Immediately after the above formation, the photocatalyst is in an amorphous state, and electrons and holes produced by photoexcitation are captured due to defects or disorder in the photocatalyst before reaching a reactive surface, and a catalytic function can not be expected. For promotion of crystallization, a heat treatment is carried out. The heating temperature is preferably in the range of 200 to 700 degrees centigrade. The use of the photocatalyst which has been crystallized enables the heat treatment to be omitted or enables the heat treatment at a temperature of less than 200 degrees centigrade in order that a resin composition (binder) containing a photocatalyst as a catalyst dispersion solution is removed.

In addition, as a method of forming the photocatalyst-containing layer 27, there may be used a casting method including pouring a catalyst dispersion solution in which a photocatalyst is dispersed into a mold, subjecting the mold to heating/burning or solvent treatment and removing the catalyst dispersion solution. Specifically, the use of a resin composition (binder) as a catalyst dispersion solution and the heating/burning of the composition enable a porous material substantially only composed of a photocatalyst to be produced. For a mold into which the catalyst dispersion solution is poured, there is used an invert mold of the photocatalyst-containing layer 27 having protruding places corresponding to the through holes. The promoter-containing layer 43 is also produced in the same manner.

A layer thickness of the photocatalyst-containing layer 27 is preferably equal to or more than 0.01 µm and equal to or less than 100 µm, and more preferably equal to or more than 1 µm and equal to or less than 10 µm. Effective reaction of holes or electrons produced by photoexcitation with the electrolytic solution requires a large contact area between fine photocatalyst particle and the electrolytic solution. Thus, an opportunity to be in contact with fine particles will be further increased when the distance in the depth direction of the film as well as the surface is long. When the layer thickness is too small, the catalytic activity is deteriorated in some cases. On the other hand, when the layer thickness is too large, an electrode film is peeled off in some cases and electrolysis may possibly be interrupted.

The oxygen gas discharge tube 101 communicates with the first gas containing unit 21, and can discharge the oxygen gas recovered in the first gas containing unit 21. The conducting wire 202 connects to the conducting metal frame 201, and can supply electrons generated at the photocatalyst-containing layer 27 to the cathode electrode (not illustrated in this figure) through the conducting wire 202.

FIG. 11B is a front view of the photocatalytic electrolysis cell 1. In FIG. 11B, the photocatalyst supporting surface 20 side for carrying out electrolysis is the front, while a surface irradiated with the excitation light is the rear surface. As shown in FIG. 11B, the photocatalyst cell 1 is provided with the oxygen gas discharge tube 101 and the inert gas supply tube 102, which communicate with the first gas containing unit 21. The supply of an inert gas such as a nitrogen gas or the like from the inert gas supply tube 102 to the gas containing unit 21 enables recovery of the oxygen gas also to be accelerated.

Figure 12A:
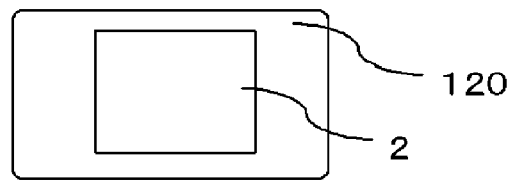
FIG. 12A is a front view of an anode electrode itself.
Figure 12B:
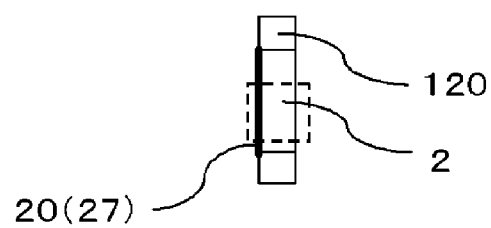
FIG. 12B is a sectional side view.
Figure 12C:
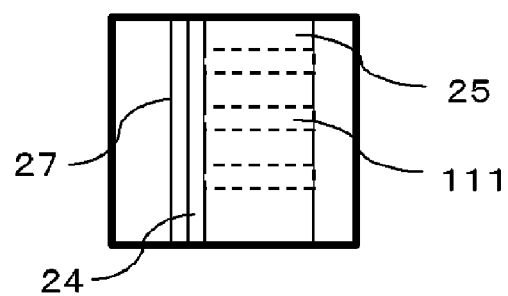
FIG. 12C is an enlarged view of FIG. 12B.

FIGS. 12A to 12C are schematic views illustrating an example of an anode electrode 2 having a plurality of through holes 111 selectively allowing passage of an oxygen gas. Incidentally, in FIG. 12C, a base material 25 may be composed of a material which is transparent with respect to excitation light.

FIG. 12A is a front view of the anode electrode 2, while FIG. 12B is a sectional side view of the anode electrode 2. Furthermore, FIG. 12C is an enlarged view of the middle part of the anode electrode 2. The enlarged portion is surrounded by the dotted line in a square shape. The anode electrode 2 has a structure in which a base material 25, a transparent conductive film 24 and a photocatalyst-containing layer 27 are laminated in this order.

The anode electrode 2 is placed in an electrode holder 120 that is a support for fixing to the photocatalyst cell 1. Explanations of the electrode holder 120 will not shown in other figures than FIGS. 11 and 12. A plurality of through holes 111 are formed on the anode electrode 2. The shape of the through holes 111 may be designed freely in the range satisfying the Young-Laplace equation. Furthermore, the anode electrode 2 itself may have a mesh shape or an interdigital shape, in addition to a porous structure having a plurality of through holes 111. That is, on the anode electrode 2, through holes selectively allowing passage of the produced oxygen gas to the back side but preventing passage of the electrolytic solution 12 may be formed.

FIG. 13 is a plan view illustrating an example of a hole processing unit formed on the anode electrode 2. In the present embodiment, the hole diameter of the through hole 111 is 100 μm, while the hole pitch interval (distance between centroids) is 150 μm. The hole diameter and the pitch interval may properly be determined, but as described above, a smaller hole diameter is more effective to suppress leakage of the electrolytic solution based on the Young-Laplace pressure.

For a method of forming the through holes 111 on the base material 25, there may be used drilling, laser processing, sandblasting processing or the like. The transparent conductive film 24 and the photocatalyst-containing layer 27 may be formed after the formation of the through holes 111, or the through holes 111 may be formed after the formation of the transparent conductive film 24 and the photocatalyst-containing layer 27 on the base material 25.

It is preferable that the inner wall surface of the through holes 111 is lyophobic with respect to the electrolytic solution. Furthermore, it is preferable that the back of the photocatalyst supporting surface 20 of the anode electrode 2 is also lyophobic with respect to the electrolytic solution. Accordingly, penetration of the electrolytic solution into the through holes 111 can be more effectively suppressed. It is preferable that the electrolytic solution contains water as a main component, and the inner wall surface of the through hole 111 and the back of the anode electrode 2 are hydrophobic.

For a method of hydrophobizing the inner wall surface of the through hole 111, there may be used a method of coating a hydrophobic coating agent, in addition to the use of a hydrophobic substrate in advance. For example, a Teflon (registered trademark) resin coating agent such as CYTOP (a product of Asahi Glass Co., Ltd.) or the like may be used. It is also possible to perform a hydrophobic treatment by plasma treatment using a fluorine gas.

The photocatalyst-containing layer 27 of the anode electrode 2 is brought into contact with the electrolytic solution 12, the excitation light of the photocatalyst that has passed through the light receiving window 4 further passes through the base material 25 and radiates on the photocatalyst-containing layer 27, and thus the oxygen gas is generated by the photocatalytic reaction at the photocatalyst-containing layer 27. The photocatalyst is not supported on the inner wall surface of the through holes 111 corresponding to a thickness portion of the base material 25, and the oxygen gas is not produced at the appropriate places. The through holes 111 are formed based on the Young-Laplace equation, and penetration of the electrolytic solution into the through holes 111 is suppressed. An interfacial boundary between the electrolytic solution surface and the gas phase, that is, a gas-liquid interface, is formed on the aperture of the through holes 111. The gas-liquid interface 52 is formed based on the aforementioned Young-Laplace pressure. When the inner wall surface of the through holes 111 is hydrophobic, penetration of the electrolytic solution into the through holes 111 can be more effectively suppressed.

Promoter Cell (Cathode Cell)

Figure 14A:
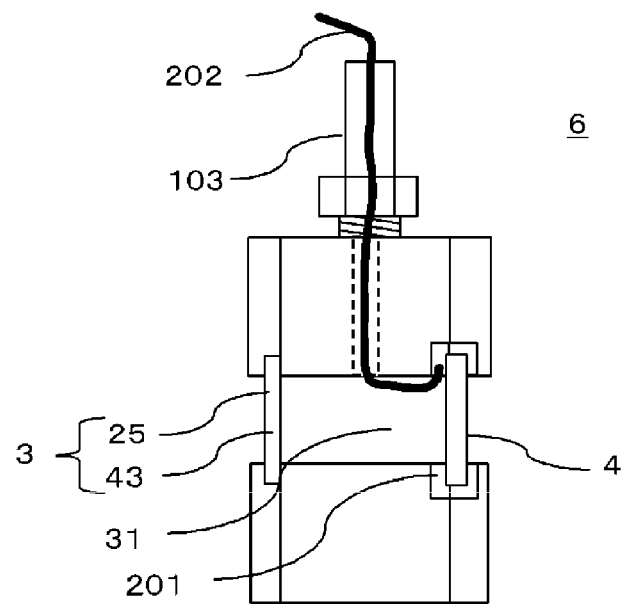
Figure 14B:
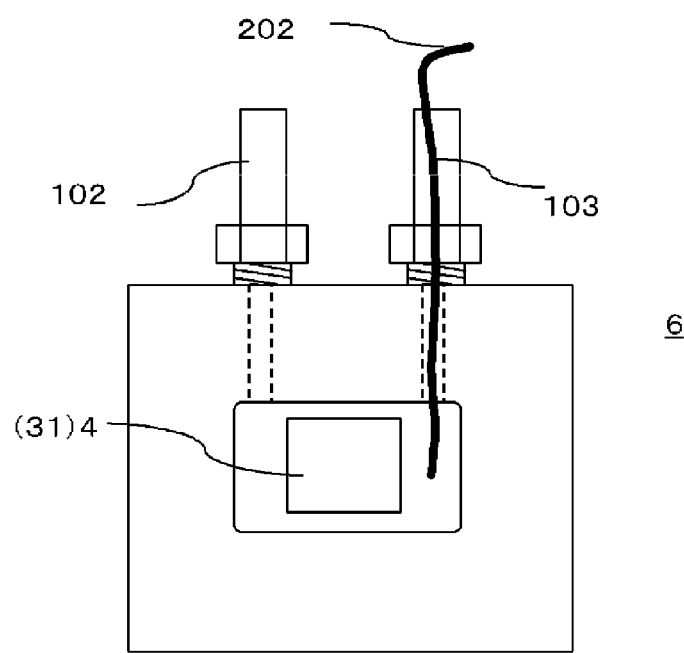
FIG. 14B is a front view.

FIGS. 14A and 14B are schematic views of a promoter cell 6 (electrolysis cell for producing a hydrogen gas). FIG. 14A is a sectional side view of the promoter cell. FIG. 14B is a front view of the promoter cell.

The promoter cell 6 shown in FIGS. 14A and 14B is provided with a cathode electrode 3 fixed to the promoter cell 6 by means of a conducting metal frame 201, a light receiving window 4, a gas containing unit 31 containing a hydrogen gas, a hydrogen gas discharge tube 103 and a conducting wire 202. The cathode electrode 3 is composed of a promoter-containing layer 43 formed on a base material 25. The promoter contained in the promoter-containing layer 43 is preferably at least one kind selected from the group consisting of platinum, nickel, ruthenium, nickel oxide and ruthenium oxide.

When the cathode electrode 3 is composed of a light-transmitting base material 28 (see FIGS. 9A to 9D), the cathode electrode 3 allows passage of the excitation light from the light receiving window 4. When an anode electrode 2 is formed at the back of the cathode electrode 3 as viewed from the light receiving window 4, the excitation light can radiate on the photocatalyst-containing layer 27.

When the light radiates from the anode electrode 2 side on the cathode electrode 3, the light receiving window 4 is not necessarily formed in the promoter cell 6, and further the cathode electrode 3 may not be transparent with respect to the excitation light. In this case, the cathode electrode 3 may be formed from platinum, nickel or the like.

The base material 25 of the cathode electrode 3 has a sheet shape, a substrate shape, a film shape or the like, and through holes are arranged in the same manner as in FIGS. 12C and 13. For the cathode electrode 3, there may also be used the base material 25 having a plurality of electrode portions with through holes discretely arranged at distances such as a mesh-shaped material, an interdigital material or the like. The through holes (second through holes) on the cathode electrode 3 selectively allow passage of the hydrogen gas generated at a surface of the cathode electrode 3 opposite to the anode electrode 2 to the back side, but prevent passage of the electrolytic solution.

The conducting wire 202 connects to the conducting metal frame 201. On the surface of the cathode electrode 3, the hydrogen gas is produced by electrons supplied to the cathode electrode 3 through the conducting wire 202 and hydrogen ions produced by the photocatalytic reaction in the electrolytic solution. The electrical connection of the conducting wire 202 in the promoter cell 6 to the conducting wire 202 in the photocatalyst cell 1 (see FIGS. 11A and 11B) enables electrons generated at the photocatalyst-containing layer 27 to be supplied to the cathode electrode 3, and thus gas can be continuously produced. The conducting wire 202, as shown in FIG. 14A, electrically connects to the conducting metal frame 201, and is configured so as to supply electrons from the anode electrode 2 through the inert gas supply tube 102.

FIG. 14B is a front view of the promoter cell 6. In FIG. 14B, a surface for carrying out electrolysis is the front, while a surface irradiated with the excitation light is the back surface. As shown in FIG. 14B, the electrolysis cell 6 for producing a hydrogen gas is provided with a hydrogen gas discharge tube 103 and an inert gas supply tube 102, which communicate with the second gas containing unit 31. The supply of an inert gas such as a nitrogen gas or the like from the inert gas supply tube 102 to the second gas containing unit 31 enables recovery of the oxygen gas also to be accelerated.

Hereinafter, embodiments of a gas generating device using the aforementioned photocatalyst cell and/or the aforementioned promoter cell will be illustrated with reference to the drawings.

First Embodiment

For the gas generating device 100 of this embodiment, there is used a device provided with a cathode electrode 3 arranged in the photocatalyst cell 1 illustrated in FIGS. 11A and 11B. Further specifically, FIG. 15 is a sectional side view of the gas generating device 100 in which the photocatalyst cell 1 illustrated in FIGS. 11A and 11B is placed in an electrolytic bath 10, and FIG. 16 is a front view of the gas generating device 100. The gas generating device 100 of this embodiment is a device in which the photocatalyst cell 1 having an anode electrode 2 is installed in the electrolytic bath 10 having a platinum electrode as the cathode electrode 3 fixed to a support rod.

The electrolytic bath 10 is sealed so that a hydrogen gas can be prevented from leaking through a lid member 11. An oxygen gas discharge tube 101 and an inert gas supply tube 102 in the photocatalyst cell 1 penetrate through the lid member 11, and accordingly the photocatalyst cell 1 is fixed. The inert gas supply tube 102 is provided with a conducting wire insertion port 203 above the lid member 11. A conducting wire 202 passes through the inside of the inert gas supply tube 102 via the conducting wire insertion port 203. Furthermore, the conducting wire 202 passes through the inside of a support rod 301 and electrically connects to the cathode electrode 3.

The support rod 301 penetrates through the lid member 11. The cathode electrode 3 is fixed to the support rod 301, and is arranged to face a photocatalyst supporting surface 20 of the anode electrode 2. The lid member 11 is provided with the inert gas supply tube 102 supplying an inert gas to the space in the electrolytic bath 10 and a hydrogen gas discharge tube 103.

The excitation light of the catalyst radiates from the back side of the photocatalyst supporting surface 20 of the anode electrode 2 through a light receiving window 4. In this embodiment, the electrolytic bath 10 itself is also composed of a material which is transparent with respect to the excitation light. The excitation light passes through the electrolytic bath 10 and the base material 25, and radiates on the photocatalyst-containing layer 27 on the base material 25. The oxygen gas and hydrogen ions are produced on the surface of the photocatalyst-containing layer 27 in contact with the electrolytic solution 12. The oxygen gas moves from the photocatalyst supporting surface 20 via the through holes in the anode electrode 2 to the back side of the anode electrode 2, is stored in the gas containing unit 21, and is recovered through the oxygen gas discharge tube 101 (see FIG. 11A).

On the other hand, hydrogen ions are produced at the photocatalyst-containing layer 27, and then penetrate into the electrolytic solution 12 to reach the cathode electrode 3. Furthermore, electrons generated at the photocatalyst-containing layer 27 reach the cathode electrode 3 through the conducting wire 202 in the same manner. On the surface of the cathode electrode 3, a hydrogen gas is produced from electrons and hydrogen ions. The produced hydrogen gas is separated from the cathode electrode 3 due to buoyancy and recovered through the hydrogen gas discharge tube 103.

In this embodiment, the electrolytic solution 12 contains water as a main component. For example, there may be used a weak acid solution containing hydrochloric acid, sulfuric acid, nitric acid, acetic acid, oxalic acid or the like; a weak alkaline aqueous solution of sodium peroxide, potassium peroxide, sodium carbonate, potassium carbonate or the like; an aqueous solution of alcohols such as methanol, ethanol, propanol and the like; and an aqueous solution of carboxylic acids such as acrylic acid, phthalic acid and the like.

Second Embodiment

For the gas generating device 100 of this embodiment, there is used a device in which an anode electrode 2 is inserted using the promoter cell 6 shown in FIG. 14A. FIG. 17 is a sectional side view of the gas generating device 100 in which the promoter cell 6 shown in FIG. 14A placed in an electrolytic bath 10. The gas generating device 100 of this embodiment is a device in which the photocatalyst cell 1 having a cathode electrode 3 is placed in the electrolytic bath 10 having the anode electrode 2.

Unlike in the first embodiment, the second through holes are formed on the cathode electrode 3, and through holes are not formed on the anode electrode 2. A hydrogen gas discharge tube 103 and an inert gas supply tube 102 in the electrolysis cell 6 for producing a hydrogen gas penetrate through a lid member 11, and accordingly the electrolysis cell 6 for producing a hydrogen gas is fixed. The inert gas supply tube 102 is provided with a conducting wire insertion port above the lid member 11. A conducting wire 202 passes through the inside of the inert gas supply tube 102 via the conducting wire insertion port. Furthermore, the conducting wire 202 passes through the inside of a support rod 301 and electrically connects to the anode electrode 2 (not illustrated).

The support rod 301 penetrates through the lid member 11. The anode electrode 2 is fixed to the support rod 301, and is arranged such that the photocatalyst supporting surface 20 of the anode electrode 2 is opposed to the cathode electrode 3. The lid member 11 is provided with the inert gas supply tube 102 supplying an inert gas to the space inside the electrolytic bath 10 and the oxygen gas discharge tube 101.

The excitation light of the catalyst passes through a light receiving window 4 and the cathode electrode 3, and radiates on the photocatalyst-containing layer 27 of the anode electrode 2. In this embodiment, the electrolytic bath 10 itself is also composed of a material which is transparent with respect to the excitation light. In this embodiment, the anode electrode 2 may be composed of a material which is not transparent with respect to the excitation light. The oxygen gas and hydrogen ions are generated on the surface of the photocatalyst-containing layer 27 in contact with the electrolytic solution 12. The oxygen gas generated at the photocatalyst-containing layer 27 is separated from the anode electrode 2 due to buoyancy and recovered through an oxygen gas discharge tube 101.

On the other hand, hydrogen ions are generated at the photocatalyst-containing layer 27, and then penetrate into the electrolytic solution 12 to reach the cathode electrode 3. Electrons generated at the photocatalyst-containing layer 27 reach the cathode electrode 3 through the conducting wire 202 in the same manner. On the surface of the cathode electrode 3, a hydrogen gas is produced from electrons and hydrogen ions. The produced hydrogen gas moves from a gas generating surface of the cathode electrode 3 via the second through holes of the cathode electrode 3 to the back side of the cathode electrode 3, is stored in the gas containing unit 31, and is recovered through the hydrogen gas discharge tube 103.

Third Embodiment

The gas generating device 100 of this embodiment is composed of the photocatalyst cell 1 shown in FIG. 11A and the promoter cell 6 shown in FIG. 14A.

Figure 18:
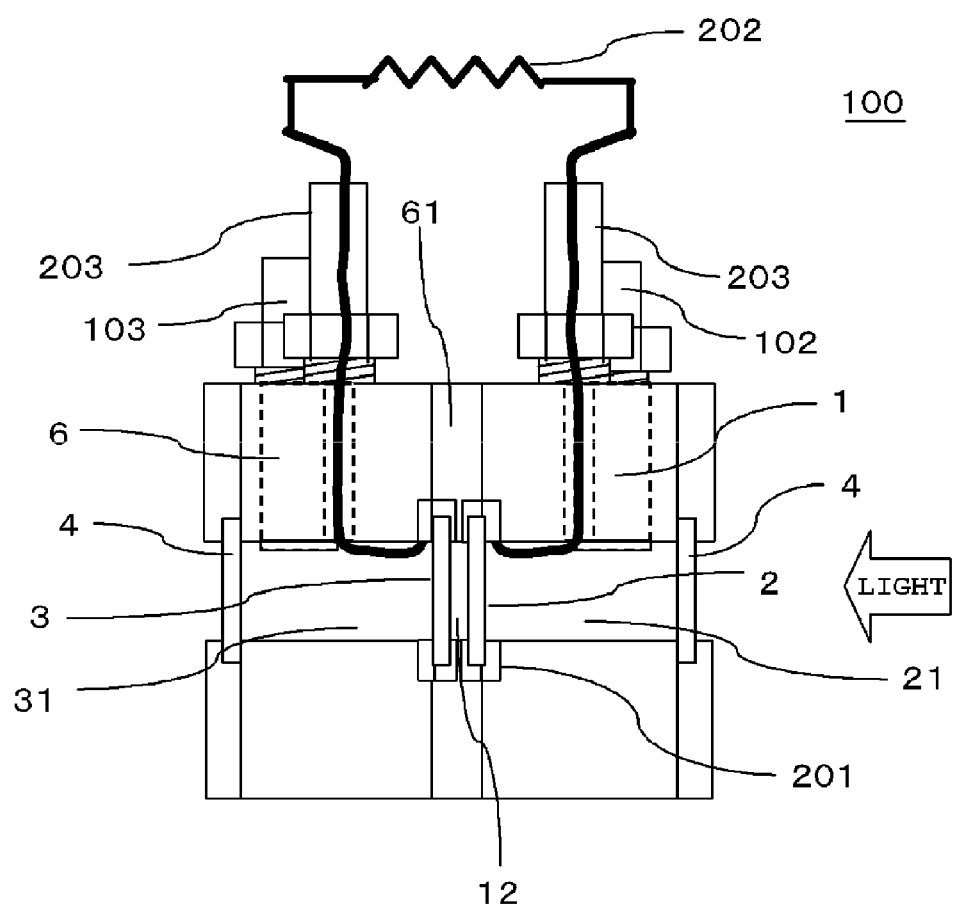
FIG. 18 is a sectional side view of a gas generating device according to a third embodiment.
Figure 19:
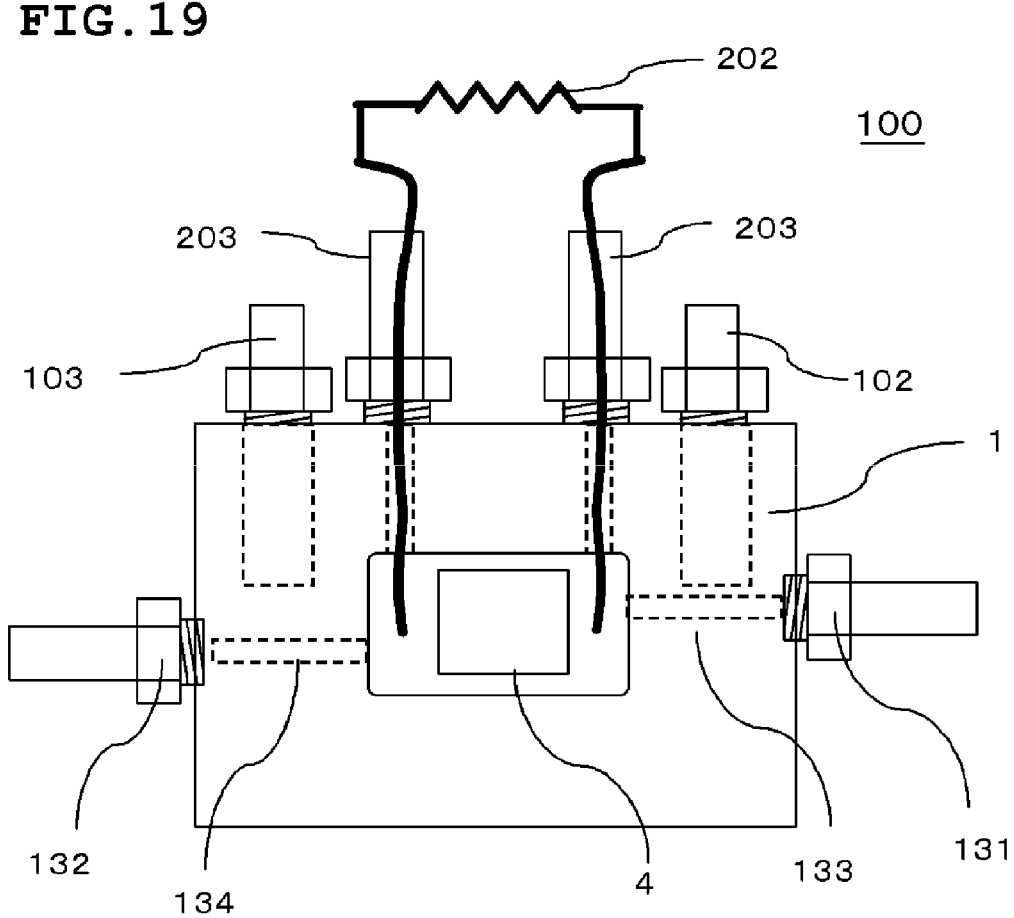
FIG. 19 is a front view of the gas generating device according to the third embodiment illustrated in FIG. 18.
Figure 20:
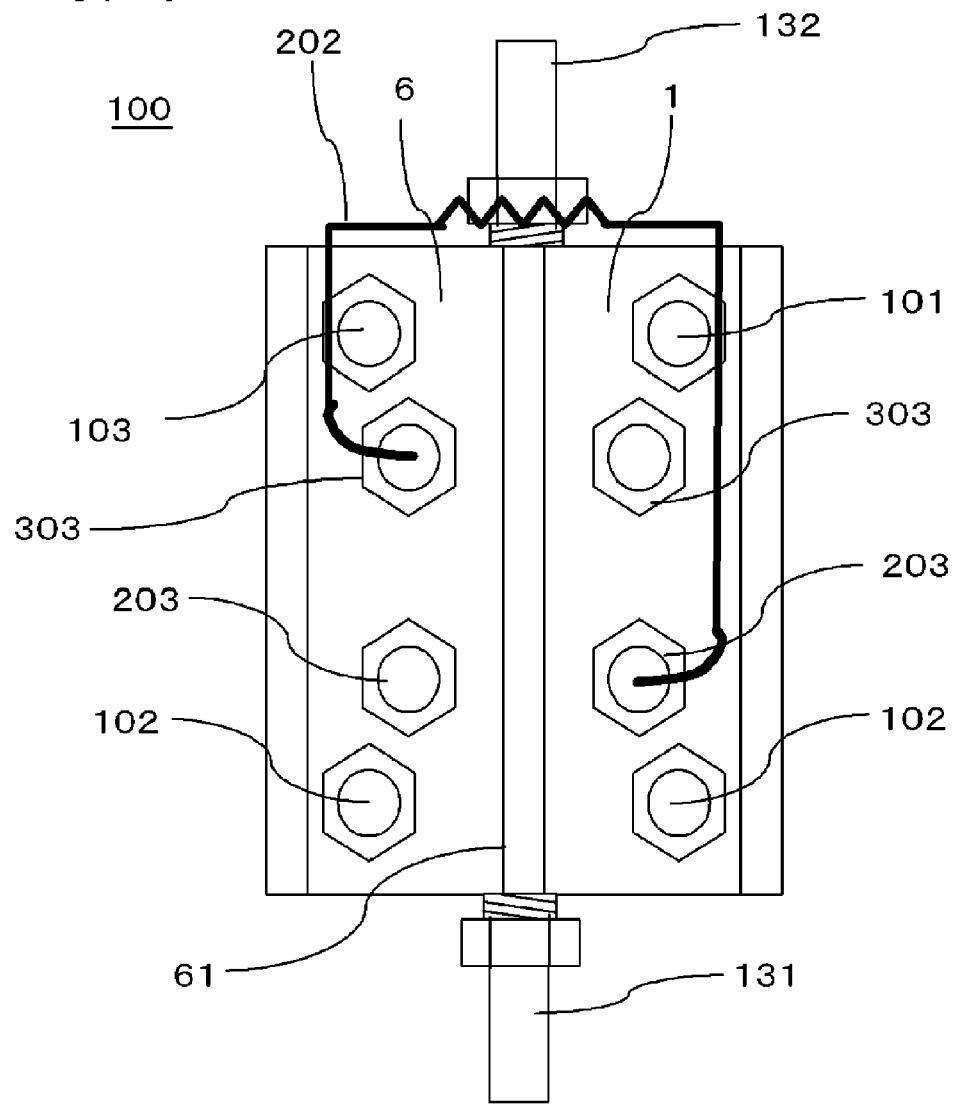
FIG. 20 is a top view of the gas generating device according to the third embodiment illustrated in FIGS. 18 and 19.

FIG. 18 is a sectional side view of the gas generating device of this embodiment, FIG. 19 is a front view from the cathode electrode 3 side, and FIG. 20 is a top view.

As shown in FIG. 18, the photocatalyst cell 1 and the promoter cell 6 are arranged in parallel so as to sandwich an inter-electrode spacer 61. A photocatalyst supporting surface 20 of an anode electrode 2 and a cathode electrode 3 are arranged to face each other by the inter-electrode spacer. The space (electrode gap portion) is formed by the anode electrode 2 and the cathode electrode 3, and the electrode gap portion becomes filled with the electrolytic solution 12.

As shown in the front view of FIG. 19, a narrow electrolytic solution supply tube 133 and an electrolytic solution supply tube 131 are arranged on one side of the gas generating device 100, and the electrolytic solution can be supplied from the outside to the aforementioned space. A narrow electrolytic solution discharge tube 134 and an electrolytic solution discharge tube 132 are arranged on the other side, and the electrolytic solution 12 supplied for the photocatalytic reaction at the aforementioned space (electrode gap portion) can be discharged to the outside. Namely, the electrode gap portion formed from the anode electrode 2 and the cathode electrode 3 constitutes apart of the electrolytic solution flow channel.

In other words, the gas generating device 100 is provided with an electrolytic solution store unit (electrode gap portion) storing the electrolytic solution 12 to bring the anode electrode 2 and the cathode electrode 3 into contact with the electrolytic solution 12, the electrolytic solution supply tube 131 supplying the electrolytic solution 12 to the electrolytic solution store unit, and the electrolytic solution discharge tube 132 discharging the electrolytic solution 12 supplied for the catalytic reaction from the electrolytic solution store unit.

The excitation light of the catalyst radiates from the back side of the photocatalyst supporting surface 20 of the anode electrode 2 through a light receiving window 4. The excitation light further passes through the base material 25 and radiates on the photocatalyst-containing layer 27 on the base material 25. The oxygen gas and hydrogen ions are produced on the surface of the photocatalyst-containing layer 27 in contact with the electrolytic solution 12. The oxygen gas moves from the photocatalyst supporting surface 20 via the through holes in the anode electrode 2 to the back side of the anode electrode 2, is stored in a gas containing unit 21, and is recovered through an oxygen gas discharge tube 101.

On the other hand, hydrogen ions are generated at the photocatalyst-containing layer 27, and then penetrate into the electrolytic solution 12 to reach the cathode electrode 3. Furthermore, electrons generated at the photocatalyst-containing layer 27, as shown in FIG. 20, reach the cathode electrode 3 through a conducting wire 202 in the same manner. On the surface of the cathode electrode 3, a hydrogen gas is produced from electrons and hydrogen ions. The produced hydrogen gas moves from a gas generating surface of the cathode electrode 3 via the second through holes in the cathode electrode 3 to the back side of the cathode electrode 3, is stored in a second gas containing unit 31, and is recovered through a hydrogen gas discharge tube 103.

As described above, the oxygen gas generated at the anode electrode 2 and the hydrogen gas generated at the cathode electrode 3 are not mixed with each other and stored respectively in the first gas containing unit 21 and the second gas containing unit 31. Accordingly, the anode electrode 2 and the cathode electrode 3 can be closely placed with a gap which could not be achieved with the conventional electrode structure.

Movement of the oxygen gas and hydrogen gas is made by the surface tension regardless of the gravity to be described later, and electrodes can be freely arranged without much attention to arrangement in any of upper, lower, right and left sides. For example, the anode electrode 2 and the cathode electrode 3 can be arranged in parallel so as to face up and down.

Figure 21:
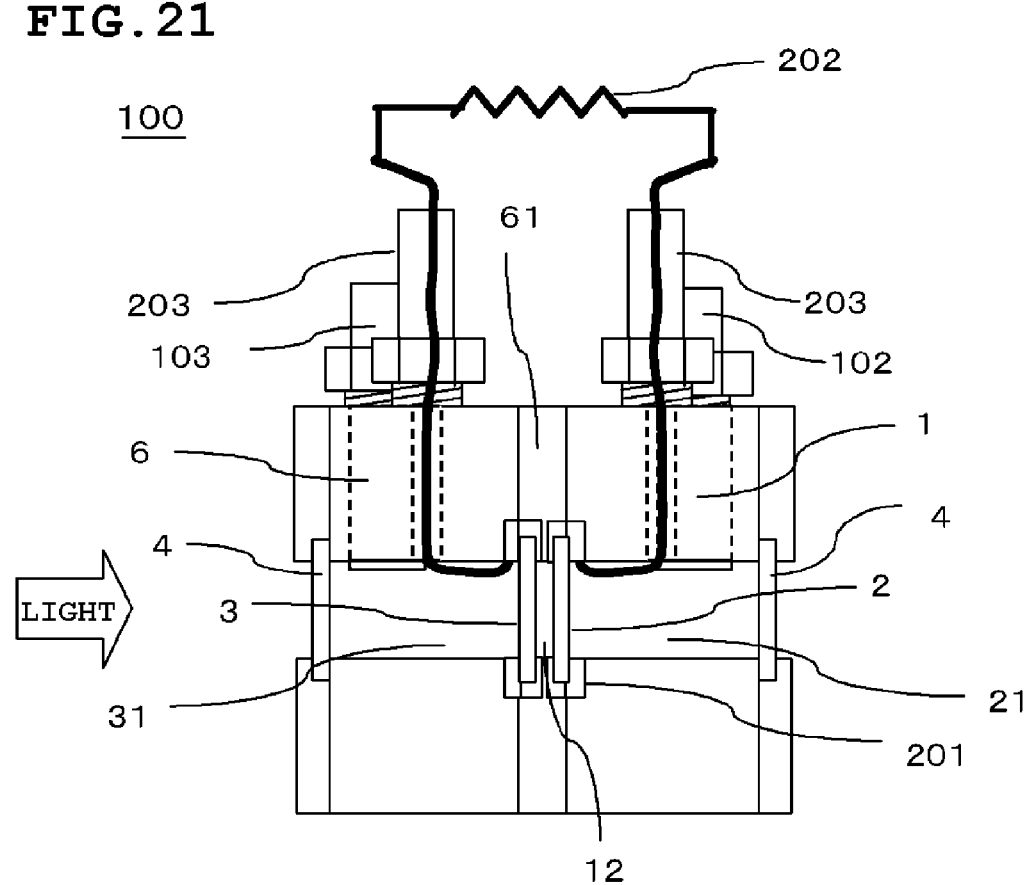
FIG. 21 is an example of an irradiation direction of the light on the cathode electrode side in the gas generating device according to the third embodiment.

FIG. 21 is a view showing two electrolysis cells connected to each other in the same manner as in FIG. 18. The light radiates inversely with FIG. 17 from the light receiving window 4 on the cathode electrode 3 side. In this case, the cathode electrode 3 is transparent with respect to the excitation light, and the radiating light radiates on the photocatalyst-containing layer 27 of the anode electrode 2. In this case, like the gas generating device 100 shown in FIG. 18, the oxygen gas and hydrogen gas are stored in the respective gas containing units and then delivered to the outside through respective gas discharge tubes.

In the gas generating device 100 shown in FIG. 18, the cathode electrode 3 may be composed of a member which is not transparent with respect to the excitation light. In the gas generating device 100 shown in FIG. 21, the anode electrode 2 may be composed of a member which is not transparent with respect to the excitation light. In this embodiment, from the viewpoint of irradiation with the excitation light with good efficiency, it is also preferable that the anode electrode 2 and the cathode electrode 3 are each composed of a member which is transparent with respect to the excitation light.

Fourth Embodiment

Solar Compatible Gas Generating Device

The gas generating device 100 of this embodiment is a gas generating device 100 (solar compatible gas generating device) in which an anode electrode 2 is arranged in parallel above a cathode electrode 3 arranged horizontally and the anode electrode 2 is arranged so as to be generally perpendicular to the excitation light irradiated from above such as sunlight or the like. The gas generating device 100 of this embodiment is provided with the anode electrode 2 arranged horizontally and the cathode electrode 3 arranged in parallel below.

Figure 22:
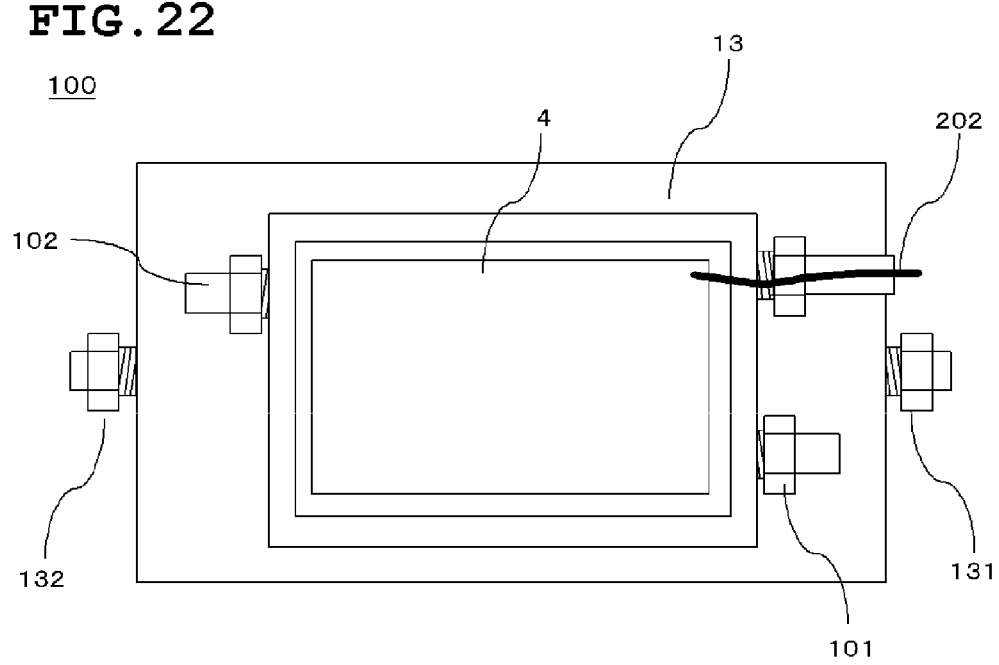
FIG. 22 is a top view of a solar compatible gas generating device according to a fourth embodiment.
Figure 23:
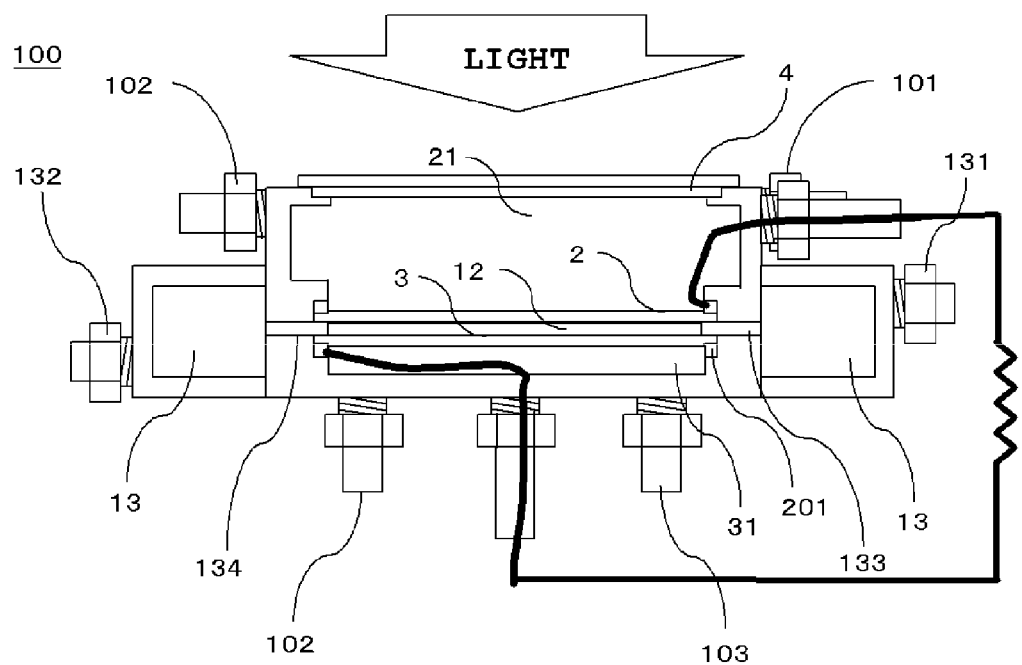
FIG. 23 is a sectional side view of the solar compatible gas generating device according to the fourth embodiment, and illustrates irradiation with light from the top.
Figure 24:
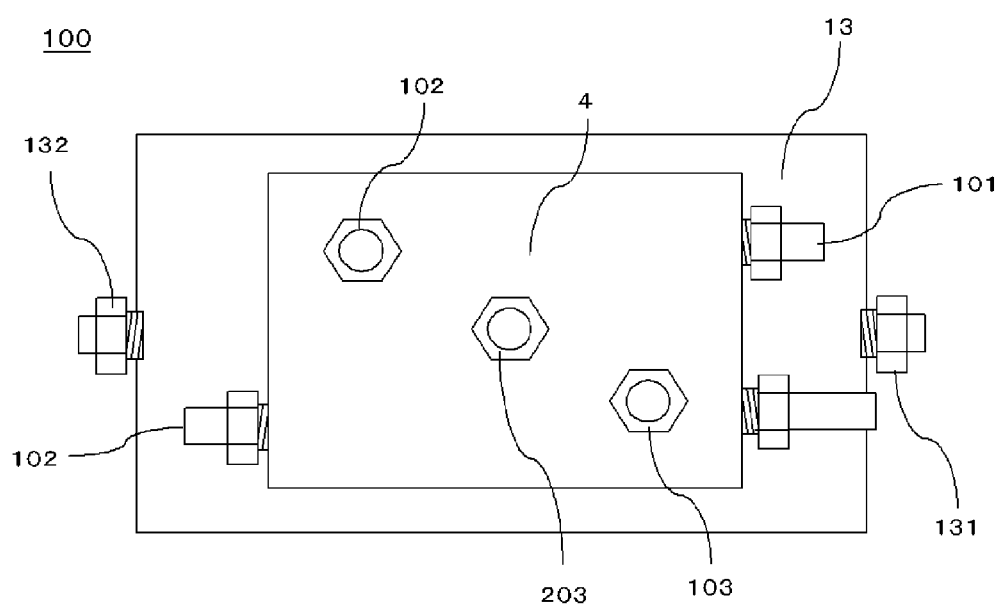
FIG. 24 is a bottom view of the solar compatible gas generating device according to the fourth embodiment.

FIG. 22 is a top view of the solar compatible gas generating device 100 of this embodiment, FIG. 23 is a sectional side view, and FIG. 24 is a bottom view.

As shown in FIG. 23, the anode electrode 2 is arranged above the cathode electrode 3 so as to be in parallel to the cathode electrode 3. A photocatalyst supporting surface 20 of the anode electrode 2 is opposed to the cathode electrode 3. As shown in FIGS. 22 and 23, a light receiving window 4 is arranged above the anode electrode 2, and the anode electrode 2 receives light such as sunlight or the like in large area.

The space between the anode electrode 2 and the cathode electrode 3 may be filled with an electrolytic solution 12. The electrolytic solution 12 is supplied from an electrolytic solution supply tube 131 to an electrolytic bath 10, and further supplied through a narrow electrolytic solution supply tube 133 to the space between the electrodes. The electrolytic solution 12 supplied for the photocatalytic reaction moves through a narrow electrolytic solution discharge tube 134 to the electrolytic bath 10 and is discharged through an electrolytic solution discharge tube 132 to the outside. Thus, the supply of the electrolytic solution 12 and irradiation with sunlight enable hydrogen and oxygen to be continuously produced.

A first gas containing unit 21 is arranged above the anode electrode 2 so as to surround the back of the photocatalyst supporting surface 20. The first through holes 111 are formed on the anode electrode 2. The oxygen gas moves from the photocatalyst supporting surface 20 via the first through holes 111 to the back side, is stored in the first gas containing unit 21, and is recovered through an oxygen gas discharge tube 101.

A second gas containing unit 31 is arranged below the cathode electrode 3. The second through holes are formed on the cathode electrode 3. The hydrogen gas moves from a gas generating surface of the cathode electrode 3 via the second through holes to the back side, is stored in the second gas containing unit 31, and is recovered through a hydrogen gas discharge tube 103.

The solar compatible gas generating device is available even if its slope is changed. Nevertheless, the feeding part needs to be arranged at a higher position so that the electrolytic solution can flow from the feeding part to the discharging part.

For the cathode electrode 3, a platinum electrode may be used. In addition, a carbon electrode and a thin film electrode formed by using a platinum thin film by sputtering may also be used. FIG. 24 is a view of the solar compatible gas generating device viewed from the bottom.

Fifth Embodiment

Figure 25:
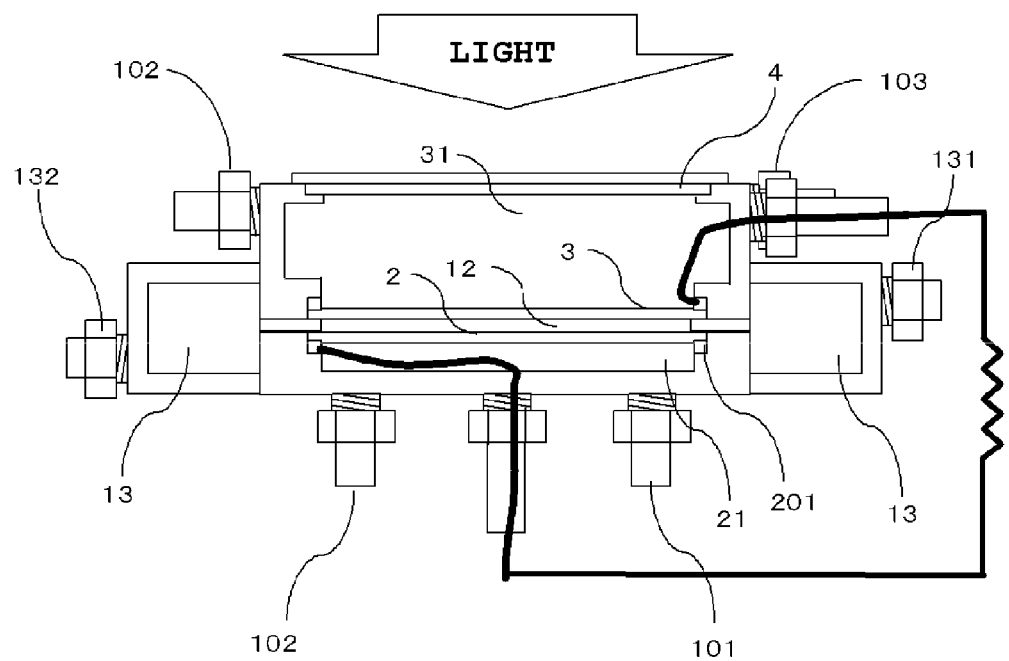
FIG. 25 is a sectional side view of a solar compatible gas generating device according to a fifth embodiment, and illustrates irradiation with light from the top.

The fifth embodiment shown in FIG. 25 is a sectional side view of the solar compatible gas generating device 100 in which a cathode electrode 3 is arranged on an anode electrode 2, contrary to the fourth embodiment. The gas generating device 100 of this embodiment is provided with the cathode electrode 3 arranged horizontally and the anode electrode 2 arranged in parallel below.

Sunlight passes through the cathode electrode 3 from a light receiving window 4 arranged above and is incident upon a photocatalyst-containing layer 27 of the anode electrode 2. The photocatalyst-containing layer 27 of the anode electrode 2 is arranged upwardly. Mutual electrodes become filled with the electrolytic solution 12.

A second gas containing unit 31 is arranged above the cathode electrode 3. The second through holes are formed on the cathode electrode 3. The hydrogen gas moves from a gas generating surface of the cathode electrode 3 via the second through holes to the back side, is stored in the second gas containing unit 31, and is recovered through a hydrogen gas discharge tube 103.

A first gas containing unit 21 is arranged below the anode electrode 2 so as to surround the back of a photocatalyst supporting surface 20. The first through holes 111 are formed on the anode electrode 2. The oxygen gas moves from the photocatalyst supporting surface 20 via the first through holes 111 to the back side, is stored in the first gas containing unit 21, and is recovered through an oxygen gas discharge tube 101.

Sixth Embodiment

Anode-cathode Integrated Electrode

Figure 26A:
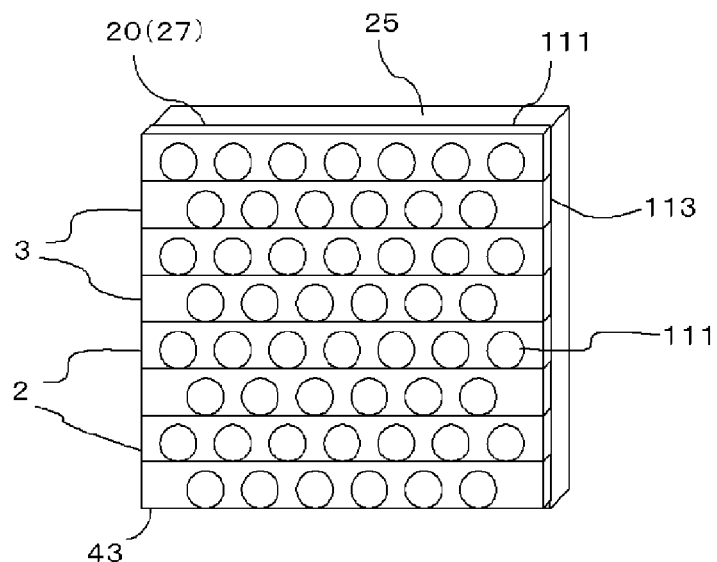
FIGS. 26A and 26B are each a perspective view of an anode-cathode integrated electrode according to a sixth embodiment.
Figure 26B:
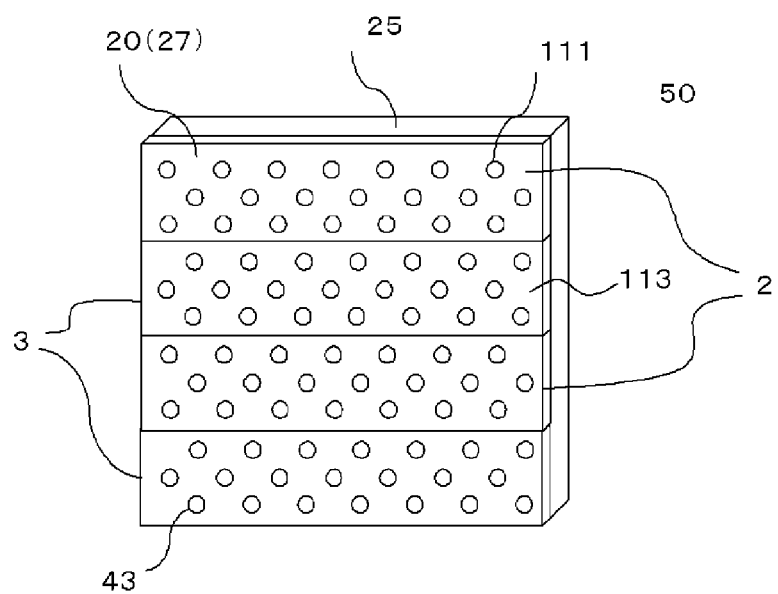

FIGS. 26A and 26B are each a perspective view of an anode-cathode integrated electrode 50 according to the sixth embodiment.

In the anode-cathode integrated electrode 50 of this embodiment, a cathode electrode 3 and an anode electrode 2 are supported by a common base material 25, and arranged side by side.

That the anode electrode 2 and the cathode electrode 3 arranged side by side means that they are at a position out of alignment with each other in the plane direction, and both electrodes are not necessarily required to be fully in the same plane.

A plurality of cathode electrodes 3 and a plurality of anode electrodes 2 are arranged adjacent to each other.

The cathode electrode 3 and the anode electrode 2 of this embodiment are each belt-shaped. A plurality of the first through holes 111 are formed on the anode electrode 2, and a plurality of the second through holes 113 are formed on the cathode electrode 3. The first through holes 111 and the second through holes 113 are regularly arranged in a staggered grid shape or the like.

The belt-shaped anode electrode 2 and cathode electrode 3 may have one row of the through holes (first through holes 111 and second through holes 113) as shown in FIG. 26A, or may have a plurality of rows of the through holes as shown in FIG. 26B.

It is preferable that the inner wall surface of the first through holes 111 and the second through holes 113 is hydrophobic with respect to the electrolytic solution. Furthermore, it is preferable that the rear surface is hydrophobic with respect to a light-receiving surface composed of the photocatalyst-containing layer 27 of the anode electrode 2 and the promoter-containing layer 43 of the cathode electrode 3. Accordingly, movement of the electrolytic solution to the back side via the first through holes 111 and the second through holes 113 can be effectively suppressed.

Seventh Embodiment

Anode-Cathode Integrated Electrode

Figure 27:
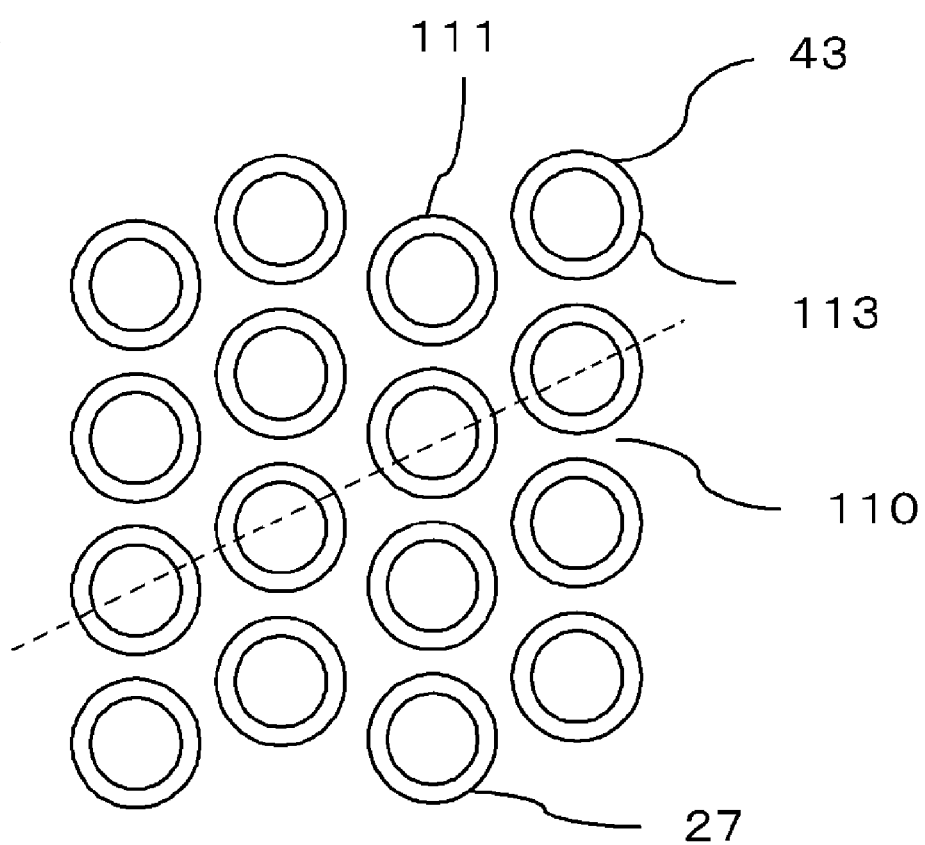
FIG. 27 is a schematic front view of an anode-cathode integrated electrode according to a seventh embodiment illustrating an example of the positional relationship between a photocatalyst-containing layer and a promoter-containing layer.

The anode-cathode integrated electrode 50 in this embodiment is, as shown in a schematic top view of FIG. 27, provided with a photocatalyst-containing layer 27 which is formed in a ring shape along the peripheral portion of the first through holes 111. The width of the photocatalyst-containing layer 27 formed in a ring shape is equal to or more than 1 μm.

That is, the photocatalyst-containing layer 27 (photocatalyst supporting surface 20) of this embodiment is arranged in a ring shape in the peripheral portion of the aperture of the first through holes 111. A promoter-containing layer 43 is arranged in a ring shape in the peripheral portion of the aperture of the second through holes 113.

The promoter-containing layer 43 is arranged in a ring shape along the peripheral portion of the second through holes 113. The width of the promoter-containing layer 43 formed in a ring shape is equal to or more than 1 μm. Nevertheless, the photocatalyst-containing layer 27 and the promoter-containing layer 43 are not formed in the inner wall of the through holes 111 and 113, within the thickness range of the base material 25. The width of the photocatalyst-containing layer 27 is equal to or more than 1 μm, the width of the promoter-containing layer 43 is equal to or more than 1 μm, and the device is excellent in production of gases.

That is, the anode electrode 2 consists of the ring-shaped photocatalyst-containing layer 27, while the cathode electrode 3 consists of the ring-shaped promoter-containing layer 43. The cathode electrode 3 and the anode electrode 2 are arranged adjacent to each other side by side through an electrically insulating material (base material 25). The adjacent interval between the cathode electrode 3 and the anode electrode 2 is equal to or more than 0.01 μm.

Figure 28:
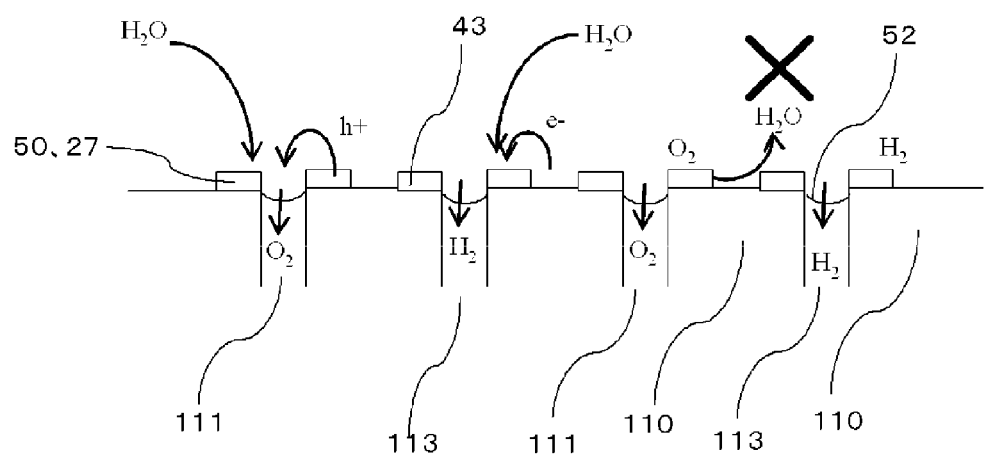
FIG. 28 is a cross-sectional view of the anode-cathode integrated electrode illustrated in FIG. 27, and illustrates production and separation of hydrogen and oxygen.

With reference to FIG. 28, generation of gases at the photocatalyst-containing layer 27 and the promoter-containing layer 43, and a method of collecting generated gases will be described. First, generation of the oxygen gas at the photocatalyst-containing layer 27 and a method of collecting the gas will be described. FIG. 28 is a cross-sectional view along the dotted line in FIG. 27.

When the photocatalyst-containing layer 27 receives the excitation light irradiated from a light receiving window 4, electron $e^-$ and hole $h^+$ are generated by photoexcitation on the photocatalyst-containing layer 27 in contact with the electrolytic solution 12 (herein water represented as $H_2O$).

Two holes $h^+$s oxidize $H_2O$ to produce two $H^+$s (protons) and one half $O_2$ (oxygen molecule) (Formula 101 described in Background Art). The $O_2$ immediately passes through the first through hole 111 in the state of a gas and moves to the back side. Water forms a gas-liquid interface 52 due to the aforementioned Young-Laplace pressure so that it does not penetrate into the inside of the first through hole 111 (see the above Formula (2)).

On the other hand, two $H^+$s generated at the photocatalyst-containing layer 27 diffuse in water and react with two electrons $e^-$ on the promoter-containing layer 43 to generate one $H_2$ (hydrogen molecule) (Formula 102 described in Background Art). The $H_2$ immediately passes through the second through hole 113 in the state of a gas and moves to the back side. Water forms the gas-liquid interface 52 due to the aforementioned Young-Laplace pressure and does not penetrate into the inside of the second through hole 113 (see the above Formula (2)).

The first through holes 111 allowing passage of oxygen and the second through holes 113 allowing passage of hydrogen are spatially separated, and thus the probability of the reverse reaction to turn oxygen and hydrogen back into water is extremely low. Since turning hydrogen and oxygen back into water by the reverse reaction takes place on the promoter producing hydrogen, the reverse reaction to turn back into water can be inhibited under the absence of oxygen on the promoter.

In the anode-cathode integrated electrode 50 of this embodiment, the photocatalyst-containing layer 27 is arranged in the peripheral portion of the aperture of the first through holes 111, while the promoter-containing layer 43 is arranged in the peripheral portion of the aperture of the second through holes 113. Accordingly, the gas generating device of this embodiment is excellent in separability of gases while improving the production efficiency of the oxygen gas and hydrogen gas.

In this embodiment, the photocatalyst is not supported on the inner wall of the first through holes 111, and an oxygen gas is not generated in the inner wall. Since the inner wall of the first through holes 111 is hydrophobic, penetration of the electrolytic solution 14 is prevented, and the gas-liquid interface 52 between the electrolytic solution 12 surface and the gas phase surface is formed on the aperture of the first through holes 111. A mechanism of the formation of the gas-liquid interface 52 is based on the aforementioned Young-Laplace pressure.

Accordingly, the oxygen molecules produced at the photocatalyst-containing layer 27 penetrate into the electrolytic solution 12 to reach the gas-liquid interface 52 by diffusion, or grow to bubbles and at same time are come into contact with the gas-liquid interface 52, and absorbed to the gas phase inside the first through holes 111 by a defoaming phenomenon. As a result, a phenomenon in which as soon as the oxygen gas is produced an oxygen gas is sucked into the first through holes 111 to move to the back side continues to take place. The oxygen gas generated at the gas generating device 100 is sent from the first gas containing unit arranged at the back side through the oxygen gas discharge tube 101. Thus, the oxygen gas can be recovered through the oxygen gas discharge tube 101 (see FIGS. 30A and 30B to be described below).

Next, production of the hydrogen gas at the promoter-containing layer 43 and a method of collecting the gas will be described.

When the photocatalyst-containing layer 27 receives the excitation light from the light receiving window 4, $H^+$ and electron $e^-$ are generated on the photocatalyst-containing layer 27 by the photocatalytic reaction. On the promoter-containing layer 43, the hydrogen gas is generated from $H^+$ and electron $e^-$ in the electrolytic solution. In this embodiment, the promoter is not supported on the inner wall of the second through holes 113, and a hydrogen gas is not generated in the inner wall. Since the inner wall of the second through holes 113 is hydrophobic, penetration of the electrolytic solution 12 is prevented, and the gas-liquid interface 52 between the electrolytic solution 14 surface and the gas phase surface (see FIG. 28) is formed on the aperture of the through holes. A mechanism of the formation of the gas-liquid interface 52 is based on the aforementioned Young-Laplace pressure.

Accordingly, the hydrogen gas generated at the promoter-containing layer 43 grows to bubbles and at the same time is come into contact with the gas-liquid interface 52 and absorbed to the gas phase inside the second through holes 113 by a defoaming phenomenon. As a result, a phenomenon in which as the hydrogen gas is produced a hydrogen gas is sucked into the second through holes 113 to move to the back side as soon continues to take place. The hydrogen gas generated at the gas generating device 100 can be recovered from the second gas containing unit arranged on the back side through the hydrogen gas discharge tube 103 (see FIG. 30B).

Eighth Embodiment

Anode-Cathode Integrated Electrode

The gas generating device of this embodiment will be described with reference to FIG. 29. In this embodiment, a gas generating device placed in the photocatalyst cell will not be repeated, but it may be used for all of the photocatalyst cells described in the present invention.

Figure 29:
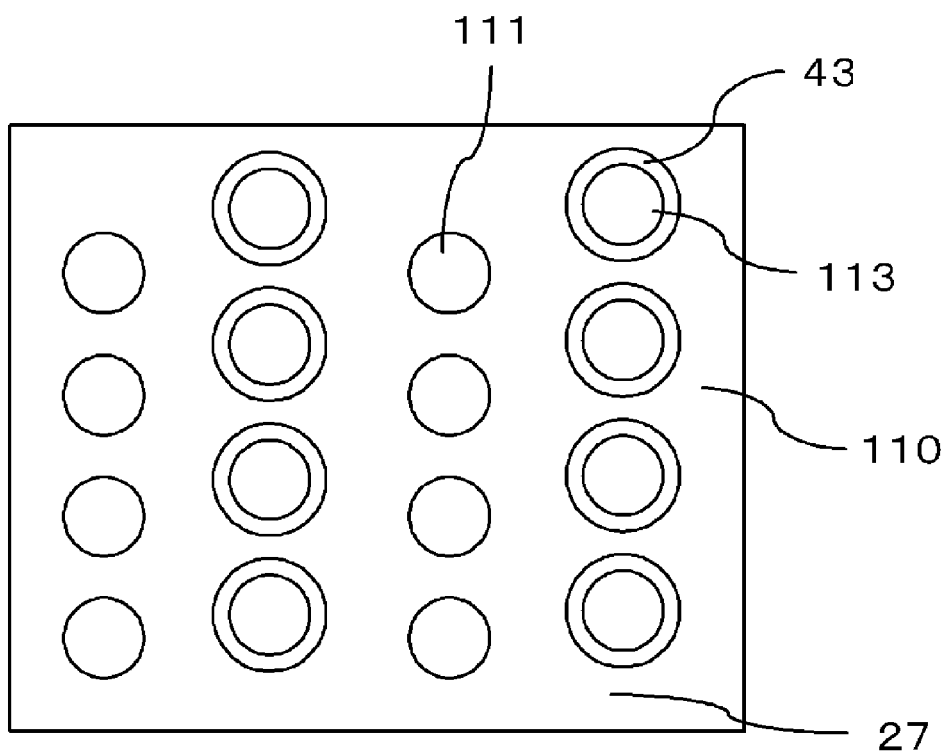
FIG. 29 is a schematic front view of an anode-cathode integrated electrode according to an eighth embodiment illustrating an example of the positional relationship between a photocatalyst-containing layer and a promoter-containing layer.

The gas generating device 100 in this embodiment is, as shown in a schematic top view of FIG. 29, provided with a plurality of the first through holes 111 which are open in a region consisting of a photocatalyst-containing layer 27. On the other hand, a promoter-containing layer 43 is formed in a ring shape along the peripheral portion of the second through holes 113. The promoter-containing layer 43 may be laminated on the photocatalyst-containing layer 27. For suppression of the reverse reaction to react oxygen and hydrogen to turn back into water, only the promoter-containing layer 43 may be formed in a ring shape along the peripheral portion of the second through holes 113.

The photocatalyst-containing layer 27 and the promoter-containing layer 43 are not formed in the inner wall of the through holes, and an oxygen gas and hydrogen gas are not generated in the inner wall. Since the inner wall of the second through holes 113 is hydrophobic, penetration of the electrolytic solution 14 can be suppressed.

Ninth Embodiment

Gas Generating Device Equipped with Anode-Cathode Integrated Electrode

Figure 30A:
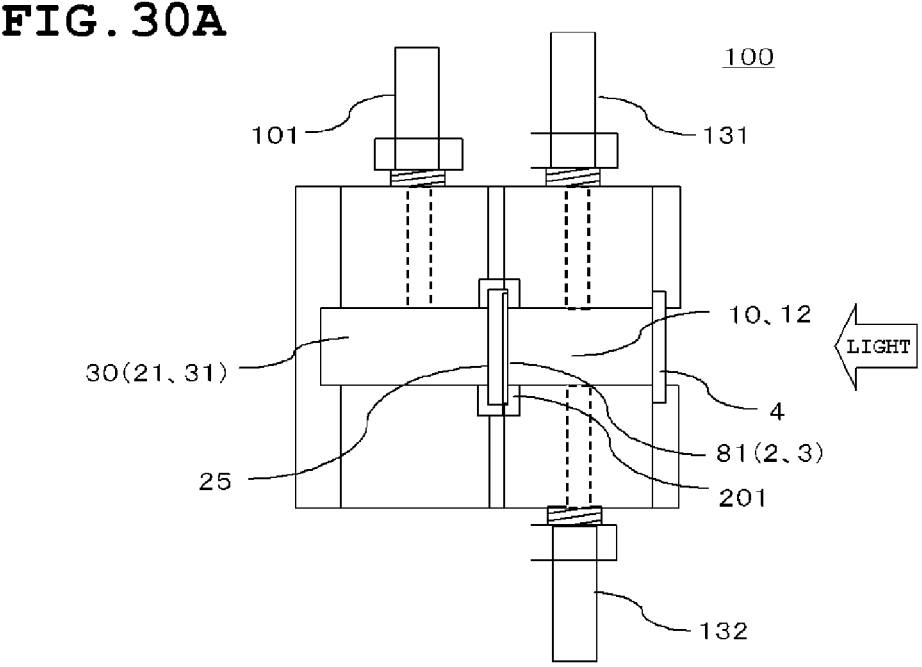
Figure 30B:
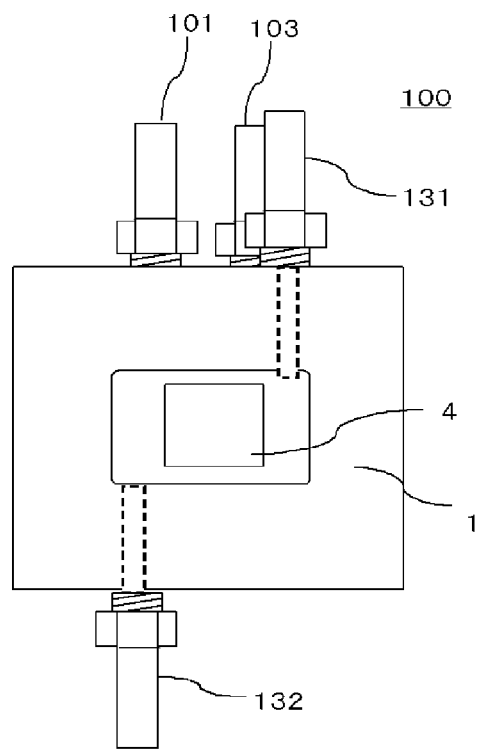
FIG. 30B is a front view of the device.

FIGS. 30A and 30B are schematic views illustrating a construction of the gas generating device 100 equipped with an anode-cathode integrated electrode in this embodiment. FIG. 30A is a sectional side view of the gas generating device 100 equipped with an anode-cathode integrated electrode. FIG. 30B is a front view of the gas generating device 100 equipped with an anode-cathode integrated electrode viewed from a side (light-receiving side) where electrolysis is carried out.

The gas generating device 100 equipped with an anode-cathode integrated electrode shown in FIGS. 30A and 30B is provided with a light receiving window 4 arranged to face a photocatalyst supporting surface 20 of the gas generating device 100 equipped with a catalyst-containing layer 81 (photocatalyst-containing layer 27 and promoter-containing layer 43), a first gas containing unit arranged on the back side of the photocatalyst supporting surface 20 of the gas generating device 100, and a second gas containing unit arranged on the back side of the photocatalyst supporting surface 20 of the gas generating device 100. In this embodiment, the device is provided with an electrolytic bath 10 surrounding the photocatalyst supporting surface 20.

That is, the gas generating device 100 equipped with an anode-cathode integrated electrode of this embodiment is provided with the light receiving window 4 allowing passage of the excitation light of the photocatalyst and irradiating the excitation light on the photocatalyst-containing layer 27. The light receiving window 4 is arranged at a position opposite to the photocatalyst-containing layer 27 and the promoter-containing layer 43, and the excitation light that has passed through the light receiving window 4 radiates on the photocatalyst-containing layer 27 and the promoter-containing layer 43.

An irradiation light source irradiating the excitation light of the photocatalyst contained in the photocatalyst-containing layer 27 with respect to the light receiving window 4 may be further provided. For the irradiation light source, a high pressure mercury lamp, a Xenon lamp or the like may be used. For the excitation light of the photocatalyst, a light having a wavelength of equal to or more than 250 nm may be used.

The gas generating device 100 is provided with a catalyst layer formed on one surface of a base material 25. The gas generating device 100 is installed in an electrode holder 120 and fixed to the photocatalyst cell 1. The light receiving window 4 is composed of a material which may allow passage of the excitation light. Specific examples thereof include inorganic materials such as glass and the like; and high polymer materials such as a polyimide resin, an acrylic resin, a polyethylene resin, a polycarbonate resin, a polyolefin resin, an epoxy resin and the like.

In this embodiment, the light receiving window 4 constituting apart of the side wall of an electrolytic solution containing unit 12 is exemplified, but a partition wall allowing passage of the excitation light and constituting the side wall of the electrolytic bath 10 may be further provided between the light receiving window 4 and the gas generating device 100.

The photocatalyst cell 1 is provided with a bottom wall 26, and constitutes a gas containing unit 41 surrounding the back side of the photocatalyst supporting surface 20 of the gas generating device 100. A gas containing unit 30 is divided by the partition wall, and a first gas containing unit 21 (not illustrated) and a second gas containing unit 31 (not illustrated) are provided.

An electrolytic solution supply tube 131 and an electrolytic solution discharge tube 132 connect to the electrolytic bath 10, and the electrolytic solution can circulate by means of a circulating pump (not illustrated) or the like. In FIG. 30A, the electrolytic bath 10 is filled with the electrolytic solution 12.

Figure 31:
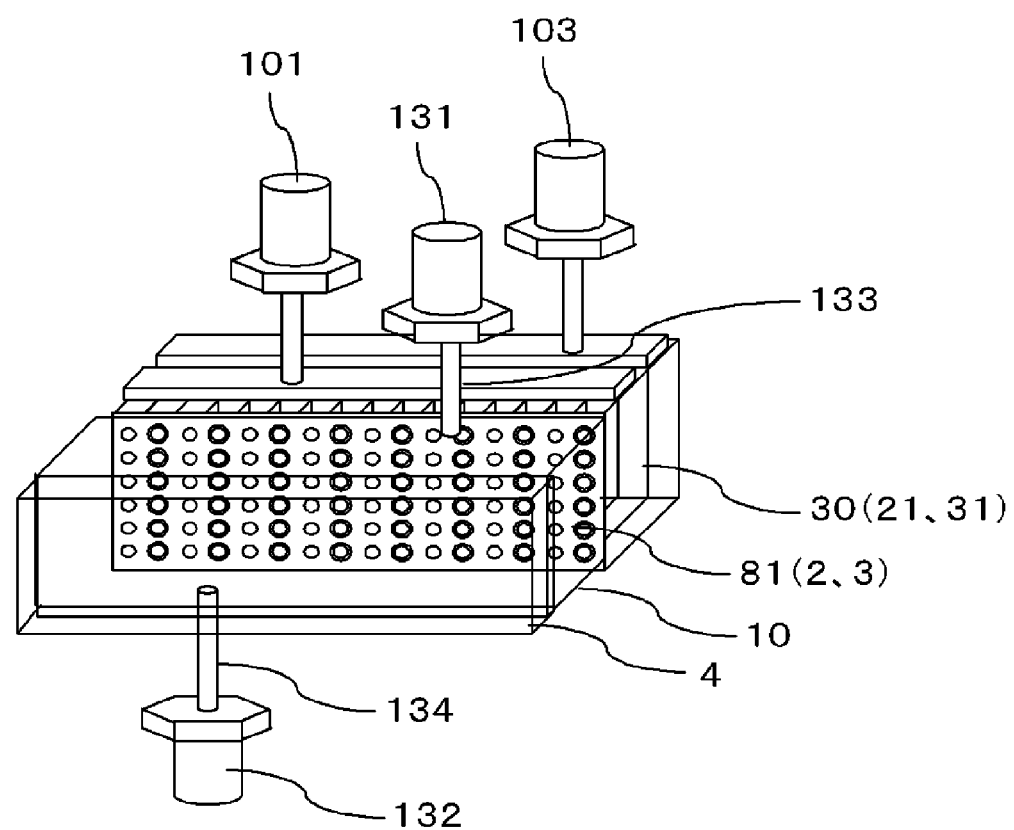
FIG. 31 is a three-dimensional perspective view of the gas generating device equipped with an anode-cathode integrated electrode according to the ninth embodiment.

FIG. 31 is a three-dimensional perspective view of a structure inside the gas generating device 100 equipped with an anode-cathode integrated electrode shown in FIGS. 30A and 30B. The light 7 that has penetrated through the light receiving window 4 radiates on the anode-cathode integrated electrode shown in FIG. 29, and the oxygen gas and hydrogen gas are collected in the gas containing unit 30 behind. FIG. 30A illustrate a case where the first gas containing unit 21 and the second gas containing unit 31, as regards the gas containing unit 30, are alternately arranged side by side. The oxygen gas and hydrogen gas are contained in the respective gas containing units, and may be discharged to the outside through an oxygen gas discharge tube 101 and a hydrogen gas discharge tube 103.

In this embodiment, the electrolytic solution 12 contains water as a main component. For example, there may be used a weak acid solution containing hydrochloric acid, sulfuric acid, nitric acid, acetic acid, oxalic acid or the like; a weak alkaline aqueous solution of sodium peroxide, potassium peroxide, sodium carbonate, potassium carbonate or the like; an aqueous solution of alcohols such as methanol, ethanol, propanol and the like; and an aqueous solution of carboxylic acids such as acrylic acid, phthalic acid and the like.

The first gas containing unit communicates with the first through holes of the gas generating device 100. The oxygen gas generated at the photocatalyst-containing layer 27 moves to the first gas containing unit via the first through holes and is contained in the first gas containing unit. The oxygen gas discharge tube 101 connects to the first gas containing unit, and the oxygen gas can be recovered through the oxygen gas discharge tube 101.

The second gas containing unit communicates with the second through holes of the gas generating device 100. The hydrogen gas generated at the promoter-containing layer 43 moves to the second gas containing unit via the second through holes and is contained in the second gas containing unit. The hydrogen gas discharge tube 103 connects to the second gas containing unit, and the hydrogen gas can be recovered through the hydrogen gas discharge tube 103.

In this embodiment, the oxygen gas discharge tube 101 and the hydrogen gas discharge tube 103 are arranged, but it is also possible to use these tubes together. An inert gas such as a nitrogen gas, an argon gas or the like may be fed from the oxygen gas discharge tube 101 and the hydrogen gas discharge tube 103, as necessary, and the produced gases is easily discharged.

In this embodiment, the light receiving window 4 is placed to face the photocatalyst supporting surface 20 (photocatalyst-containing layer 27 and promoter-containing layer 43) of the anode electrode 2 and the cathode electrode 3, but the present invention is not limited to this. The base material 5 having the anode electrode 2 and the cathode electrode 3 is composed of a material which is transparent with respect to the excitation light 7, and the excitation light 7 may radiate from the back of the anode electrode 2 and the cathode electrode 3.

That is, the anode electrode 2 and the cathode electrode 3 are each composed of a material allowing passage of the excitation light 7. The light receiving window 4 allowing passage of the excitation light 7 and irradiating the light on the photocatalyst-containing layer 27 may be arranged to face the anode electrode 2 and the cathode electrode 3 at a side opposite to the photocatalyst supporting surface 20. The excitation light 7 that has passed through the light receiving window 4 further passes through the anode electrode 2 and the cathode electrode 3, and may be radiate on the photocatalyst-containing layer 27 and the promoter-containing layer 43.

Tenth Embodiment

Figure 32A:
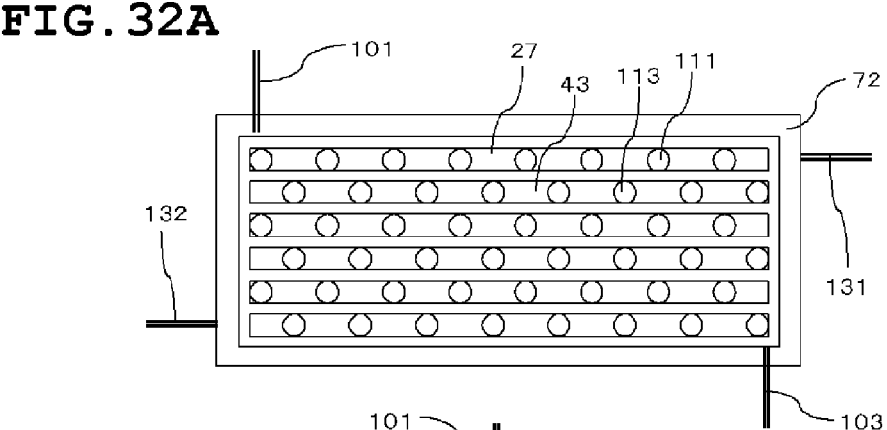
FIG. 32A is a top view of a gas generating device equipped with an anode-cathode integrated electrode according to a tenth embodiment.
Figure 32B:
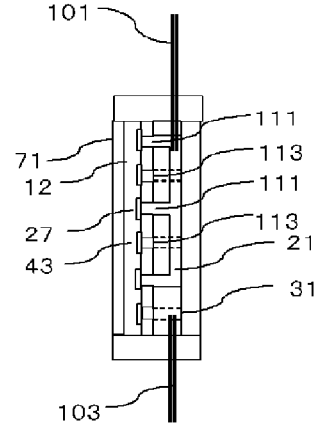
FIG. 32B is a sectional side view on the short side.

Solar Compatible Gas Generating Device Equipped with Anode-Cathode Integrated Electrode In the gas generating device 100 in this embodiment, as shown in a schematic top view of the photocatalyst cell 1 in FIG. 32A, a plurality of the first through holes 111 are open in a region consisting of a photocatalyst-containing layer 27, while a plurality of the second through holes 113 are open in a region consisting of a promoter-containing layer 43. FIG. 32B illustrates a sectional side view on the short side of the photocatalyst cell illustrating the positional relationship between the first through holes 111 and the second through holes 113, while FIG. 32C illustrates a sectional side view on the long side.

Figure 32C:
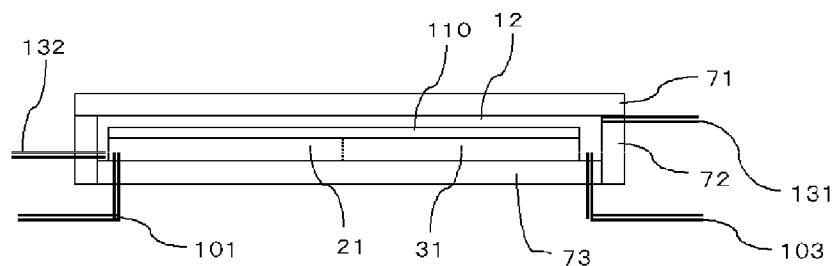
FIG. 32C is a sectional side view on the long side.

As shown in FIGS. 32A to 32C, the gas generating device 100 is provided with an oxygen gas discharge tube 101 and a hydrogen gas discharge tube 103 at the back of the device. Furthermore, an electrolytic solution supply tube 131 and an electrolytic solution discharge tube 132 are placed on an electrolytic solution containing unit 12 arranged on a photocatalyst supporting surface 20 side of the gas generating device 100.

As shown in FIGS. 32B and 32C, the gas generating device 100 is fixed to the interior of the photocatalyst cell case surrounded and supported by a transparent glass plate (light receiving window) 71 on a light-irradiated side, a side wall plate 72 and a bottom plate 73. A first gas containing unit 21 and a second gas containing unit 31 are arranged at the back of the gas generating device 100. The first gas containing unit 21 shown in FIG. 32B communicates so that the oxygen gas contained inside the first gas containing unit 21 via the first through holes 111 is discharged to the outside through the oxygen gas discharge tube 101. In the same manner, the second gas containing unit 31 communicates so that the hydrogen gas contained inside the second gas containing unit 31 via the second through holes 113 is discharged to the outside through the hydrogen gas discharge tube 103.

The electrolytic solution is supplied from the electrolytic solution supply tube 131 to the electrolytic solution bath 12, passes between the gas generating device 100 and the glass plate 71, and is discharged from the electrolytic solution discharge tube 132.

Figure 32D:
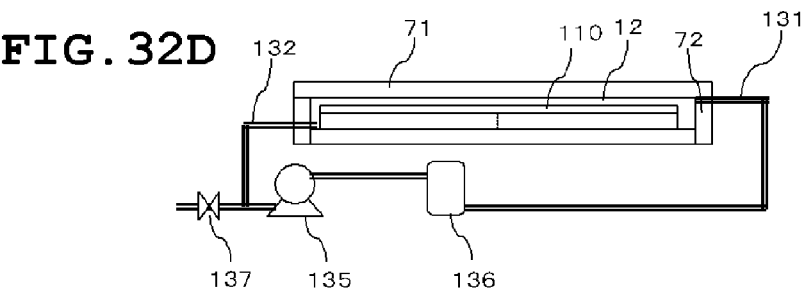
FIG. 32D is a sectional side view of the gas generating device having a circulating pump connected to the device.

In the photocatalyst cell in FIG. 32D, unlike FIG. 32C, the electrolytic solution supply tube 131 and the electrolytic solution discharge tube 132 connect to a circulating pump, and the electrolytic solution in the electrolytic solution containing unit 12 can circulate.

First, a novel electrolytic solution is stored in a storage tank (not illustrated) and sent to an electrolytic solution filter bath 136 by means of an electrolytic solution pump 135 through an open water supply valve 137, and foreign substances or the like are removed.

Next, when the liquid surface of the electrolytic solution filter bath 136 reaches a certain value, the electrolytic solution is sent to the interior of the electrolytic solution containing unit 12 through the electrolytic solution supply tube 131 by its pressure. The electrolytic solution showing the end of the reaction on the gas generating device 100 is sent to the electrolytic solution discharge tube 132 and returned to the pump 135. When the liquid surface of the empty electrolytic solution filter bath 136 reaches a certain value, this cycle is repeated again.

When the electrolytic solution is consumed, it is discharged through the valve 137 and a novel electrolytic solution is supplied again.

In FIGS. 32B, 32C and 32D, the connecting position of the oxygen gas discharge tube 101 and the hydrogen gas discharge tube 103 is different, but it may be properly changed in accordance with the device construction.

Eleventh Embodiment

The gas generating device 100 in this embodiment differs in only the first gas containing unit 21 and the second gas containing unit 31 from the gas generating device 100 of the tenth embodiment. Only different points will be described.

Figure 33A:
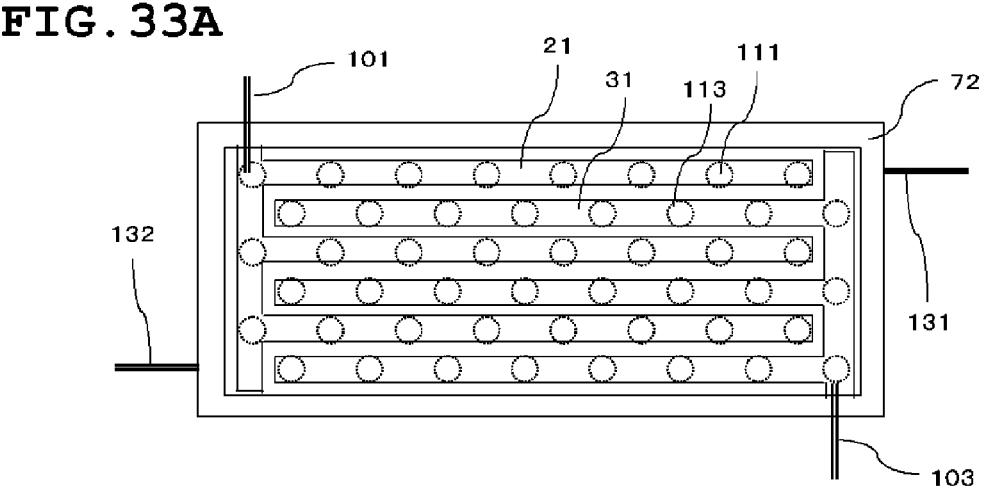
Figure 33B:
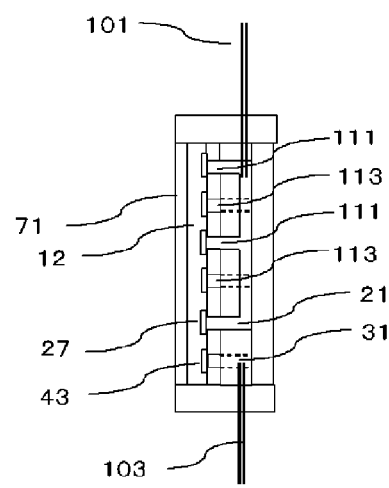
FIG. 33B is a cross-sectional view of a flow channel of hydrogen gas and oxygen gas viewed from a side.
Figure 34:
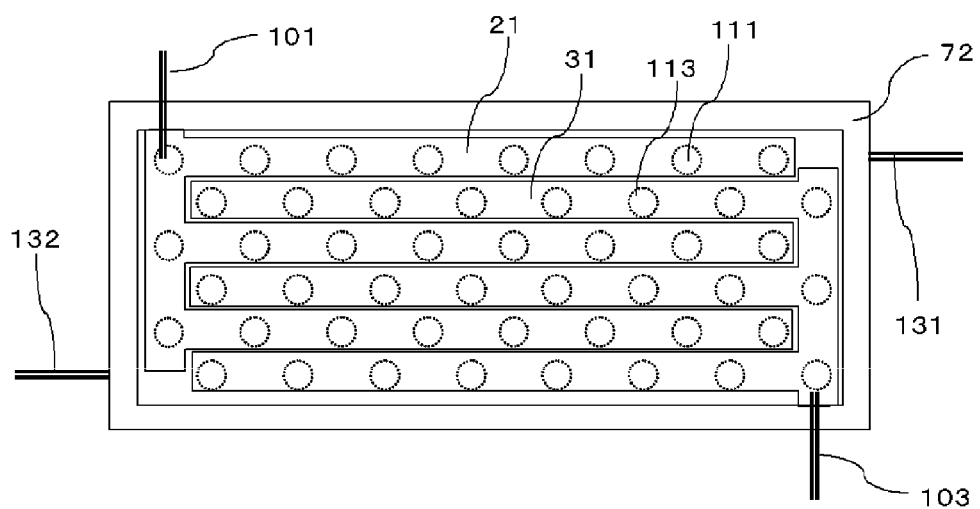
FIG. 34 is a perspective top view of the gas generating device 100 illustrated in FIG. 33A, and illustrates the positional relationship of the flow channel of hydrogen gas and oxygen gas.

FIG. 33A is a schematic top view when the gas generating device 100 is cut parallel to a surface of the gas generating device 100 in the photocatalyst cell 1 in this embodiment, and illustrates the positional relationship of a flow channel of a hydrogen gas and an oxygen gas. FIG. 33B is a sectional side view on the short side of the photocatalyst cell 1 illustrating the positional relationship between the first through holes 111 and the second through holes 113. FIG. 34 is a perspective top view of the gas generating device 100 shown in FIG. 33A illustrating the positional relationship of a flow channel of a hydrogen gas and an oxygen gas.

In the back side of the gas generating device 100, a first gas containing unit 21 is formed in a comb shape below the first through holes 111, while a second gas containing unit 31 is formed in a comb shape below the second through holes 113. The first gas containing unit 21 and the second gas containing unit 31 are alternately disposed. The first gas containing unit 21 communicates with all first through holes 111. The first gas containing unit 21 connects to an oxygen gas discharge tube 101, and the oxygen gas can be recovered. The second gas containing unit 31 communicates with all second through holes 113. The second gas containing unit 31 connects to a hydrogen gas discharge tube 103, and the hydrogen gas can be recovered.

Method for Producing Gas Generating Device Equipped with Anode-Cathode Integrated Electrode Next, a method for producing the gas generating device 100 equipped with an anode-cathode integrated electrode will be described.

First, through holes are formed on a base material 5. To form holes, a method of periodically forming a uniform hole shape on one surface of the base material may be used. Cutting, etching or the like with the use of a rotary drill, for example, may be used for the formation of the holes.

The shape of the aperture of the through holes is not particularly limited, but it is preferably a round shape in order that electrons and protons are mutually transferable isotropically from any direction from peripheral holes. It is preferable that the diameter of the aperture of the through holes is equal to or less than 300 µm, while the pitch interval of the aperture is equal to or more than 1.5 times and equal to or less than 5 times.

It is required that protons and electrons are bound with good efficiency on the surface of a promoter to generate hydrogen and that the reverse reaction to turn back into water hardly takes place.

The promoter contained in the promoter-containing layer 43 of the cathode electrode 3 is preferably at least one kind selected from the group consisting of platinum, nickel, ruthenium, nickel oxide and ruthenium oxide. It is preferable that the promoter-containing layer 43 containing a promoter of them is formed with a width of equal to or more than 1 µm in the periphery of the second through holes 113.

For a method of forming the promoter-containing layer 43, for example, a positive-type photoresist is applied over the entire surface of the sheet, and a photomask having a circular aperture greater by 1 µm or greater than the hole diameter is fixed in alignment with the position of the promoter electrode. Exposure of the light of a wavelength sensitive to the resist results in only the resist in the periphery of the second through holes 113 being soluble and removed during development.

Next, in the same manner as in the photocatalyst-containing layer 27, the promoter-containing layer 43 is formed by an ion plating method, a chemical vapor deposition method, a vacuum deposition method, a sputtering method, a spin-coating method, a screen printing method, a spraying method, a casting method or the like. Detachment of the finally remained resist along with the promoter attached to the resist portion enables the promoter-containing layer 43 to be selectively patterned.

The same patterns can be formed even by sputtering using a mask for a sputtered film. The film thickness of the promoter-containing layer 43 is preferably in the range of 20 to 200 nm so as not to cause detachment due to the stress upon detachment of the resist during patterning. A voltage may be applied for electrolysis acceleration between the photocatalyst-containing layer 27 and the promoter-containing layer 43 from the outside.

Next, a method of hydrophobizing the inner wall of the through holes and the back surface of the base material 25 will be described.

Examples of a typical method of surface modification to control the surface chemical properties of the solid surface such as dispersibility, wettability, adhesiveness, adsorptivity and the like include (1) a coupling agent modification method, (2) a graft copolymerization method of a polymer, (3) an encapsulation method, (4) a sol-gel method and the like.

In the coupling agent modification method, a silane coupling agent and a titanium coupling agent have been widely used. Ends of these molecules are subjected to a chemical reaction with a hydroxyl group of the solid surface and an oriented monomolecular film of which the other ends face the surface side is formed, and various functional groups are introduced to the solid surface depending on the purpose. In particular, HMDS (hexamethyldisilazane) may be suitably used for hydrophobization of the resin surface.

The graft modification method of the polymer is a method for growing the polymer on the solid surface by a chemical reaction between a functional group on the solid surface and monomer. The polymer is grafted with the use of the functional group introduced by the coupling agent, or an electrolysis polymerization reaction, a mechanochemical reaction, or a polymerization reaction using radiation or plasma is induced in some cases.

The encapsulation method is a method of coating the solid particle with a polymer film, and has a feature such that a film generally thicker than that formed by the graft polymerization method is formed and it is not necessary to form a chemical bond between the film and the solid surface.

In the sol-gel method, the solid surface is coated with inorganic glass using alkoxide as a raw material.

Twelfth Embodiment

Ridge Type Gas Generating Device

Figure 35A:
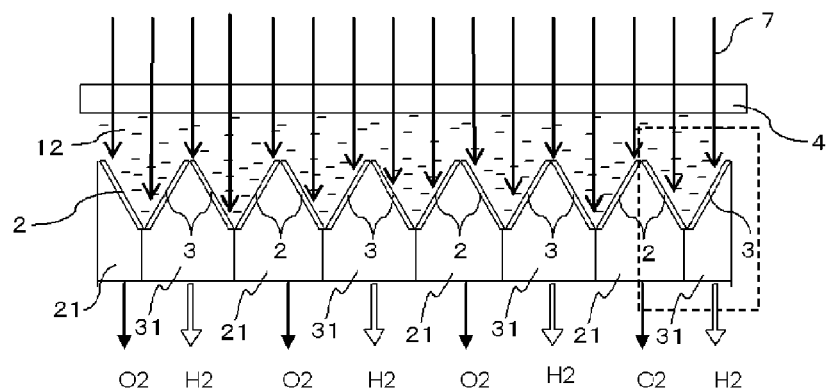
Figure 35B:
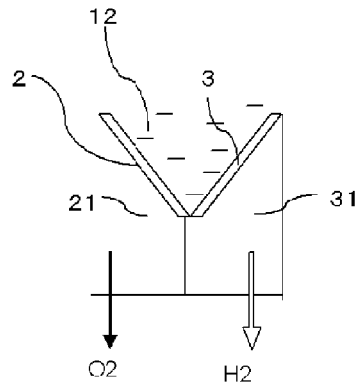
FIG. 35B is an enlarged view.
Figure 36A:
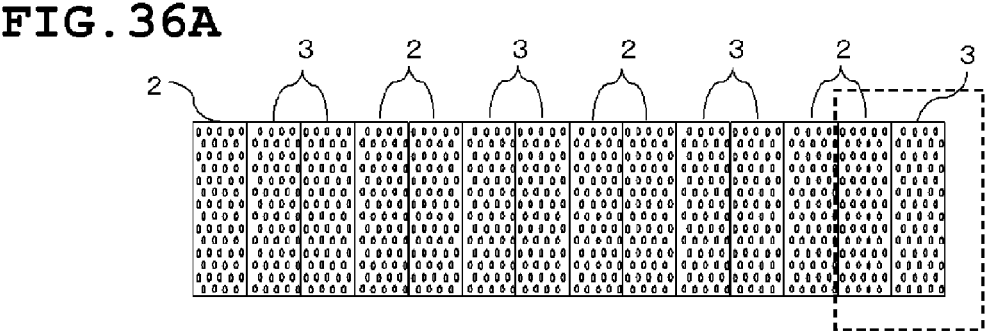
Figure 36B:
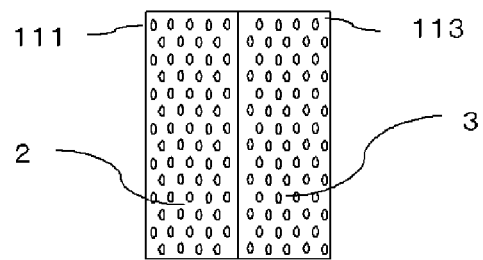
FIG. 36B is an enlarged view.

FIGS. 35A and 35B are side views of the gas generating device 100 of this embodiment. FIGS. 36A and 36B are plan views of the gas generating device 100.

At least one of a photocatalyst-containing layer (anode electrode 2) and a promoter-containing layer (cathode electrode 3) is arranged at a tilt with respect to a base material.

Furthermore, the photocatalyst-containing layer (anode electrode 2) or the promoter-containing layer (cathode electrode 3) has a convex portion protruding from the base material.

The gas generating device 100 of this embodiment is configured such that the anode electrode 2 and the cathode electrode 3 are alternately arranged, an angle between the respective electrodes is created, and the anode electrode 2 and the cathode electrode 3 are arranged so as to be folded up at a position to face each other, thus forming a stereo configuration (ridge type).

In the gas generating device 100 of this embodiment, gas containing units 21 and 31 are arranged on the respective electrodes. Accordingly, the light 7 incident through a light receiving window 4 is effectively captured, and produced oxygen and hydrogen can be separated and collected with good efficiency.

FIG. 35A is a view of a cross-sectional structure from a side, while FIG. 36A is a view illustrating the arrangement of only the electrode portion from the top to show the arrangement of the anode electrode 2 and the cathode electrode 3. Furthermore, FIG. 35B and FIG. 36B are each an enlarged view of the portion surrounded by the dotted line in FIG. 35A and FIG. 36A.

The anode electrode 2 and the cathode electrode 3 are formed in a ridge shape so as to respectively surround the gas containing units 21 and 31, and the electrolytic solution 12 is placed on the respective electrodes. The through holes 111 and 113 are respectively formed on the anode electrode 2 and the cathode electrode 3. The inner wall of the through holes 111 and 113 is subjected to a water-repellent (lyophobic) treatment, and the electrolytic solution does not penetrate into the through holes 111 and 113 and is not leaked. The oxygen gas may be taken out from the anode electrode 2 through the gas containing unit 21 via the through holes 111. On the other hand, the hydrogen gas may be taken out from the cathode electrode 3 through the gas containing unit 31 via the through holes 113.

Figure 37:
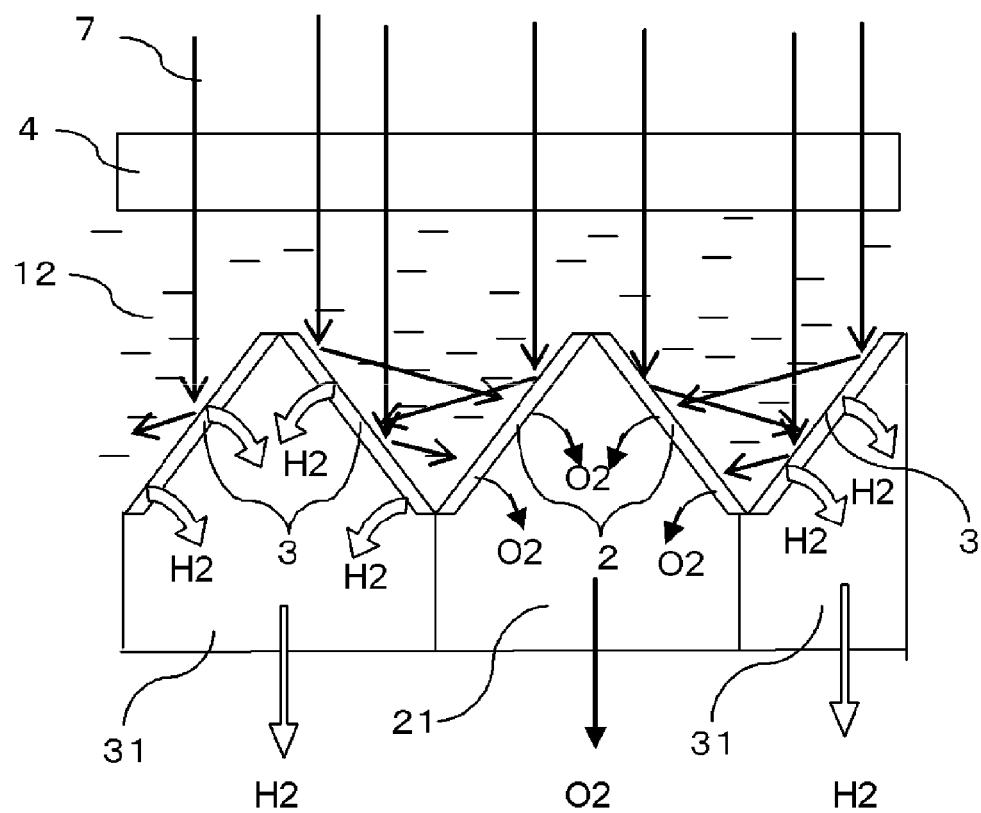
FIG. 37 is a view illustrating the reflection of light in the ridge type gas generating device according to the twelfth embodiment.

Two anode electrodes 2 form one ridge as one set. The anode electrodes 2 are arranged at a tilt with the adjacent cathode electrodes 3 forming one ridge as one set in the same manner. The anode electrode 2 and the cathode electrode 3 are opposed to each other. Its configuration is shown in FIG. 35B. The anode electrode 2 and the cathode electrode 3 are opposed to each other while being tilted by sandwiching the electrolytic solution 12. This contributes to acceleration of generation of oxygen and hydrogen for two reasons. The first reason is that the distance between the anode electrode 2 and the cathode electrode 3 becomes narrow and the movement distance of protons generated at the cathode electrode 3 can decrease. Thus, efficiency of collection of protons improves. The second reason is that the light is irradiated on the opposing electrodes by reflection of the incident light, and effective use of incident light can be achieved by further reflection of the incident light. Reflection of this light is shown in FIG. 37. Such a structure is particularly effective in case of a condensing type, and the incident light can be effectively utilized at the maximum. In case of a condensing type, there is a problem such that electrodes are heated, whereas it also has a feature that it tends to suppress the temperature rise since the electrodes are always immersed in the electrolytic solution.

That is, the cathode electrode 3 has the promoter-containing layer 43 receiving the excitation light 7 and producing a hydrogen gas. In the irradiation step in this method, the excitation light 7 reflected by the anode electrode 2 or the cathode electrode 3 radiates on other photocatalyst-containing layer 27 of the anode electrode 2 or other promoter-containing layer 43 of the cathode electrode 3.

Figure 38:
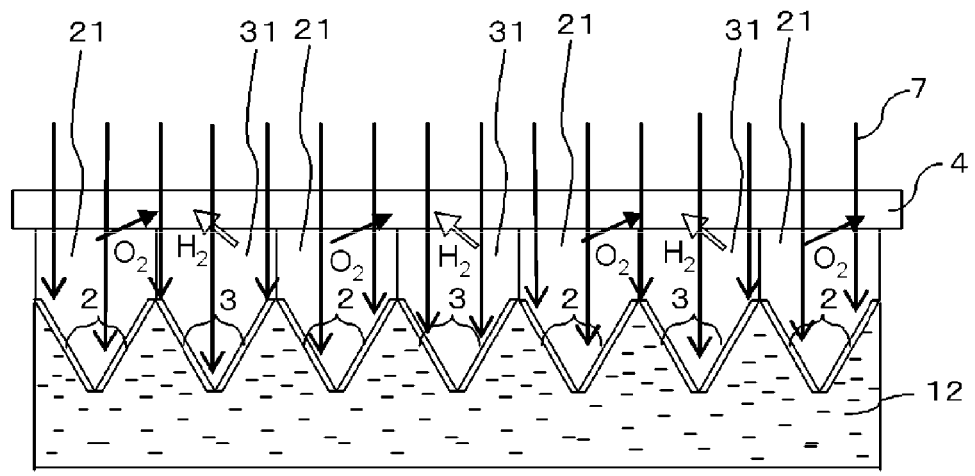
FIG. 38 is a view illustrating a state in which an electrolytic solution is disposed at the bottom in the ridge type gas generating device according to the twelfth embodiment.

In FIG. 38, the electrolytic solution is disposed at the bottom, while the produced oxygen gas and hydrogen gas are collected at the top. In this case, the anode electrode 2 and the cathode electrode 3 are also opposed to each other while being tilted. Nevertheless, even though not illustrated, the photocatalyst-containing layer of the anode electrode 2 and the promoter layer of the cathode electrode are each arranged downward, and the light needs to pass through the base material and radiate on the photocatalyst-containing layer. From the viewpoint described before, at least the base material constituting the cathode electrode 3 is required to be light-transmitting.

It is preferable that the angle between a surface of the photocatalyst-containing layer of the anode electrode 2 and a surface of the promoter-containing layer of the cathode electrode 3 is greater than 0 degree and less than 180 degrees. The angle of 0 degree in this case means that the anode electrode 2 and the cathode electrode 3 are arranged so as to face each other in parallel. Similarly, the angle of 180 degrees means that the anode electrode 2 and the cathode electrode 3 constitute a plane. In this embodiment, a further preferable angle between the photocatalyst-containing layer of the anode electrode 2 and the promoter-containing layer of the cathode electrode 3 is greater than 20 degrees and less than 90 degrees.

Thirteenth Embodiment

Arch Type Gas Generating Device

Figure 39:
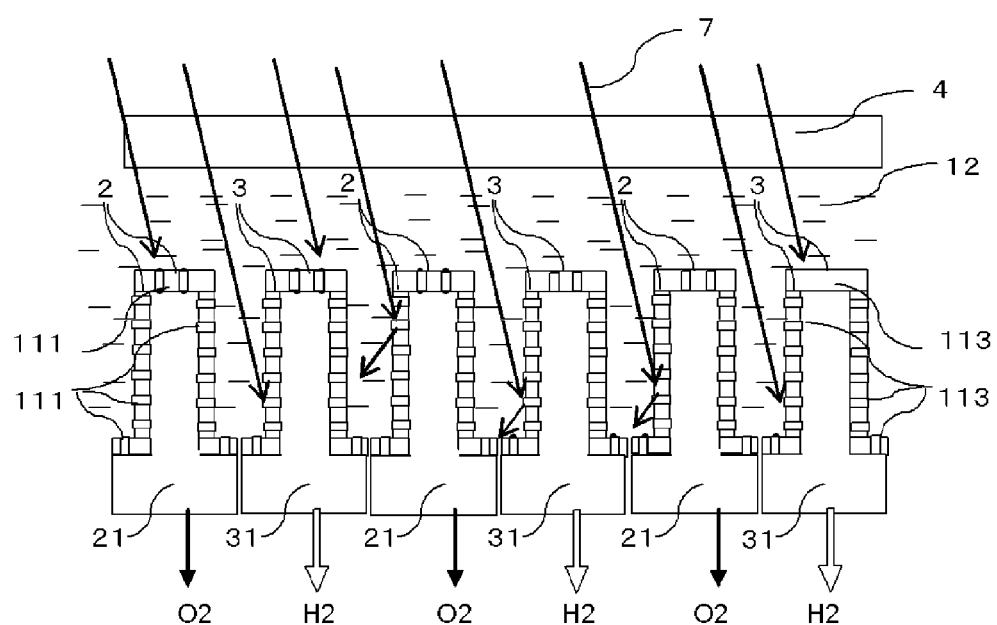
FIG. 39 is a side view of an arch type gas generating device according to a thirteenth embodiment.
Figure 40:
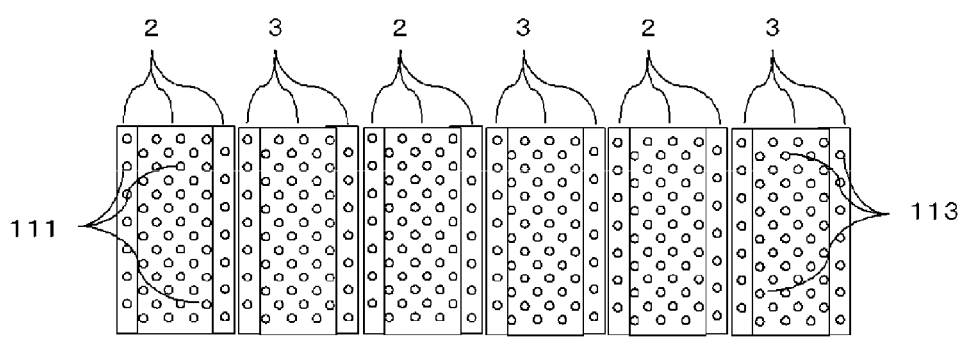
FIG. 40 is a plan view of the arch type gas generating device according to the thirteenth embodiment.

FIG. 39 is a side view of the gas generating device 100 of this embodiment. FIG. 40 is a plan view of the gas generating device 100.

A photocatalyst-containing layer (anode electrode 2) and a promoter-containing layer (cathode electrode 3) of this embodiment each have a convex portion protruding from a base material, thus forming a stereo configuration (arch type).

This convex portion forms a box shape having a pair of vertical faces opposing to each other. Gas containing units 21 and 31 are formed inside this convex portion.

In the arch type gas generating device 100 of this embodiment, each of the anode electrode 2 and the cathode electrode 3 has an arch shape, and is a gas generating device which is also called a modification of the ridge type gas generating device shown in FIGS. 35 to 38. The structure in this embodiment becomes more elaborated. As shown in FIG. 39, the anode electrode 2 having the through holes 111 has a rectangular structure with one side open. One open side communicates with the gas containing unit 21, and a part of the gas containing unit 21 is also formed inside the rectangle. The electrolytic solution 12 is placed at the top of the anode electrode 2 having an arch shape. The inner wall surface of the through holes 111 is subjected to a hydrophobic treatment. Thus, the electrolytic solution 12 at the top does not leak to the gas containing unit 21. Also, the cathode electrode 3 also has an arch shape in the same manner, while the anode electrode 2 has the same box-like structure. FIG. 40 is a view of the arrangement of the anode electrode 2 and the cathode electrode 3 viewed from the top.

Since the anode electrode 2 and the cathode electrode 3 have adjacent box-like (rectangle) structures, opposing surfaces and surfaces facing the same direction are present. Yet, if the height direction of the arch shape increases, opposing surfaces can widen and the distance between the anode and the cathode relatively shortens. The arch type gas generating device 100 of this embodiment has a great advantage that the movement distance of protons generated at the anode electrode 2 can be shortened.

Furthermore, the arch type gas generating device 100 of this embodiment is excellent in the confinement effect of light. The light incident between arches formed by the respective electrodes is reflected on an arch side, and is again irradiated on the counter surface. The promoter-containing layer 43 of the cathode electrode 3 does not need to absorb the light and just makes the light reflected, and the reflected light can radiate again on the photocatalyst-containing layer 27 of the anode electrode (not illustrated in FIG. 39). When the base material constituting the anode electrode 2 (not illustrated) is light-transmitting, the light passes through the electrolytic solution 12 and can be incident upon the photocatalyst-containing layer 27 of the anode electrode 2 placed at the back in the same manner from the back. Thus, effective use of the light can be achieved.

Figure 41:
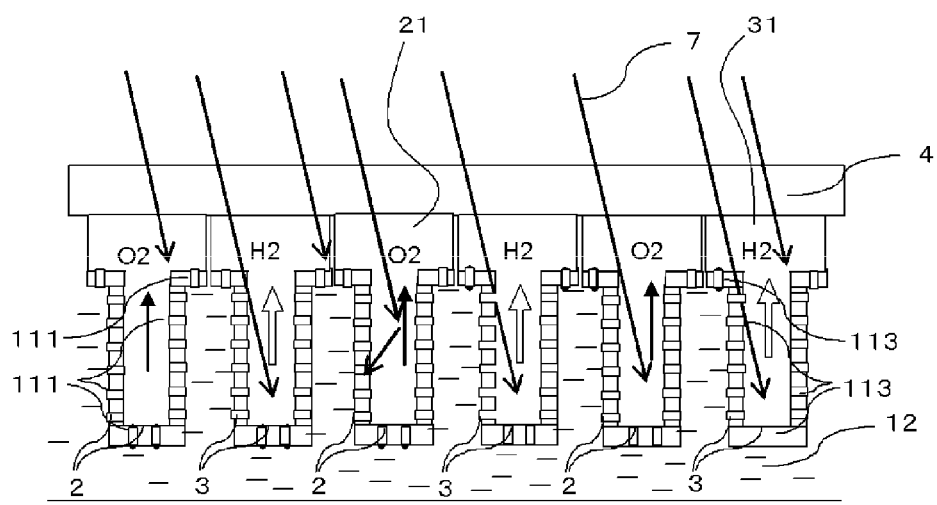
FIG. 41 is a view illustrating a state in which an electrolytic solution is disposed at the bottom in the arch type gas generating device according to the thirteenth embodiment.

In FIG. 41, the electrolytic solution is disposed at the bottom, while the produced oxygen gas and hydrogen gas are collected at the top.

Fourteenth Embodiment

Slit Type Gas Generating Device

Figure 42A:
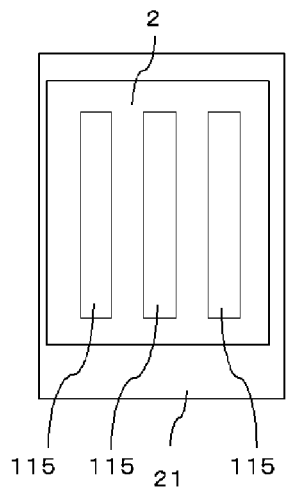
FIGS. 42A to 42C are each an exploratory view of a slit type gas generating device according to a fourteenth embodiment.
Figure 42B:
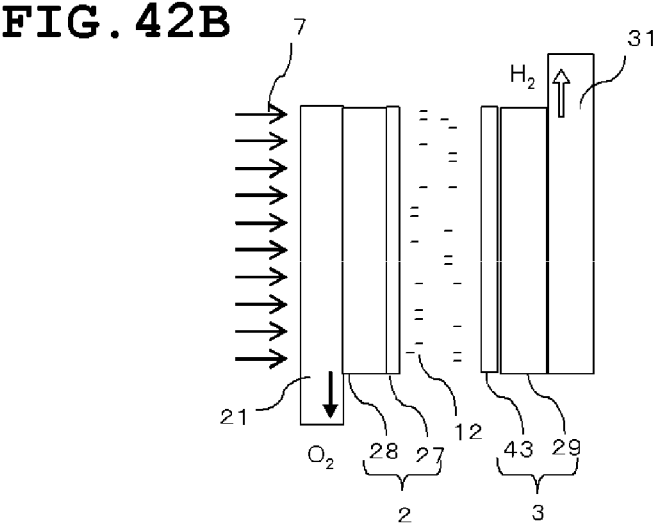
Figure 42C:
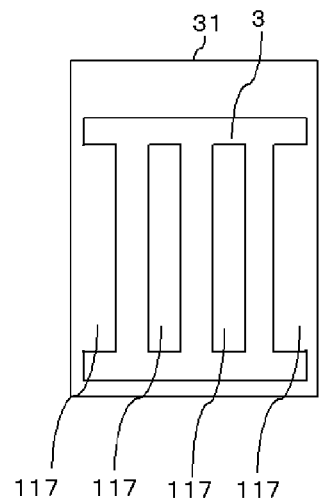

FIGS. 42A to 42C are exploratory views of the gas generating device 100 of this embodiment. The gas generating device 100 of this embodiment is provided with longitudinal through slits 115 formed on an anode electrode 2, and is a slit type device imparting a gas-liquid separation function to these through slits 115.

That is, the through holes (through slits 115 and 117) arranged on a cathode electrode 3 or the anode electrode 2 of this embodiment are slit-shaped.

Both the cathode electrode 3 and the anode electrode 2 have the slit-shaped through holes (through slits 117 and 115). The cathode electrode 3 and the anode electrode 2 are arranged to face each other so that the slit-shaped through holes are out of alignment with each other.

In the slit type gas generating device 100 of this embodiment, gas (oxygen) produced by the photocatalytic function is effectively collected by the through slits 115 and 117. As shown in FIG. 42B, a light 7 is incident upon the anode electrode 2 having a light-transmitting base material 28 through a gas collecting unit 21. Accordingly, oxygen and proton are generated in the electrolytic solution 12 by the light 7 incident from the back of a photocatalyst-containing layer 27. The produced oxygen is recovered at the gas collecting unit 21 via the first the through slits 115. On the other hand, the produced protons move through the electrolytic solution 12 to reach a promoter-containing layer 43 to produce a hydrogen gas, and the gas is collected at a gas containing unit 31 via the second the through slits 117 formed on a base material 29. FIG. 42A is a left side of FIG. 42B, and shows a light-irradiated surface viewed from a side of the photocatalyst-containing layer 27. Also, FIG. 42C is a right side of FIG. 42B, and shows a light-irradiated back surface viewed from a side of the promoter-containing layer 43.

That is, the cathode electrode 3 of this embodiment has the promoter-containing layer 43 receiving the excitation light 7 and producing a hydrogen gas. In the irradiation step of this method, the excitation light 7 that has passed through the through holes (the through slits 115 and 117) arranged on the anode electrode or the cathode electrode 3 radiates on the other promoter-containing layer 43 of the cathode electrode 3 or the other photocatalyst-containing layer 27 of the anode electrode 2.

Accordingly, a part of the light 7 radiates on the photocatalyst-containing layer 27, while some other part of the light passes through the through slits 115 and reflected at the promoter-containing layer 43, and radiates again on a surface of the photocatalyst-containing layer 27 in contact with the electrolytic solution. In this manner, the light 7 is effectively used.

Figure 43A:
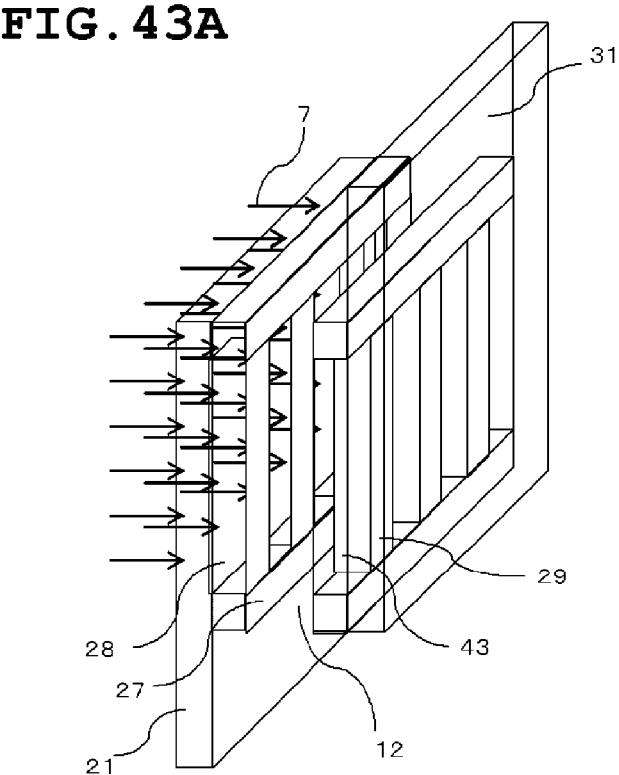
FIGS. 43A and 43B are each a perspective view of the slit type gas generating device according to the fourteenth embodiment.
Figure 43B:
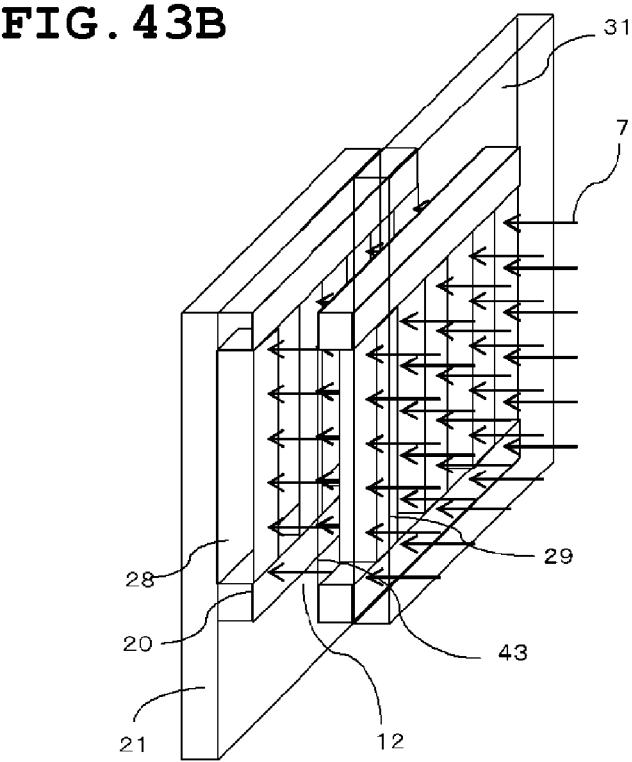

FIGS. 43A and 43B are perspective views of the gas generating device shown in FIGS. 42A to 42C. FIG. 43A is a view showing irradiation with the light 7 from a side of the anode electrode 2 (photocatalyst-containing layer 27) having a structure shown in FIGS. 42A to 42C. On the other hand, FIG. 43B is a view showing irradiation with the light from a side of the cathode electrode 3 (promoter-containing layer 43) to the contrary. In the figure, the light slipping through the through slits 117 radiates on the photocatalyst-containing layer 27, and a photocatalytic function for generating oxygen and hydrogen is achieved.

That is, in the gas generating device 100 of this embodiment, the photocatalyst-containing layer 27 of the anode electrode 2 is formed at a position opposite to the through holes (through slits 117) arranged on the cathode electrode 3. The cathode electrode 3 has the promoter-containing layer 43 receiving the excitation light of the photocatalyst and producing a hydrogen gas. The promoter-containing layer 43 of the cathode electrode 3 is formed at a position opposite to the through holes (through slits 115) arranged on the anode electrode 2.

Fifteenth Embodiment

Flexible Gas Generating Device

Figure 44:
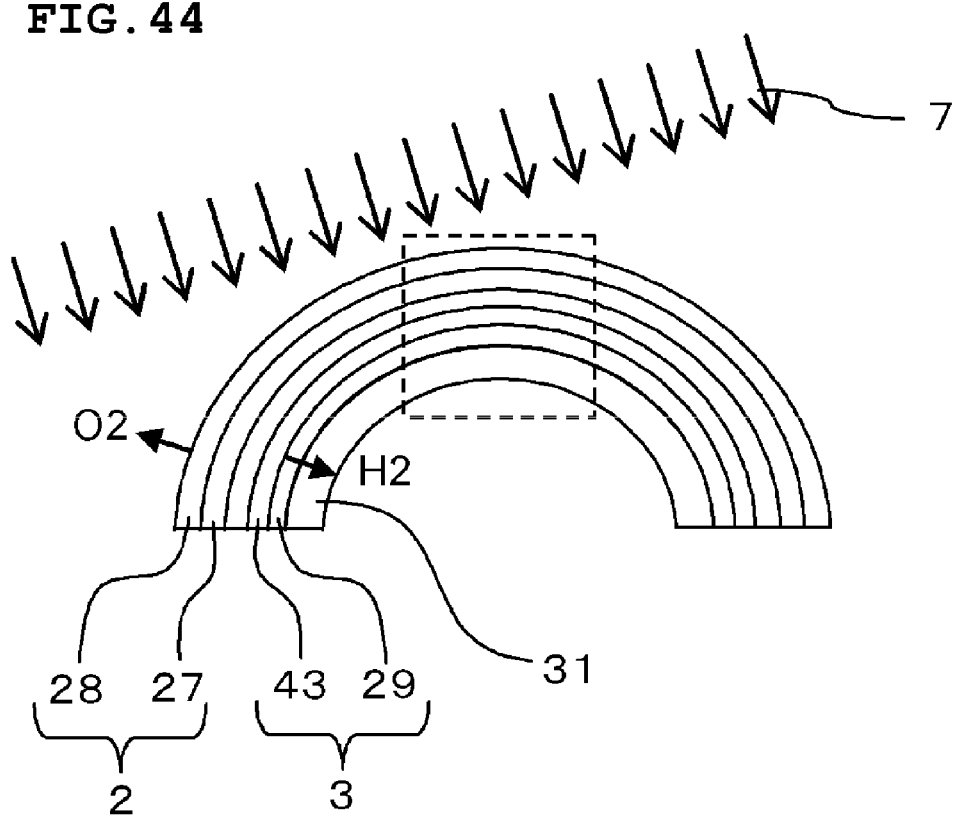
FIG. 44 is a side view of a flexible gas generating device according to a fifteenth embodiment.

FIG. 44 is a side view of the gas generating device 100 of this embodiment. The gas generating device 100 of this embodiment is formed in a circular arc shape and is a flexible type device having a flexibility.

The flexible gas generating device 100 is provided with a pair of electrodes consisting of a cathode electrode 3 and an anode electrode 2 arranged in parallel to each other at predetermined intervals. The pair of electrodes have a curvable or bendable flexibility in a direction perpendicular to the plane.

The anode electrode 2 of the flexible gas generating device 100 is arranged on the outer peripheral side of the circular arch shape, while the cathode electrode 3 is arranged at the inner peripheral side. This is because oxygen is to be discharged at the peripheral side and hydrogen to be collected is to be gathered at the inner peripheral side. A gas containing unit 31 collecting hydrogen at the inner peripheral side is arranged. Nevertheless, the anode electrode 2 may be arranged at the inner peripheral side of the circular arch shape and the cathode electrode 3 may be arranged at the outer peripheral side in order that a function to collect hydrogen is imparted to the outer peripheral side.

Figure 45:
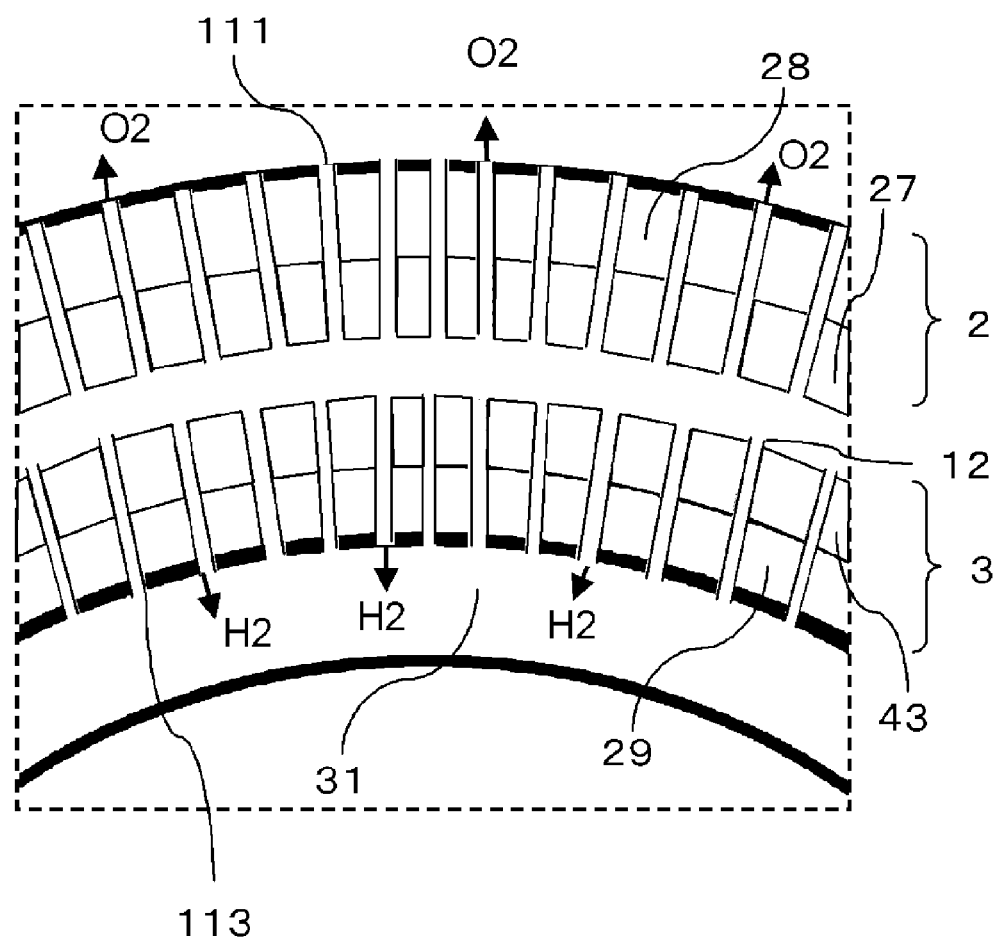
FIG. 45 is an enlarged view of FIG. 44.

FIG. 45 is an enlarged view of a part of the gas generating device shown in FIG. 44 surrounded by the dotted line. The electrolytic solution that is water is sandwiched between the anode electrode 2 formed from a light-transmitting base material 28 and a photocatalyst-containing layer 27, and the cathode electrode 3 formed from a promoter-containing layer 43 and a non-light-transmitting base material 29. The solution is photocatalyzed to produce oxygen and hydrogen. The produced oxygen is discharged to the outside via the first through holes 111, but similarly the produced hydrogen is collected at the gas containing unit 31 via the second through holes 113.

Figure 46:
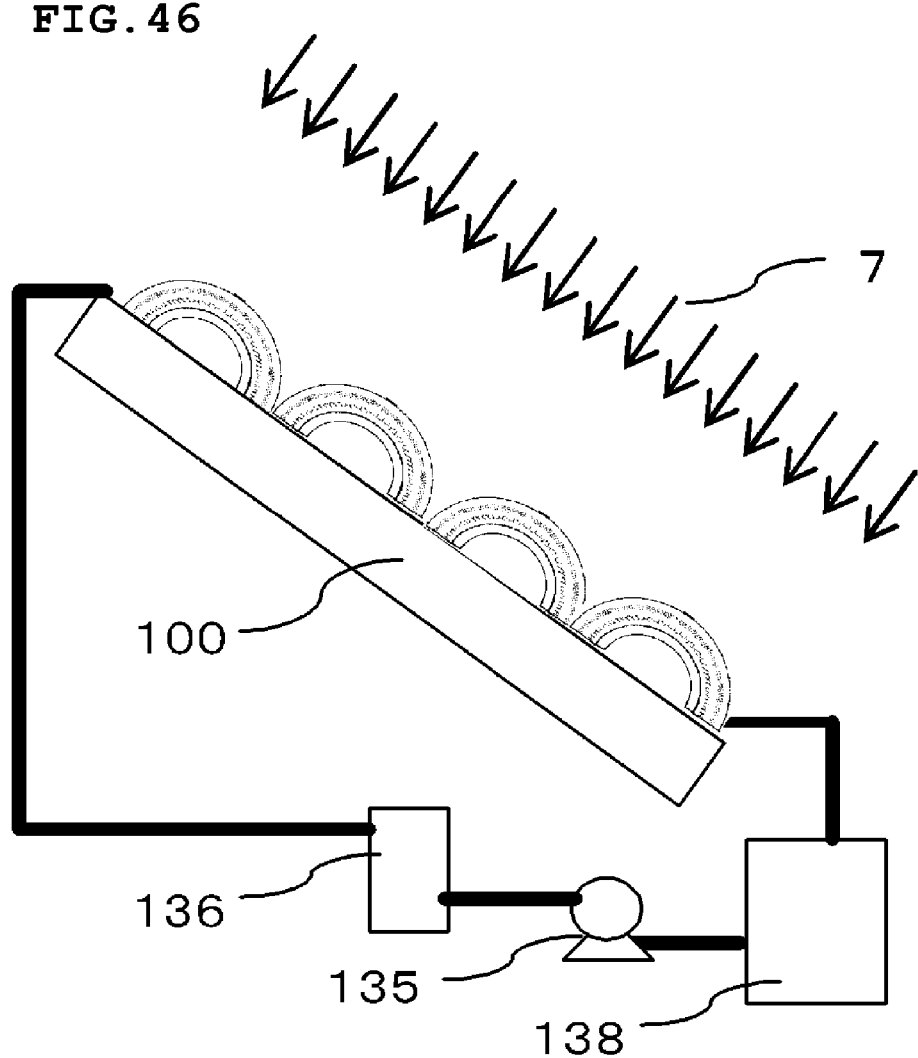
FIG. 46 is a view illustrating a state of use of the flexible gas generating device according to the fifteenth embodiment.
Figure 47:
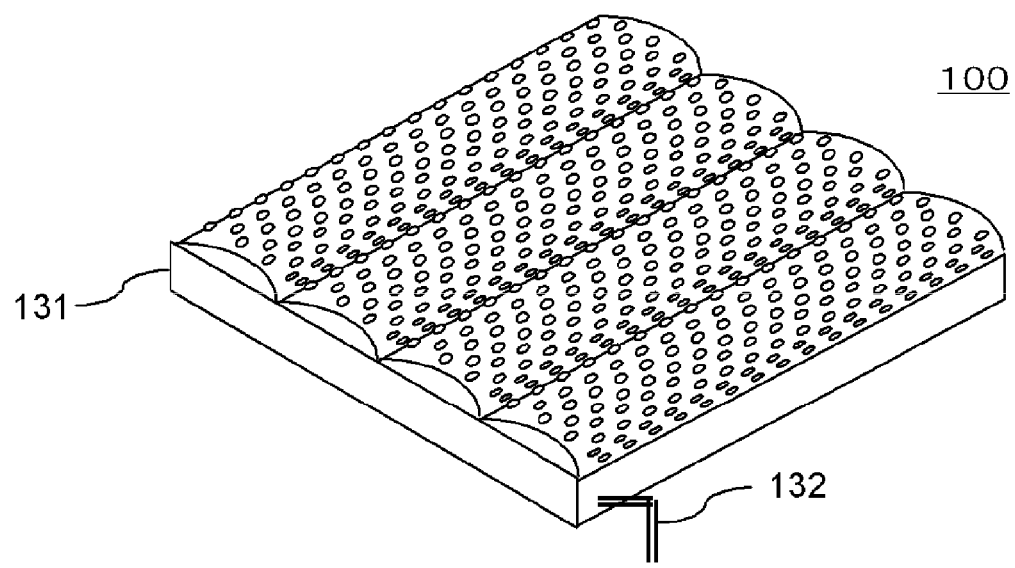
FIG. 47 is a perspective view of the flexible gas generating device according to the fifteenth embodiment.

FIG. 46 is a view illustrating a state of use of the flexible gas generating device 100 of this embodiment. FIG. 47 is a perspective view of the flexible gas generating device 100 of this embodiment. In FIG. 46, the gas generating device 100 is arranged so as to produce a hydrogen gas by the use of sunlight outside. The flexible gas generating device 100 is arranged at a tilt so as to be irradiated with sunlight vertically as much as possible. This device is provided with a water bath 138 containing the electrolytic solution, a circulating pump 135 sending water and a filter bath 136 maintaining cleanliness of the water.

The gas generating device of this embodiment may be used for a device for producing a fuel cell or hydrogen that is a raw material of a fuel cell.

As described above, the embodiments of the present invention has been described with reference to the drawings, but the embodiments are examples of the present invention and other various constructions may also be adopted.

For example, in the gas generating device in the embodiment, one set of a pair of the anode electrode 2 and the cathode electrode 3, as well as more than one set of a pair of electrodes, may also be arranged in parallel. When both the anode electrode 2 and the cathode electrode 3 are transparent with respect to the irradiation light, they may also be placed in series.

In the embodiment, a light source for irradiation with excitation light may be further arranged. Namely, the gas generating device 100 may further be provided with a light source for irradiation with the excitation light.

In the embodiment, examples of the devices include a device in which the anode electrode 2 and the cathode electrode 3 of the same size are arranged in parallel, and a photocatalyst supporting surface 20 and a gas generating surface of the cathode electrode 3 are opposed to each other. Nevertheless, the size of the anode electrode 2 and the cathode electrode 3 may be changed and a plurality of the cathode electrodes 3 may be arranged, or a plurality of the cathode electrodes 3 may be arranged so as to be perpendicular to the anode electrodes 2. In this case, the second through holes are not formed on the cathode electrode 3.

In the gas generating device of the embodiment, the oxygen gas and hydrogen gas are separated and recovered, but may be recovered as a mixed gas. In the gas generating device of the embodiment, both the oxygen gas and hydrogen gas are recovered, but only one of generated gases may be collected.

Quantitative Method of Produced Gas

An example of the gas generating device 100 having an anode-cathode integrated electrode illustrated in the ninth embodiment (see FIGS. 30 and 31) is used, and the amount of generated gas is measured in the following manner. Incidentally, the gas generating device which is simply configured as shown in FIG. 48 will be described.

Figure 48:
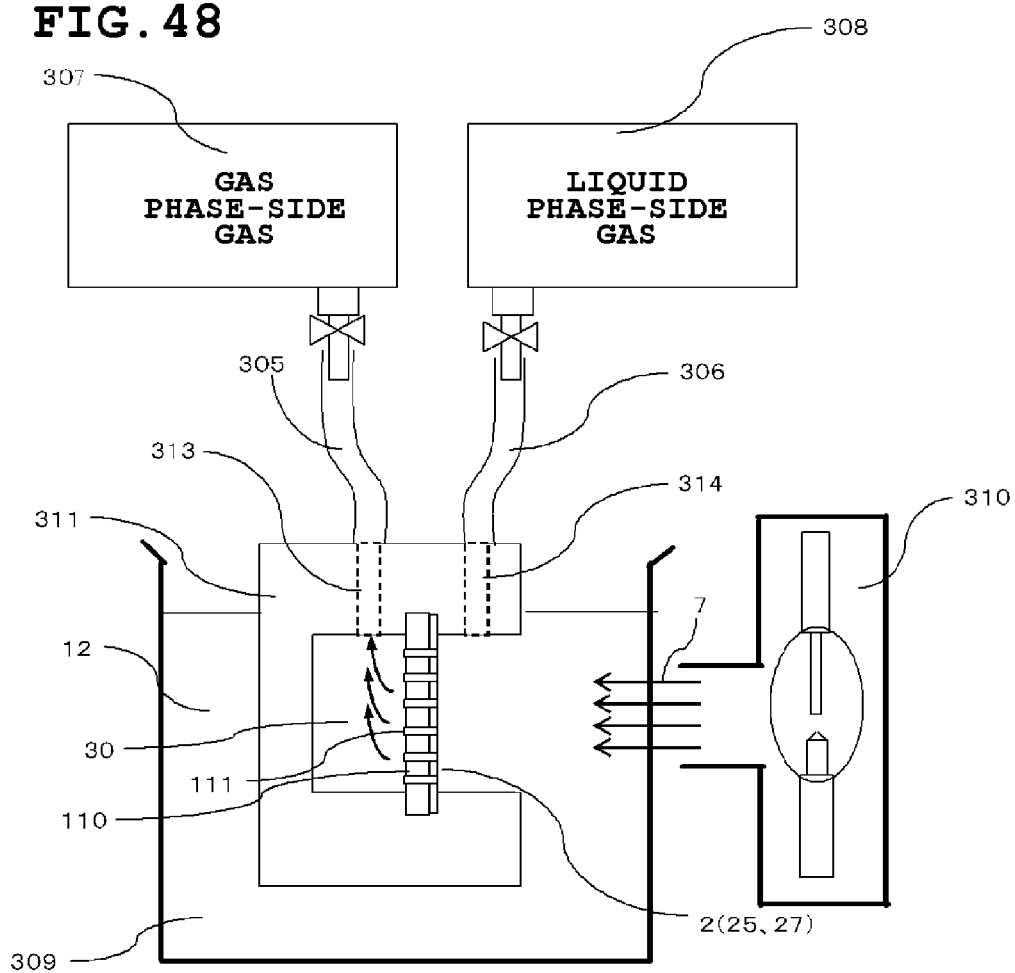
FIG. 48 is an exploratory view of an experiment for producing a gas using the gas generating device equipped with an anode-cathode integrated electrode according to the ninth embodiment.

As shown in FIG. 48, the gas generating device is provided with gas collecting means (gas phase-side gas bag 307 and liquid phase-side gas bag 308) and a light source 310. A high pressure mercury lamp or a xenon lamp is suitably used for the light source 310. The gas phase-side gas bag 307 and the liquid phase-side gas bag 308 may be composed of any material as long as the material has high gas barrier performance blocking an inorganic gas such as oxygen, hydrogen or the like, but an aluminum bag is suitably adopted.

The photocatalyst cell is used for fixation and support of the gas generating device 100 of the embodiment and collection of the oxygen gas and the hydrogen gas. The cell is immersed in a beaker 309 containing the electrolytic solution 12, and the surface of the photocatalyst supporting surface 20 of the gas generating device 100 comes into contact with the electrolytic solution 12.

Through holes (first through holes 111 and second through holes 113) are formed on a base material 25. The first through holes 111 and the second through holes 113 inhibit penetration of the electrolytic solution 12 into the back side of the base material 25 according to the aforementioned Laplace pressure. The greater part of the oxygen gas and hydrogen gas generated by a catalyst-containing layer 81 of the gas generating device 100 receiving the excitation light from the light source 310 is accumulated at a gas containing unit 30 at the back via the first through holes 111 and the second through holes 113, passes through an outlet 303 in a gas phase-side cell and a gas phase-side discharge tube 305, and collected and stored at the gas phase-side gas bag 307.

On the other hand, the gas that has not passed through the first through holes 111 and the second through holes 113 grows to bubbles at the liquid phase side, passes through an outlet 304 in the liquid phase-side cell and a liquid phase-side discharge tube 306, and collected and stored at the liquid phase-side gas bag 308.

The gas generating device 100 is irradiated with UV light from the light source 310 for a certain period of time. After detachment of the gas phase-side gas bag 307 and the liquid phase-side gas bag 308 from the gas generating device 100 and connection of these gas bags to a gas chromatograph, the retention time and the peak area of the generated gas are measured. The retention time and the peak area of pure hydrogen and pure oxygen are each measured in advance for calibration.

For example, when the amount of generated hydrogen is quantified, the concentration of hydrogen produced by photolysis is taken as X, the peak area is taken as A, and the peak area of pure hydrogen (100% concentration) is taken as Ap. Then, $X=100*A/Ap$.

When the volume of a container is $V_0$, the volume V of generated hydrogen is $V=V_0*X$. Accordingly, the amount of gas of generated hydrogen (number of molecules) may be determined from a gas equation of $P*V=n*R*T$ (P: pressure, V: volume, n: umber of molecules, R: gas constant, T: absolute temperature).

EXAMPLES

The present invention is now illustrated in detail below with reference to Examples. Nevertheless, the present invention is not restricted to these Examples.

Example 1

An anode electrode having a photocatalyst-containing layer without through holes and a cathode electrode having a promoter layer with through holes were arranged to face each other in this Example.

A polyethylene terephthalate (PET) film of a thickness of 50 μm in which an ITO (indium tin oxide) film, a transparent conductive film was formed by a sputtering method was prepared as a light-transmitting base material 28, and its shape was cut into a square of 2 cm×2 cm.

A paste for coating anatase type photocatalyst titanium oxide (a product of Peccell Technologies, Inc.) was applied on a square region of 1 cm×1 cm on the inner part of this film piece so as to have a thickness of 20 μm by a spraying method, and a photocatalyst-containing layer 27 was prepared. The photocatalyst-containing layer formed by coating was dried at 140 degrees centigrade for 1 hour and the residual organic matter and the solvent were evaporated. In this way, a photocatalyst anode electrode having a photocatalyst supporting surface 20 was formed. Next, the back of the anode electrode 2 consisting of a photocatalyst was subjected to a water-repellent treatment by vacuum plasma treatment using a carbon tetrafluoride gas, and the anode electrode 2 without forming through holes was completed.

Next, through holes having an aperture diameter of 100 μm and a hole pitch of 300 μm were formed in a region of 1 cm×1 cm on a polyimide film with an NC processing machine, and a porous film was prepared. Then, platinum was sputtered with a thickness of 10 nm on the film, the film was cut into a square of 2 cm×2 cm, and the cathode electrode 3 was completed.

The completed cathode electrode 3 was used, and the promoter cell 6 shown in FIG. 14A was prepared. Acryl was used fundamentally. Nevertheless, the material is not necessarily limited, and any material may be used as long as it is not soluble in the electrolytic solution. Quartz was used for the light receiving window. A titanium wire was used for the conducting wire 202, and titanium was used for the conducting metal frame.

The anode electrode 2 without forming through holes previously prepared was installed on the promoter cell 6 so as to face the cathode electrode having through holes, and the gas generating device 100 shown in FIG. 17 was completed.

The facing interval between the anode electrode 2 without having through holes and the cathode electrode 3 having through holes was set to 0.5 mm. The electrolytic solution 12 in which 30 g of sodium carbonate was dissolved in 100 cc of distilled water was supplied from the electrolytic solution supply tube 131. An argon gas is supplied to the argon gas supply tube 102 after the installation, the inside of the first gas containing unit 21 and the second gas containing unit 31 was fully purged, and unnecessary gas in the system was driven out prior to use.

Subsequently, a high pressure mercury lamp radiated ultraviolet light from the light receiving window. The light radiated with an irradiation intensity of 10 mW/cm$^2$ for 1 hour, the produced hydrogen gas was collected at a suction rate of 0.17 cc/min in a 10 cc gas-tight syringe from the hydrogen gas discharge tube 103, and the hydrogen concentration was analyzed by a gas chromatography (Model: GC-8A, a product of Shimadzu Corporation) and as a result, 980 ppm.

When the concentration was converted to the amount of hydrogen produced per unit time, it was 0.44 µmol/hr corresponding to 112 µmol/g/h per unit weight of the titanium oxide photocatalyst.

Similarly, the gas contained in the oxygen gas discharge tube 101 was analyzed with the use of a gas chromatography and as a result, it was confirmed that oxygen was contained.

Example 2

In the same manner as in Example 1, an anode electrode without having through holes and a cathode electrode having through holes were arranged to face each other in this Example.

In the production method of the cathode electrode 3, the cathode electrode 3 having through holes of a hole diameter of 30 µm and a hole pitch of 50 µm was formed using a chemical etching method. In the same manner as in Example 1, the promoter cell 6 shown in FIG. 14A was prepared, the anode electrode 2 without having through holes was formed in the same manner as in Example 1, and the gas generating device 100 shown in FIG. 17 was completed. The hydrogen gas was measured by the use of the gas generating device 100 having the anode electrode without through holes and the cathode electrode with through holes arranged to face each other and as a result, the hydrogen concentration was 1,436 ppm and the amount of hydrogen produced per unit weight of the titanium oxide photocatalyst was 164 µmol/g/hr.

Example 3

In the same manner as in Examples 1 and 2, an anode electrode without having through holes and a cathode electrode having through holes were arranged to face each other in this Example.

In the production method of the cathode electrode 3, the cathode electrode 3 having through holes of a hole diameter of 10 µm and a hole pitch of 40 µm was formed using a laser processing method. In the same manner as in Example 1, the promoter cell 6 shown in FIG. 14A was prepared, the anode electrode 2 without having through holes was formed in the same manner as in Example 1, and the gas generating device 100 shown in FIG. 17 was completed. The hydrogen gas was measured in the same manner as in Examples 1 and 2 by the use of the gas generating device 100 having the anode electrode without through holes and the cathode electrode with through holes arranged to face each other and as a result, the hydrogen concentration was 1,310 µm and the amount of hydrogen produced per unit weight of the titanium oxide photocatalyst was 150 µmol/g/hr.

Example 4

An anode electrode having through holes and a cathode electrode having through holes similarly were arranged to face each other in this Example.

In the production method of the anode electrode 2 consisting of a photocatalyst, through holes having a hole diameter of 80 µm and a hole pitch of 160 µm were formed in a region of 1 cm×1 cm on an ITO-attached PET film using an NC processing machine. Then, the film was cut into a square of 2 cm×2 cm and a porous film was prepared. A nitrogen gas blew from the lower side whereas a titanium oxide paste was spray-coated from the top so that holes were not filled with titanium oxide. Thus, a photocatalyst coating layer was prepared. A coating thickness was adjusted to about 20 µm.

With respect to the cathode electrode 3, a porous film having a hole diameter of 30 µm and a hole pitch of 50 µm in the same manner as in Example 2 was given.

In the same manner, the hydrogen gas was measured by irradiation with ultraviolet light for 1 hour and as a result, the hydrogen concentration was 212 ppm and the amount of hydrogen produced per unit weight of the titanium oxide photocatalyst was 24 µmol/g/hr.

Example 5

An anode electrode having through holes and a cathode electrode having through holes similarly were arranged to face each other, and an electron transport material was arranged between the electrodes instead of a lead wire in this Example.

The hydrogen gas was measured in the same manner as in Example 4 except that the conducting wire 202 was removed, and metal porous titanium (Model: Tiporous-45, porous titanium, a product of Osaka Titanium Technologies Co., Ltd) was sandwiched between the anode electrode 2 and the cathode electrode 3 as an electron transport material as an alternative to the wire. As a result, the hydrogen concentration was 359 ppm and the amount of hydrogen produced per unit weight of the titanium oxide photocatalyst was 41 µmol/g/hr.

Example 6

An anode electrode having through holes and a cathode electrode having through holes similarly were arranged to face each other, and the shape of the anode electrode was changed.

In the production method of the anode electrode 2, the hydrogen gas was measured in the same manner as in Example 4 except that a porous film was provided with through holes having a hole diameter of 30 µm and a hole pitch of 60 µm by a laser processing method. As a result, the hydrogen concentration was 2,226 ppm and the amount of hydrogen produced per unit weight of the titanium oxide photocatalyst was 255 µmol/g/hr.

Example 7

An anode electrode having through holes and a cathode electrode having through holes similarly were arranged to face each other, and the shape of the anode electrode was changed.

In the production method of the anode electrode 2, the hydrogen gas was measured in the same manner as in Example 4 except that a porous film was provided with through holes having a hole diameter of 10 µm and a hole pitch of 40 µm by a laser processing method. As a result, the hydrogen concentration was 1,303 ppm and the amount of hydrogen produced per unit weight of the titanium oxide photocatalyst was 149 µmol/g/hr.

Example 8

An anode-cathode integrated electrode was used in this Example.

A thin sheet of polyimide (Model: UPILEX, thickness: 0.5 mm, a product of UBE Industries, Ltd.) was cut into a test piece of a square with one side of 15.4 mm as a base material 25. On this test piece, holes having a diameter of 100 µm was formed at a pitch of 200 µm with an NC processing machine (Model Series 21i-MB, a product of FANUC), and a base material having the first through holes 111 and the second through holes 113 was prepared. Titanium dioxide was sputtered on one surface of the base material with a thickness of 250 nm using a sputtering device (Model: CFS-4ES, a product of Shibaura Mechatronics Corporation), and the photocatalyst-containing layer 27 was formed. An argon gas and an oxygen gas were used at a flow rate of 1:1 for a sputtering gas. The sheet was heated at 300 degrees centigrade under the sputtering conditions of a sputtering power of 300 W and a gas pressure of 2.0 Pa ($1.5 \times 10^{-2}$ Torr) using an RF power supply. This titanium dioxide film sample was analyzed by an X-ray diffraction method and as a result, the diffraction peak of an anatase monocrystal (101) surface was detected at $2\theta=25.4$ degrees and it was confirmed that a sputtered film of titanium dioxide was an anatase crystal form.

Next, a g-line positive-type photoresist (Model: PFR9005D18G, a product of JSR) for a wavelength of 436 nm was spin-coated at a rotation speed of 3,500 rpm and preheated at 90 degrees centigrade for 10 minutes and a resist film was formed. The base material was covered with a photomask having a plurality of circular apertures having a diameter of 180 µm at an interval of a transverse direction pitch of 200 µm and a longitudinal direction pitch of 346.4 µm (transverse pitch×√3). A hole of the sheet and a center of the circular aperture of the mask were superposed on each other with a mask aligner (Model: K-400PS100, a product of Kyowariken Co., Ltd.), and exposed for 10 seconds with a UV-visible light source for exposure (Model: UIV-5100, a product of Ushio Inc.). This base material was heated at 110 degrees centigrade for 10 minutes for stabilization of monomers in the resist film, then exposed for 1 minute with a 2.4% aqueous solution of tetramethylammonium hydroxide, washed with ion exchange water for 20 seconds, and development was carried out. The resist only in which the circular aperture having a diameter of 180 µm was exposed to the UV-visible light source was dissolved in a developing solution and removed, and the circular aperture became exposed.

Subsequently, this base material was naturally dried at room temperature for 30 minutes, and then platinum was sputtered with a thickness of 50 nm using a sputtering device (Model: HSM-521, a product of Shimadzu Emit Co., Ltd.). Argon was used for a sputtering gas. The sputtering was carried out under the conditions of a voltage of 600 V, a current of 0.4 A and a gas pressure of 0.074 Pa ($5.6 \times 10^{-4}$ Torr) using a DC power supply.

After that, the remained resist and platinum were peeled off with acetone. On the photocatalyst-containing layer 27 consisting of titanium dioxide, the promoter-containing layer 43 in which only the circular aperture having a diameter of 180 µm was formed as the promoter-containing was formed.

Next, the inner wall and the back of the first through holes 111 and the second through holes 113 were selectively subjected to a hydrophobic treatment. First, as pre-treatment, $SiO_2$ was sputtered with a thickness of 10 nm on a sheet back side using a sputtering device (Model: CFS-4ES, a product of Shibaura Mechatronics Corporation). An argon gas was used for a sputtering gas. The sputtering was carried out under the conditions of a sputtering power of 200 W and a gas pressure of 1.0 Pa ($7.5 \times 10^{-3}$ Torr) using an RF power supply. Subsequently, the sheet was sealed in an airtight container in a vapor atmosphere of hexamethyldisilazane and a gas phase reaction was carried out for about 10 hours. A water contact angle of the back of the base material was measured and as a result, the angle of 60 degrees before treatment became 100 degrees after treatment, hydrophobization was confirmed, and an anode-cathode integrated electrode was completed.

Next, this anode-cathode integrated electrode was assembled in the gas generating device 100 as shown in FIG. 48, a silicone tube (internal diameter: 2.0 mm, length: 15 cm) as a gas collecting line was connected to the gas containing unit 30 arranged on the back side of the anode electrode 2, and connected to a gas collecting aluminum bag (Model: AAK-1, volume: 500 ml, a product of GL Sciences, Inc.) filled with an argon gas as the gas phase-side gas bag 307 at the top. This gas generating device 100 was immersed in the beaker 309 containing an aqueous sulfuric acid solution (electrolytic solution 14) adjusted to 2N, and separated by a distance of 1 cm from a UV light source (Model: UI-501C, a product of Ushio Inc.) as the light source 310, and irradiated with the light for about 7 hours. The light intensity on the light-irradiated surface was 70 mW/cm². An aluminum bag for collecting this gas was removed from the gas generating device 100, and connected to a gas sampler of a gas chromatograph (Model: GC-BAIT, a product of Shimadzu Corporation) having an inorganic gas analytical column (Model: SHINCARBON ST, a product of Shinwa Chemical Industries Ltd.). Then, the retention time and the peak area of the generated gas were measured under the analytical conditions of an oven/detector temperature of 50 degrees centigrade and a current of 70 mA. The hydrogen peak was detected when the retention time was 4.2 minutes, the hydrogen concentration was 880 ppm, and the amount of hydrogen produced per unit weight of the titanium oxide photocatalyst was 101 μmol/g/hr.

Example 9

An anode-cathode integrated electrode was used in this Example.

In the production method of the anode-cathode integrated electrode, the amount of hydrogen gas produced was measured under the same conditions as in Example 8, except that a titanium dioxide paste manufactured by Peccell Technologies, Inc. was formed into a film so as to have a film thickness of 20 μm by a screen printing method, the photocatalyst-containing layer formed by coating was dried at 140 degrees centigrade for 1 hour, the residual organic matter and the solvent were evaporated, and a porous film was formed. As a result, the hydrogen concentration was 3,040 ppm and the amount of hydrogen produced per unit weight of the titanium oxide photocatalyst was 348 μmol/g/hr.

Comparative Example 1

A conventional photocatalytic electrolysis equipment shown in FIG. 1 was used for the experiment. Sulfuric acid corresponding to 0.1N was put into tap water for an electrolyte, and an experiment was carried out by the irradiated amount of ultraviolet light of 1,600 mW/cm$^2$ and as a result, slight attachment of bubbles was confirmed from the anode electrode 2 containing the photocatalyst-containing layer 27 and the cathode electrode 3 containing the promoter-containing layer 43. Nevertheless, the produced bubbles were so small that confirmation of attachment did not come to be realized with the use of an oxygen gas detector tube and a hydrogen gas detector tube. Subsequently, 1N diluted sulfuric acid solution was used and the experiment was carried out. Yet, when bubbles were respectively attached to the electrodes, their separation from the electrodes was sometimes confirmed, whereas gas production could not be clearly confirmed. The experiment was further carried out with the use of tap water and as a result, generation of bubbles could never be confirmed.

Comparative Example 2

An anode-cathode integrated electrode without having through holes was used in this Comparative Example.

In the production method of the anode-cathode integrated electrode, the amount of hydrogen gas produced was measured under the same conditions as in Example 8, except that through holes were neither formed on the photocatalyst electrode nor the promoter electrode, and a gas collecting port was arranged on a liquid-contact side. As a result, the hydrogen concentration was 30 ppm and the amount of hydrogen produced per unit weight of the titanium oxide photocatalyst was 3 μmol/g/hr. Also, bubbles were attached in large quantities on the electrode surface.

The results from the above Examples 1 to 9 and Comparative Examples 1 to 2 are shown in the following Tables 1-1 and 1-2.

TABLE 1-1

| | | Photocatalyst anode (TiO$_2$) | | | | |
|---|---|---|---|---|---|---|
| Experiment | Configuration of Electrode | Hole diameter (μm) | Pitch (μm) | Hole/pitch ratio | Film-forming method | TiO$_2$ thickness (μm) |
| Example 1 | Face-to-face | No hole | | — | Coating | 20 |
| Example 2 | Face-to-face | No hole | | — | Coating | 20 |
| Example 3 | Face-to-face | No hole | | — | Coating | 20 |
| Example 4 | Face-to-face | 80 | 160 | 2.0 | Coating | 20 |
| Example 5 | Face-to-face | 80 | 160 | 2.0 | Coating | 20 |
| Example 6 | Face-to-face | 30 | 60 | 2.0 | Coating | 20 |
| Example 7 | Face-to-face | 10 | 40 | 4.0 | Coating | 20 |
| Example 8 | One surface Irradiated | 100 | 200 | 2.0 | Sputtering | 0.25 |
| Example 9 | One surface Irradiated | 100 | 200 | 2.0 | Coating | 20 |
| Comparative Example 1 | Face-to-face | Conventional photocatalytic electrolyzer (FIG. 1) | | | | |
| Comparative Example 2 | One surface Irradiated | No hole | | — | sputtering | 0.25 |

TABLE 1-2

| | Promoter cathode (Pt) | | | | Hydrogen gas | |
|---|---|---|---|---|---|---|
| Experiment | Hole diameter (μm) | Pitch (μm) | Hole/pitch ratio | Electrode gap (mm) | Concentration (ppm) | Amount of gas generated (μmol/g/hr) |
| Example 1 | 100 | 300 | 3.0 | 0.5 | 980 | 112 |
| Example 2 | 30 | 50 | 2.7 | 0.5 | 2436 | 164 |
| Example 3 | 10 | 40 | 4.0 | 0.5 | 2310 | 150 |
| Example 4 | 30 | 50 | 2.7 | 0.5 | 212 | 24 |
| Example 5 | 30 | 50 | 2.7 | 0.5 | 359 | 42 |
| Example 6 | 30 | 50 | 2.7 | 0.5 | 2226 | 255 |

TABLE 1-2-continued

|  | Promoter cathode (Pt) | | | | Hydrogen gas | |
| --- | --- | --- | --- | --- | --- | --- |
|  | | | | | | Amount of gas |
|  | Hole diameter | Pitch | Hole/pitch | Electrode | Concentration | generated |
| Experiment | (μm) | (μm) | ratio | gap (mm) | (ppm) | (μmol/g/hr) |
| Example 7 | 30 | 50 | 2.7 | 0.5 | 2303 | 149 |
| Example 8 | 100 | 200 | 2.0 | — | 880 | 101 |
| Example 9 | 100 | 200 | 2.0 | — | 3040 | 348 |
| Comparative Example 1 | Conventional photocatalytic electrolyzer (FIG. 1) | | | | No hydrogen produced | |
| Comparative Example 2 | No hole | — | — | — | 30 | 3 |

This application is based on Japanese patent application No. 2009-207777 filed on Sep. 9, 2009 and Japanese patent application No. 2009-214484 filed on Sep. 16, 2009, the contents of which are incorporated hereinto by reference.

The invention claimed is:

1. A gas generating device for generating an oxygen gas and/or a hydrogen gas from an electrolytic solution containing water, comprising:
   an anode electrode having a photocatalyst-containing layer containing a photocatalyst producing an oxygen gas from the electrolytic solution by a photocatalytic reaction;
   a cathode electrode producing a hydrogen gas from electrons and hydrogen ions generated in the electrolytic solution by the photocatalytic reaction at the photocatalyst-containing layer, wherein the cathode electrode and the photocatalyst-containing layer of the anode electrode are arranged to face each other;
   a plurality of through holes formed on the anode electrode and the cathode electrode, and allowing passage of the produced oxygen gas or hydrogen gas but preventing passage of the electrolytic solution;
   a gas containing unit containing the oxygen gas or the hydrogen gas that has passed through the through holes; and
   a light receiving window allowing passage of excitation light of the photocatalyst and irradiating the excitation light on the photocatalyst-containing layer,
   wherein the cathode electrode includes a promoter-containing layer receiving the excitation light of the photocatalyst and producing the hydrogen gas,
   wherein the promoter-containing layer of the cathode electrode is formed at a position opposite to the through holes arranged on the anode electrode,
   wherein the photocatalyst-containing layer is a porous material having a plurality of holes, and the photocatalyst is exposed to the holes, and the holes are exposed to the inner wall surface of the through holes,
   wherein the holes exposed to the inner wall surface of the through holes mutually communicate with others of the holes, and
   wherein the anode electrode includes a base material supporting the photocatalyst-containing layer, and the base material is composed of a material allowing passage of the excitation light, or
   wherein the cathode electrode is composed of a material allowing passage of the excitation light, and
   the excitation light passes through the light receiving window, further passes through the base material of the anode electrode or the cathode electrode and radiates on the photocatalyst-containing layer.

2. The gas generating device according to claim 1, wherein the plurality of through holes are in regular arrangement on the anode electrode or the cathode electrode.

3. The gas generating device according to claim 2, wherein the distance between the adjacent centroids of the through holes is equal to or more than 0.1 μm and equal to or less than 800 μm.

4. The gas generating device according to claim 3, wherein the distance between the adjacent centroids of the through holes is, in each of the through holes, equal to or more than 0.1 μm and equal to or less than 800 μm.

5. The gas generating device according to claim 3, wherein the distance between the centroids is equal to or more than 1.5 times and equal to or less than 5 times as compared to the aperture diameter of the through holes.

6. The gas generating device according to claim 2, wherein the distance between the adjacent edges of the adjacent through holes is equal to or more than 0.1 μm and equal to or less than 400 μm.

7. The gas generating device according to claim 1, wherein the layer thickness of the photocatalyst-containing layer is equal to or more than 0.25 μm and equal to or less than 100 μm.

8. The gas generating device according to claim 1, wherein the light receiving window is arranged on a side opposite to the photocatalyst-containing layer through the base material, and
   the excitation light passes through the light receiving window, further passes through the base material and radiates on the photocatalyst-containing layer.

9. The gas generating device according to \claim 1, wherein the cathode electrode is composed of a material allowing passage of the excitation light,
   the light receiving window is arranged to face the cathode electrode, and
   the excitation light passes through the light receiving window, further passes through the cathode electrode and radiates on the photocatalyst-containing layer.

10. The gas generating device according to claim 1, wherein the promoter-containing layer of the cathode electrode is formed at a position opposite to the through holes arranged on the anode electrode.

11. The gas generating device according to claim 10, wherein the promoter contained in the promoter-containing layer is at least one kind selected from the group consisting of platinum, nickel, ruthenium, nickel oxide and ruthenium oxide.

12. The gas generating device according to claim 1, wherein the through holes arranged on the cathode electrode or the anode electrode are in a slit shape.

13. The gas generating device according to claim 12, wherein both the cathode electrode and the anode electrode include slit-shaped through holes, and
the cathode electrode and the anode electrode are arranged to face each other so that the slit-shaped through holes of theirs are out of alignment with each other.

14. The gas generating device according to claim 1, wherein a pair of electrodes consisting of the cathode electrode and the anode electrode are in parallel arrangement to each other at predetermined intervals and have a curvable or bendable flexibility in a direction perpendicular to the plane.

15. The gas generating device according to claim 1, wherein the cathode electrode includes a promoter-containing layer receiving the excitation light of the photocatalyst and producing the hydrogen gas, and
an electron transport layer is provided between the photocatalyst-containing layer of the anode electrode and the promoter-containing layer of the cathode electrode, the
electron transport layer being composed of a conductive material and allowing penetration of the electrolytic solution.

16. The gas generating device according to claim 1, wherein the cathode electrode and the anode electrode are supported by a common base material, and arranged side by side.

17. The gas generating device according to claim 16, wherein a plurality of the cathode electrodes and a plurality of the anode electrodes are arranged adjacent to each other.

18. The gas generating device according to claim 17, comprising:
a first through hole formed on the anode electrode and allowing passage of the oxygen gas but preventing passage of the electrolytic solution; and
a second through hole formed on the cathode electrode and allowing passage of the hydrogen gas but preventing passage of the electrolytic solution.

19. The gas generating device according to claim 18, comprising: a first gas containing unit of the gas containing unit formed on an aperture of the first through hole and holding the oxygen gas; and
a second gas containing unit of the gas containing unit formed on an aperture of the second through hole and holding the hydrogen gas.

20. The gas generating device according to claim 18, wherein the cathode electrode includes a promoter-containing layer receiving the excitation light of the photocatalyst and producing the hydrogen,
the photocatalyst-containing layer is arranged in the vicinity of the first through hole,
the promoter-containing layer is arranged in the vicinity of the second through hole.

21. The gas generating device according to claim 20, wherein the photocatalyst-containing layer is arranged in a ring shape in the peripheral portion of the aperture of the first through hole, and the promoter-containing layer is arranged in a ring shape in the peripheral portion of the aperture of the second through hole.

22. The gas generating device according to claim 20, wherein the cathode electrode and the anode electrode are arranged adjacent to each other side by side through an electrically insulating material, and the adjacent interval between the cathode electrode and the anode electrode is equal to or more than 0.01 μm.

23. The gas generating device according to claim 20, wherein the light receiving window is arranged at a position opposite to both the photocatalyst-containing layer and the promoter-containing layer, and
the excitation light passes through the light receiving window and radiating on the photocatalyst-containing layer and the promoter-containing layer.

24. The gas generating device according to claim 20, wherein the anode electrode and the cathode electrode are each composed of a material allowing passage of the excitation light of the photocatalyst,
the light receiving window allows passage of the excitation light and irradiating the light on the photocatalyst-containing layer and is arranged to face the anode electrode and the cathode electrode on a side opposite to the photocatalyst-containing layer and the promoter-containing layer, and
the excitation light passes through the light receiving window, further passes through the anode electrode and the cathode electrode and radiates on the photocatalyst-containing layer and the promoter-containing layer.

25. The gas generating device according to claim 20, wherein at least one of the photocatalyst-containing layer and the promoter-containing layer is arranged at a tilt with respect to the base material.

26. The gas generating device according to claim 25, wherein the photocatalyst-containing layer or the promoter-containing layer includes a convex portion protruding from the base material.

27. The gas generating device according to claim 26, wherein the convex portion forms a box shape including a pair of vertical faces opposing to each other.

28. The gas generating device according to claim 26, wherein the gas containing unit is formed inside the convex portion.

29. The gas generating device according to claim 1, wherein the inner wall surface of the through holes is subjected to a hydrophobic treatment.

30. The gas generating device according to claim 1, wherein the photocatalyst-containing layer and the cathode electrode are lyophilic with respect to the electrolytic solution.

31. The gas generating device according to claim 1, wherein the back side of the anode electrode or the cathode electrode has the gas containing unit and is lyophobic with respect to the electrolytic solution.

32. The gas generating device according to claim 1, further comprising:
an electrolytic solution store unit storing the electrolytic solution to bring the anode electrode and the cathode electrode into contact with the electrolytic solution;
an electrolytic solution supply tube supplying the electrolytic solution to the electrolytic solution store unit; and
an electrolytic solution discharge tube discharging the electrolytic solution fed for a catalytic reaction from the electrolytic solution store unit.

33. The gas generating device according to claim 1, wherein the photocatalyst contained in the photocatalyst-containing layer is at least one kind selected from the group consisting of oxides such as titanium oxide, vanadium oxide, nickel oxide, zinc oxide, gallium oxide, zirconium oxide, niobium oxide, molybdenum oxide, tantalum oxide, tungsten oxide, germanium oxide, indium oxide, tin oxide, antinomy oxide, lead oxide, bismuth oxide and the like, and nitrides and sulfides of them.

34. The gas generating device according to claim 1, further comprising:
a light source irradiating the excitation light.

35. A method for generating an oxygen gas and/or a hydrogen gas from an electrolytic solution containing water, comprising: bringing the electrolytic solution into contact with the anode electrode and the cathode electrode of the pas-generating device of claim 1; irradiating excitation light of the photocatalyst on the photocatalyst-containing layer; collecting at least one of the oxygen gas generated at the anode electrode or the hydrogen gas generated at the cathode electrode via a plurality of the through holes arranged on the anode electrode or the cathode electrode.

36. The method for generating a gas according to claim 35, wherein the oxygen gas or the hydrogen gas is generated inside the holes and is collected via the through holes.

37. The method for generating a gas according to claim 36, wherein the oxygen gas or the hydrogen gas generated inside the holes is collected by the through holes via others of the holes exposed to the inner wall surface of the through holes.

38. The method for generating a gas according to claim 35, wherein the excitation light passes through the base material and radiates the photocatalyst-containing layer.

39. The method for generating a gas according to claim 35, wherein the excitation light passes through the cathode electrode and radiates on the photocatalyst-containing layer.

40. The method for generating a gas according to claim 35, wherein the excitation light is reflected by the anode electrode or the cathode electrode and radiates on the other photocatalyst-containing layer of the anode electrode or the other promoter-containing layer of the cathode electrode.

41. The method for generating a gas according to claim 35, wherein the excitation light passes through the through holes arranged on the anode electrode or the cathode electrode and radiates on the other promoter-containing layer of the cathode electrode or the other photocatalyst-containing layer of the anode electrode.

* * * * *